United States Patent [19]
Liu

[11] Patent Number: 6,076,043
[45] Date of Patent: Jun. 13, 2000

[54] UTILIZATION EFFECTIVENESS OF NUTRIENTS IN A POPULATION

[75] Inventor: Jinkui Liu, St. Paul, Minn.

[73] Assignee: American Institute of Nutrition and Management, Arden Hills, Minn.

[21] Appl. No.: 08/482,566

[22] Filed: Jun. 7, 1995

Related U.S. Application Data

[63] Continuation-in-part of application No. 08/345,210, Nov. 28, 1994, abandoned, which is a continuation of application No. 08/125,454, Sep. 22, 1993.

[51] Int. Cl.$^7$ .............................. A01K 5/02; G06F 17/00
[52] U.S. Cl. .................. 702/2; 364/413.01; 364/413.29; 364/554; 364/571.02; 119/52.4; 119/53; 119/51.02; 119/57.92
[58] Field of Search ................................ 364/401 R, 420, 364/402, 413.01, 413.02, 413.29, 554, 571.02; 119/52.4, 53, 51.02, 57.92; 395/201

[56] References Cited

U.S. PATENT DOCUMENTS

| | | | |
|---|---|---|---|
| Re. 33,600 | 6/1991 | Timmons | 236/49.3 |
| 4,082,064 | 4/1978 | Newell, III | 119/51.11 |
| 4,405,609 | 9/1983 | Potter | 424/177 |
| 4,414,206 | 11/1983 | Gordon et al. | 424/177 |
| 4,457,310 | 7/1984 | Swyer et al. | 364/413.29 |
| 4,517,923 | 5/1985 | Palmer | 119/51 R |
| 4,536,494 | 8/1985 | Carter | 514/31 |
| 4,562,209 | 12/1985 | Chou | 514/596 |
| 4,618,604 | 10/1986 | DeGeeter et al. | 514/130 |
| 4,625,728 | 12/1986 | Schonberg | 128/395 |
| 5,355,833 | 10/1994 | Legrain | 119/51.02 |
| 5,478,989 | 12/1995 | Shepley | 364/413.02 |

*Primary Examiner*—Emanuel T. Voeltz
*Assistant Examiner*—Hien Vo
*Attorney, Agent, or Firm*—Merchant, Gould, Smith, Edell, Welter & Schmidt, P.A.

[57] ABSTRACT

Nutrition modeling of animal, poultry and marine animals is a critical component of the respective enterprise optimization and managed environment pollution control. The optimization accuracy depends on the description of utilization efficiency of nutrients in a population of animals. The current invention demonstrates that utilization efficiency of nutrients for meat production in a population should be described based on at least three component parts of nutrient utilization, i.e., maintenance, linear gain, and non-linear gain, instead of one only. Efficiencies for maintenance and linear gain are fixed value(s), but nutrient efficiency for non-linear gain is a result of intra-population variation and efficiency of linear gain.

21 Claims, 63 Drawing Sheets

Nutrient utilization ratios for non-linear weight gain
(Standard deviation 0 or less)

| STD | 0.09 | 0.08 | 0.07 | 0.06 | 0.05 | 0.04 | 0.03 | 0.02 | 0.01 | 0.00 |
|---|---|---|---|---|---|---|---|---|---|---|
| -3.0 | | | | | | | | | | 0.9987 |
| -2.9 | 0.9987 | 0.9986 | 0.9986 | 0.9986 | 0.9986 | 0.9985 | 0.9985 | 0.9985 | 0.9984 | 0.9984 |
| -2.8 | 0.9984 | 0.9984 | 0.9983 | 0.9983 | 0.9983 | 0.9982 | 0.9982 | 0.9982 | 0.9981 | 0.9981 |
| -2.7 | 0.9981 | 0.9980 | 0.9980 | 0.9980 | 0.9979 | 0.9979 | 0.9979 | 0.9978 | 0.9978 | 0.9977 |
| -2.6 | 0.9977 | 0.9976 | 0.9976 | 0.9976 | 0.9975 | 0.9975 | 0.9974 | 0.9974 | 0.9973 | 0.9973 |
| -2.5 | 0.9972 | 0.9972 | 0.9971 | 0.9971 | 0.9970 | 0.9970 | 0.9969 | 0.9969 | 0.9968 | 0.9967 |
| -2.4 | 0.9967 | 0.9966 | 0.9966 | 0.9965 | 0.9964 | 0.9964 | 0.9963 | 0.9962 | 0.9962 | 0.9961 |
| -2.3 | 0.9960 | 0.9959 | 0.9958 | 0.9958 | 0.9957 | 0.9956 | 0.9955 | 0.9955 | 0.9954 | 0.9953 |
| -2.2 | 0.9952 | 0.9951 | 0.9950 | 0.9949 | 0.9948 | 0.9947 | 0.9946 | 0.9945 | 0.9944 | 0.9943 |
| -2.1 | 0.9942 | 0.9941 | 0.9940 | 0.9939 | 0.9938 | 0.9937 | 0.9936 | 0.9934 | 0.9933 | 0.9932 |
| -2.0 | 0.9931 | 0.9930 | 0.9928 | 0.9927 | 0.9926 | 0.9924 | 0.9923 | 0.9921 | 0.9920 | 0.9919 |
| -1.9 | 0.9917 | 0.9916 | 0.9914 | 0.9912 | 0.9911 | 0.9909 | 0.9908 | 0.9906 | 0.9904 | 0.9902 |
| -1.8 | 0.9901 | 0.9899 | 0.9897 | 0.9895 | 0.9893 | 0.9892 | 0.9890 | 0.9888 | 0.9886 | 0.9884 |
| -1.7 | 0.9882 | 0.9879 | 0.9877 | 0.9875 | 0.9873 | 0.9871 | 0.9869 | 0.9866 | 0.9864 | 0.9862 |
| -1.6 | 0.9859 | 0.9857 | 0.9854 | 0.9852 | 0.9849 | 0.9846 | 0.9844 | 0.9841 | 0.9839 | 0.9836 |
| -1.5 | 0.9833 | 0.9830 | 0.9827 | 0.9824 | 0.9822 | 0.9819 | 0.9816 | 0.9812 | 0.9809 | 0.9806 |
| -1.4 | 0.9803 | 0.9800 | 0.9796 | 0.9793 | 0.9790 | 0.9786 | 0.9783 | 0.9780 | 0.9776 | 0.9772 |
| -1.3 | 0.9768 | 0.9765 | 0.9761 | 0.9757 | 0.9753 | 0.9749 | 0.9745 | 0.9741 | 0.9737 | 0.9733 |
| -1.2 | 0.9730 | 0.9725 | 0.9720 | 0.9716 | 0.9712 | 0.9707 | 0.9703 | 0.9698 | 0.9694 | 0.9689 |
| -1.1 | 0.9684 | 0.9679 | 0.9675 | 0.9670 | 0.9665 | 0.9660 | 0.9655 | 0.9650 | 0.9644 | 0.9639 |
| -1.0 | 0.9634 | 0.9628 | 0.9623 | 0.9617 | 0.9612 | 0.9606 | 0.9601 | 0.9595 | 0.9589 | 0.9583 |
| -0.9 | 0.9577 | 0.9571 | 0.9565 | 0.9559 | 0.9553 | 0.9547 | 0.9541 | 0.9534 | 0.9527 | 0.9521 |
| -0.8 | 0.9515 | 0.9508 | 0.9502 | 0.9495 | 0.9488 | 0.9481 | 0.9474 | 0.9467 | 0.9460 | 0.9453 |
| -0.7 | 0.9446 | 0.9438 | 0.9431 | 0.9424 | 0.9416 | 0.9409 | 0.9401 | 0.9393 | 0.9386 | 0.9378 |
| -0.6 | 0.9370 | 0.9362 | 0.9354 | 0.9346 | 0.9338 | 0.9330 | 0.9321 | 0.9313 | 0.9304 | 0.9296 |
| -0.5 | 0.9287 | 0.9279 | 0.9270 | 0.9261 | 0.9252 | 0.9244 | 0.9235 | 0.9226 | 0.9216 | 0.9207 |
| -0.4 | 0.9198 | 0.9189 | 0.9179 | 0.9170 | 0.9160 | 0.9151 | 0.9141 | 0.9131 | 0.9122 | 0.9112 |
| -0.3 | 0.9102 | 0.9092 | 0.9082 | 0.9072 | 0.9062 | 0.9052 | 0.9041 | 0.9031 | 0.9020 | 0.9010 |
| -0.2 | 0.8999 | 0.8989 | 0.8978 | 0.8967 | 0.8957 | 0.8946 | 0.8935 | 0.8924 | 0.8913 | 0.8902 |
| -0.1 | 0.8891 | 0.8879 | 0.8868 | 0.8857 | 0.8845 | 0.8834 | 0.8822 | 0.8811 | 0.8799 | 0.8787 |
| -0.0 | 0.8776 | 0.8764 | 0.8752 | 0.8740 | 0.8728 | 0.8716 | 0.8704 | 0.8692 | 0.8680 | 0.8668 |

FIG. 2

Nutrient utilization ratios for non-linear gain
(Standard deviation 0 or more)

| STD | 0.00 | 0.01 | 0.02 | 0.03 | 0.04 | 0.05 | 0.06 | 0.07 | 0.08 | 0.09 |
|---|---|---|---|---|---|---|---|---|---|---|
| 0.0 | 0.8668 | 0.8655 | 0.8643 | 0.8631 | 0.8618 | 0.8606 | 0.8593 | 0.8581 | 0.8570 | 0.8555 |
| 0.1 | 0.8543 | 0.8530 | 0.8517 | 0.8504 | 0.8491 | 0.8478 | 0.8465 | 0.8452 | 0.8439 | 0.8426 |
| 0.2 | 0.8413 | 0.8400 | 0.8387 | 0.8373 | 0.8360 | 0.8347 | 0.8333 | 0.8320 | 0.8306 | 0.8293 |
| 0.3 | 0.8280 | 0.8266 | 0.8252 | 0.8239 | 0.8225 | 0.8211 | 0.8198 | 0.8184 | 0.8170 | 0.8156 |
| 0.4 | 0.8143 | 0.8129 | 0.8115 | 0.8101 | 0.8087 | 0.8073 | 0.8059 | 0.8045 | 0.8031 | 0.8017 |
| 0.5 | 0.8003 | 0.7989 | 0.7975 | 0.7961 | 0.7947 | 0.7933 | 0.7918 | 0.7904 | 0.7890 | 0.7876 |
| 0.6 | 0.7862 | 0.7847 | 0.7833 | 0.7819 | 0.7805 | 0.7790 | 0.7776 | 0.7762 | 0.7748 | 0.7733 |
| 0.7 | 0.7719 | 0.7704 | 0.7690 | 0.7676 | 0.7662 | 0.7647 | 0.7633 | 0.7618 | 0.7604 | 0.7590 |
| 0.8 | 0.7575 | 0.7561 | 0.7547 | 0.7532 | 0.7518 | 0.7504 | 0.7489 | 0.7475 | 0.7461 | 0.7446 |
| 0.9 | 0.7432 | 0.7418 | 0.7403 | 0.7389 | 0.7375 | 0.7360 | 0.7346 | 0.7332 | 0.7317 | 0.7303 |
| 1.0 | 0.7288 | 0.7275 | 0.7260 | 0.7246 | 0.7232 | 0.7218 | 0.7204 | 0.7189 | 0.7175 | 0.7161 |
| 1.1 | 0.7147 | 0.7133 | 0.7119 | 0.7105 | 0.7091 | 0.7077 | 0.7063 | 0.7049 | 0.7035 | 0.7021 |
| 1.2 | 0.7006 | 0.6993 | 0.6979 | 0.6965 | 0.6951 | 0.6937 | 0.6924 | 0.6910 | 0.6896 | 0.6882 |
| 1.3 | 0.6869 | 0.6855 | 0.6841 | 0.6827 | 0.6814 | 0.6800 | 0.6787 | 0.6773 | 0.6760 | 0.6746 |
| 1.4 | 0.6733 | 0.6719 | 0.6706 | 0.6692 | 0.6679 | 0.6666 | 0.6652 | 0.6639 | 0.6625 | 0.6613 |
| 1.5 | 0.6600 | 0.6586 | 0.6573 | 0.6560 | 0.6547 | 0.6534 | 0.6521 | 0.6508 | 0.6495 | 0.6482 |
| 1.6 | 0.6469 | 0.6457 | 0.6444 | 0.6431 | 0.6418 | 0.6406 | 0.6393 | 0.6380 | 0.6368 | 0.6355 |
| 1.7 | 0.6342 | 0.6330 | 0.6317 | 0.6305 | 0.6293 | 0.6280 | 0.6268 | 0.6256 | 0.6243 | 0.6231 |
| 1.8 | 0.6219 | 0.6207 | 0.6195 | 0.6182 | 0.6170 | 0.6158 | 0.6146 | 0.6134 | 0.6122 | 0.6111 |
| 1.9 | 0.6099 | 0.6087 | 0.6075 | 0.6063 | 0.6052 | 0.6040 | 0.6028 | 0.6017 | 0.6005 | 0.5994 |
| 2.0 | 0.5982 | 0.5971 | 0.5959 | 0.5948 | 0.5936 | 0.5925 | 0.5914 | 0.5902 | 0.5891 | 0.5880 |
| 2.1 | 0.5869 | 0.5858 | 0.5847 | 0.5836 | 0.5825 | 0.5814 | 0.5803 | 0.5792 | 0.5781 | 0.5770 |
| 2.2 | 0.5759 | 0.5748 | 0.5738 | 0.5727 | 0.5716 | 0.5706 | 0.5695 | 0.5685 | 0.5674 | 0.5664 |
| 2.3 | 0.5653 | 0.5643 | 0.5632 | 0.5622 | 0.5612 | 0.5601 | 0.5591 | 0.5581 | 0.5571 | 0.5560 |
| 2.4 | 0.5550 | 0.5540 | 0.5530 | 0.5520 | 0.5510 | 0.5500 | 0.5490 | 0.5480 | 0.5470 | 0.5460 |
| 2.5 | 0.5452 | 0.5442 | 0.5432 | 0.5423 | 0.5413 | 0.5403 | 0.5394 | 0.5384 | 0.5375 | 0.5365 |
| 2.6 | 0.5356 | 0.5346 | 0.5337 | 0.5327 | 0.5318 | 0.5309 | 0.5299 | 0.5290 | 0.5281 | 0.5272 |
| 2.7 | 0.5263 | 0.5253 | 0.5244 | 0.5235 | 0.5226 | 0.5217 | 0.5208 | 0.5199 | 0.5190 | 0.5181 |
| 2.8 | 0.5172 | 0.5164 | 0.5155 | 0.5146 | 0.5137 | 0.5128 | 0.5120 | 0.5103 | 0.5094 | 0.5085 |
| 2.9 | 0.5085 | 0.5077 | 0.5068 | 0.5060 | 0.5051 | 0.5043 | 0.5034 | 0.5026 | 0.5018 | 0.5009 |
| 3.0 | 0.5001 | | | | | | | | | |

| CODE | NAME | FLOCK DATA GROUP MODEL | FARM NAME |
|------|------|------------------------|-----------|
| T2   | T2   | *BROIL_NL              | T2        |
| TEST | TEST | *BROIL_NL              | TEST      |

INS / ENTER / DEL / ESC

CHOOSE AND USE F9 KEY TO MAINTAIN STATIC VARIABLES FOR MODEL

•FL1•

```
                    FLOCK      DATA    70
    CODE   NAME   GRO┌─────────────────────────────┐
   ─────────────────│   FLOCK    DATA MAINTENANCE  │
    T2    T2        │   THIS RECORD WILL BE CHANGED│
    TEST  TEST      │                   72         │
                    │   FARM NAME:  T2  / 74       │
                    │   FLOCK   NAME:   T2         │
                    │   PURCHASED ── 76            │
                    │   FROM:   T2       78        │
                    │   REFERENCE CODE:   T2       │
                    │   FORMULATION GROUP:  80     │
                    │                              82│
                    │   SELECTOR TABLE: *BROIL_NL  │
   ─────────────────│                              │
                INS /│   AUTOMATIC AGE CALCULATION: NO YES NO│
   ─────────────────│                         ·FL2·│
    CHOOSE AND USE F9 KEY T└──────────────────────┘
```

FIG. 7

F1=HELP
ESC TO EXIT

TABLE: PRODUCTS.T
PROD_CONSTRAINT

| PRODUCTS | | | 1.000<br>-- $/LB -- | 2.000<br>MIN @ MKT | 3.000<br>MAX @ MKT |
|---|---|---|---|---|---|
| SHRK_WT | LB | 2.000 | 0.3800 | 3.8000 | 3.9000 |
| WOG_WT | LB | 4.000 | 0.5000 | 0.0000 | 100.0000 |
| WOG_WST | LB | 5.000 | 0.0500 | 0.0000 | 100.0000 |
| BREAST | LB | 7.000 | 1.7000 | 0.0000 | 100.0000 |
| THIGH | LB | 8.000 | 0.0500 | 0.0000 | 100.0000 |
| WING | LB | 9.000 | 0.3200 | 0.0000 | 100.0000 |
| NECK | LB | 10.000 | 0.1500 | 0.0000 | 100.0000 |
| DRUM | LB | 11.000 | 0.2500 | 0.0000 | 100.0000 |
| BACK | LB | 12.000 | 0.1500 | 0.0000 | 100.0000 |
| PTS_WST | LB | 13.000 | 0.1000 | 0.0000 | 100.0000 |

FIG. 8

F1=HELP
ESC TO EXIT

TABLE: TIME.T

| TIME_ROW \ TIME_COL | 1.000 LOCK | 2.000 MINIMUM | 3.000 MAXIMUM |
|---|---|---|---|
| MKT/AGE,DY — 94 | 0.0000 | 43.0000 | 44.0000 |
| IDLE TIME — 96 | 14.0000 | 0.0000 | 0.0000 |
| BROOD.PERD — 98 | 0.0000 | 0.0000 | 0.0000 |
| SQFT/BIRD — 100 | 0.0000 | 0.3000 | 0.9000 |

TIME_ROW values: 0.000, 1.000, 2.000, 3.000

F1=HELP
ESC TO EXIT — 110

TABLE: INFORMTN.T
CONDITION

| SERIES | 1.000<br>AGE, DAYS | 2.000<br>TEMP (F) | 3.000<br>HUMIDITY, % |
|---|---|---|---|
| 1.0000 | 0.0000 | 88.0000 | 70.0000 |
| 2.0000 | 21.0000 | 90.0000 | 55.0000 |
| 3.0000 | 35.0000 | 90.0000 | 55.0000 |
| 4.0000 | 56.0000 | 90.0000 | 55.0000 |
| 5.0000 | 28.0000 | 65.0000 | 65.0000 |
| 6.0000 | 35.0000 | 65.0000 | 65.0000 |
| 7.0000 | 42.0000 | 65.0000 | 65.0000 |
| 8.0000 | 56.0000 | 65.0000 | 65.0000 |
| 9.0000 | 56.0000 | 65.0000 | 65.0000 |
| 10.0000 | 63.0000 | | |

F1=HELP
ESC TO EXIT

TABLE: RECOMMEND.T
RECOMMEND

| FORMULATING_AGE | 1.000<br>AIR,M/SEC | 2.000<br>AIR,AM PPM | 3.000<br>AIR,OXY % | 4.000<br>LITTER, % | 5.000<br>FDR "/1000 | 6.000<br>WTR "/1000 |
|---|---|---|---|---|---|---|
| 0.0000 | 0.0000 | 20.0000 | 0.0000 | 10.0000 | 0.0000 | 0.0000 |
| 21.0000 | 0.0000 | 30.0000 | 0.0000 | 20.0000 | 0.0000 | 0.0000 |
| 42.0000 | 0.0000 | 40.0000 | 0.0000 | 30.0000 | 0.0000 | 0.0000 |
| 63.0000 | 0.0000 | 50.0000 | 0.0000 | 40.0000 | 0.0000 | 0.0000 |
| 999.0000 | 0.0000 | 60.0000 | 0.0000 | 50.0000 | | |

112 (FORMULATING_AGE brace)
110 (table)
114, 116, 118, 120, 122, 124

FIG. 11

```
F1=HELP                TABLE: COST.T
ESC TO EXIT            NO COLUMNS

COST_SOURCES           0.0000

FIX,    $/YR  —128   1.000
PRCSS,  $/YR  —130   2.000      0.0000
CHICK,  $/BD  —132   3.000      0.0000
MARKT,  $/YR  —134   4.000      0.0000
PRPNE,  $/YR  —136   5.000      0.0000
BROOD,  $/FL  —138   6.000      0.0000
GRWER,  $/LB  —140   7.000      0.0600
```

INTERGRATED STRATEGIES
MEAT FURTHER PROCESSING INC.
DATABASE=TURKEY FURTHER PROCESSING

--- RAW MATERIALS ---
SELECT AND PRICE INGREDIENTS —144
EDIT NUTRIENTS, CREATE NEW INGR.
APPLY AMINO ACID EQUATIONS
EDIT AMINO ACID EQUATIONS

SEE NOTES BELOW
—142

=== NOTES ===
SET CURRENT INGREDIENT PRICE AND AVAILABILITY
LIMITED CAPABILITY TO SET INGREDIENT CONSTRAINTS
ENTER TO EXECUTE HILITED CHOICE, ESC=PREVIOUS MENU

FIG. 13

| 147 | 148 | 150 | 146 | | 152 | 154 | 157 | 158 | 160 |
|---|---|---|---|---|---|---|---|---|---|
| | | | INGREDIENT UPDATE | | | 156 | | | |
| AVAIL | GROUP | SHORT NAME | | MIN : | MAX | CTRL | COST/CWT | NU | HA |
| AVAIL | A-GRN | CORN | | 0.00 | 0.00 | | 3.890 | Y | Y |
| AVAIL | B-VPR | SOYMEAL (47.5) | | 0.00 | 0.00 | | 9.100 | N | N |
| AVAIL | C-APR | FEATHER MEAL | | 0.00 | 0.00 | | 10.000 | N | N |
| AVAIL | C-APR | MEAT/BONE MEAL | | 0.00 | 0.00 | | 10.400 | N | N |
| AVAIL | C-APR | POURLTRY B/P | | 0.00 | 0.00 | | 12.000 | N | N |
| AVAIL | D-MIN | LIME (FINE) | | 0.00 | 0.00 | * | 1.600 | N | N |
| AVAIL | D-MIN | PHOS/MONO-D P21 | | 0.00 | 0.00 | * | 15.200 | N | N |
| AVAIL | E-MIC | DL-METHIONINE | | 0.00 | 0.00 | * | 136.000 | N | N |
| AVAIL | E-MIC | L-LYSINE (78) | | 0.00 | 0.00 | * | 62.000 | N | N |
| AVAIL | E-MIC | SALT | | 0.00 | 0.00 | * | 6.200 | N | N |
| AVAIL | E-MIC | TOTAL.FT | | 0.00 | 0.00 | | 69.000 | N | N |
| AVAIL | E-MIC | TOTAL.ST | | 0.00 | 0.00 | | 74.000 | N | N |
| AVAIL | E-CAL | FAT (AN/VEG) | | 0.00 | 0.00 | | 13.250 | N | N |
| NO | A-GRN | ADM BARLEY | | 0.00 | 0.00 | | 3.260 | N | N |
| NO | A-GRN | ALFALFA | | 0.00 | 0.00 | | 5.000 | N | N |
| NO | A-GRN | BARLEY (POOR/Q) | | 0.00 | 20.00 | | 4.000 | N | N |
| NO | A-GRN | BARLEY | | 0.00 | 10.00 | | 3.850 | N | N |
| | | CHOOSE & ENTER OR ESC | | | | | | | |

INGREDIENT UPDATE

THIS RECORD WILL BE CHANGED

| | | 166 | 168 |
|---|---|---|---|
| | COST 162 | | |
| | | CHOICES | |
| AVAILABILITY | AVAIL | AVAIL MAYBE NO COST | |
| | | 164 | |

| | IT | MINIMUM AMOUNT | 0.00 |
|---|---|---|---|
| | AVAIL | MAXIMUM AMOUNT | 0.00 |

COST 8.8900

•IC2•

| AVAIL | GROUP | SHORT NAME | | | | |
|---|---|---|---|---|---|---|
| AVAIL | A-GRN | CORN | | | | |
| AVAIL | B-VPR | SOYMEAL (47.5) | | | | |
| AVAIL | C-APR | FEATHER MEAL | | | | |
| AVAIL | C-APR | MEAT/BONE MEAL | | | | |
| AVAIL | C-APR | POURLTRY B/P | | | | |
| AVAIL | D-MIN | LIME (FINE) | | | | |
| AVAIL | D-MIN | PHOS/MONO-D P21 | | | | |
| AVAIL | E-MIC | DL-METHIONINE | | | | |
| AVAIL | E-MIC | L-LYSINE (78) | | | | |
| AVAIL | E-MIC | SALT | | | | |
| AVAIL | E-MIC | TOTAL.FT | | | | |
| AVAIL | E-MIC | TOTAL.ST | | | | |
| AVAIL | E-CAL | FAT (AN/VEG) | | | | |
| AVAIL | A-GRN | ADM BARLEY | | | | |
| NO | A-GRN | ALFALFA | | | | |
| NO | A-GRN | BARLEY (POOR/Q) | 0.00 | 20.00 | 4.000 | N N |
| NO | A-GRN | BARLEY | 0.00 | 10.00 | 3.850 | N N |

CHOOSE & ENTER OR ESC

```
CHANGE RATION DATE

ENTER NEW
RATION DATE
09/19/93
SEP 19, 1993

IS DATE
CORRECT
(Y/N):
```
— EU2 —

| TO BE FORMULATED | | | USE F7 KEY TO CHANGE RATION DATE |
|---|---|---|---|
| CODE | NAME | MODEL | |
| TEST | TEST | *BROIL_NL | FORMULATE LIST MAINTENANCE |
| | | | INS KEY ADDS A FLOCK TO THE LIST |
| | | | DEL KEY REMOVES A FLOCK FROM THE LIST |
| | | | TO CHANGE PRODUCTION VARIABLES SELECT FLOCK AND ENTER |

— EU1 —

| SEQUENCING MODEL | REPORTING MODEL | SEQUENCING VARIABLE |
|---|---|---|
| 1.OPTIMUM | RESULTS | AGEB —174 |
| 2.OPTIMUM | PERFORMANCE | AGEB —176 |
| 3.OPTIMUM | YIELD | AGEB —178 |
| 4.OPTIMUM | FD/FACTORS | AGEB —180 |
| 5.OPTIMUM | NUT/ALLNCE | AGEB —182 |
| 6.RESOURCS | RAW/MATRLS | AGEB —184 |
| 7.OPTIMUM | INDIV-BIRD | AGEB —186 |

CHOOSE AND ENTER OR ESC TO EXIT

1. OPTIMUM RESULTS FOR FELT1 SEQUENCED BY AGES — 174'

| | TOTAL | DATA SETS USED 1757 | 1756 | 1755 | 1754 | 1753 |
|---|---|---|---|---|---|---|
| PER YEAR BASIS: | | | | | | |
| PER HOUSE: | | | | | | |
| End Product Optimized | | BODY PARTS | BODY PARTS | BODY PARTS | BODY PARTS | BODY PARTS |
| House size ............ sqft | | 40,000 | 40,000 | 40,000 | 40,000 | 40,000 |
| Flock cycles per year ..... (optimal) | | 4.17 | 4.17 | 4.17 | 4.17 | 4.17 |
| Net margin .......... (maximal)$ | 217,951 | 217,951 | 0 | 0 | 0 | 0 |
| Sales revenue ............... $ | 799,055 | 799,055 | 0 | 0 | 0 | 0 |
| Fixed cost .................. $ | 100,000 | 100,000 | 0 | 0 | 0 | 0 |
| Cumulative Feed Cost ......... $ | | 218,164 | 166,515 | 107,370 | 57,138 | 22,031 |
| Other cost .................. $ | 481,105 | 481,105 | 0 | 0 | 0 | 0 |
| PER POUND OF LIVE WT: | | | | | | |
| Net Margin ................. $ | | 0.1604 | 0.0000 | 0.0000 | 0.0000 | 0.0000 |
| Sales Revenue ............... $ | | 0.5882 | 0.0000 | 0.0000 | 0.0000 | 0.0000 |
| Fixed Cost .................. $ | | 0.0736 | 0.0000 | 0.0000 | 0.0000 | 0.0000 |
| Feed Cost ................... $ | | 0.1606 | 0.0000 | 0.0000 | 0.0000 | 0.0000 |
| Other Cost .................. $ | | 0.3541 | 0.0000 | 0.0000 | 0.0000 | 0.0000 |
| PER FLOCK BASIS: | | | | | | |
| Strain ...................... | | NICHOL.88 | NICHOL.88 | NICHOL.88 | NICHOL.88 | NICHOL.88 |
| Brd Mktg. Age Dys ....... (optimal) | | 115 | 0 | 0 | 0 | 0 |
| Ending age ............... day | | 115 | 98 | 77 | 56 | 35 |
| Live Wt ................. (optimal) | | 20.03 | 16.40 | 11.45 | 6.55 | 2.76 |
| Bird Size, Shrink Wt ...... (optimal) | | 19.54 | 0.00 | 0.00 | 0.00 | 0.00 |
| Shrink (6 hr. fast) ............. % | | 2.44 | 0.00 | 0.00 | 0.00 | 0.00 |
| FC - Live Wt ........... (optimal) | | 2.23 | 0.00 | 0.00 | 0.00 | 0.00 |
| FC Shrink Wt ........... (optimal) | | 2.27 | 0.00 | 0.00 | 0.00 | 0.00 |
| FC - Post Chill W.O.G. .... (optimal) | | 2.75 | 0.00 | 0.00 | 0.00 | 0.00 |
| FC - Disassembled Total Parts ..... | | 2.82 | 0.00 | 0.00 | 0.00 | 0.00 |
| Start Bird Number ....... (optimal) | | 18,201 | 18,201 | 18,201 | 18,201 | 18,201 |
| Bird density sqft/bd ...... (optimal) | | 2.40 | 0.00 | 0.00 | 0.00 | 0.00 |
| Bird number at processing ....... | | 16,667 | 0 | 0 | 0 | 0 |
| Projected Live ............... % | | 91.57 | 0.00 | 0.00 | 0.00 | 0.00 |
| YIELD POUNDS/BIRD: | | | | | | |
| Six hour fast weight ...... (optimal) | 19.54 | 19.54 | 0.00 | 0.00 | 0.00 | 0.00 |
| WOG    proj.   yield ... (optimal) | 16.14 | 16.14 | 0.00 | 0.00 | 0.00 | 0.00 |
| Breast  proj.  yield ... (optimal) | 6.08 | 6.08 | 0.00 | 0.00 | 0.00 | 0.00 |
| Thighs  proj.  yield .......... | 2.61 | 2.61 | 0.00 | 0.00 | 0.00 | 0.00 |
| Drums   proj.  yield .......... | 2.08 | 2.08 | 0.00 | 0.00 | 0.00 | 0.00 |
| Neck    proj.  yield .......... | 0.97 | 0.97 | 0.00 | 0.00 | 0.00 | 0.00 |
| Wings   proj.  yield .......... | 1.79 | 1.79 | 0.00 | 0.00 | 0.00 | 0.00 |
| Back    proj.  yield .......... | 2.22 | 2.22 | 0.00 | 0.00 | 0.00 | 0.00 |

FIG. 18b

2. OPTIMUM RESULTS FOR FELT1 SEQUENCED BY AGE8          — 176'

| | TOTAL | DATA SETS USED 1757 | 1756 | 1755 | 1754 | 1753 |
|---|---|---|---|---|---|---|
| End Product Optimized | | BODY PARTS | BODY PARTS | BODY PARTS | BODY PARTS | BODY PARTS |
| Strain | | NICHOL.88 | NICHOL.88 | NICHOL.88 | NICHOL.88 | NICHOL.88 |
| Feeding period, day | | 17 | 21 | 21 | 21 | 21 |
| Date Weighed | | 12/17/93 | 12/10/93 | 11/19/93 | 10/29/93 | 10/08/93 |
| Age Weighed | | 115 | 98 | 77 | 56 | 35 |
| Field Weight | | 20.03 | 16.40 | 11.45 | 6.55 | 2.76 |
| Predicted Weight | | 20.03 | 16.40 | 11.45 | 6.55 | 2.76 |
| Weight Variance | | 0.0015 | -2.6455 | 3.0864 | 7.7161 | 6.1729 |
| Feed intake ........ lb/bird_day | | 0.6643 | 0.5774 | 0.4515 | 0.2941 | 0.1513 |
| Feed Intake/Period ...... (optima) | | 97.30 | 102.73 | 81.71 | 53.57 | 27.78 |
| Actual Feed use/Period ...... tons | | 97.30 | 102.73 | 81.71 | 53.57 | 27.78 |
| FC - Live WT ........... (optima) | | 2.23 | 1.98 | 1.74 | 1.58 | 1.50 |
| FC - Field Weight | | 2.23 | 1.98 | 1.74 | 1.58 | 1.50 |
| Std. Litter Moisture/Period ...... % | | 0.00 | 0.00 | 0.00 | 0.00 | 0.00 |
| Field Litter Moisture/Period ..... % | | 0.00 | 0.00 | 0.00 | 0.00 | 0.00 |
| Field Coccidiostat | | COBAN | COBAN | COBAN | COBAN | COBAN |
| Std Ammonia ............... % | | 0.00 | 0.00 | 0.00 | 0.00 | 0.00 |
| Field Ammonia ............. ppm | | 0.00 | 0.00 | 0.00 | 0.00 | 0.00 |
| Temperature Degrees, F | | 75.00 | 85.00 | 82.00 | 87.00 | 90.00 |
| Field Temperature ...... degrees F | | 75.00 | 85.00 | 82.00 | 87.00 | 90.00 |

FIG. 18c

3. OPTIMUM RESULTS FOR FELT1 SEQUENCED BY AGE8 — 178'

| | | TOTAL | DATA SETS USED 1757 | 1756 | 1755 | 1754 | 1753 |
|---|---|---:|---:|---:|---:|---:|---:|
| INPUT PRICES: | | | | | | | |
| Price of whole bird | $/lb | | 0.3000 | 0.0000 | 0.0000 | 0.0000 | 0.0000 |
| Price of Yield | $/lb | | 0.5000 | 0.0000 | 0.0000 | 0.0000 | 0.0000 |
| Price of breast | $/lb | | 1.5000 | 0.0000 | 0.0000 | 0.0000 | 0.0000 |
| Price of thighs | $/lb | | 0.5000 | 0.0000 | 0.0000 | 0.0000 | 0.0000 |
| Price of drums | $/lb | | 0.2000 | 0.0000 | 0.0000 | 0.0000 | 0.0000 |
| Price of neck | $/lb | | 0.1000 | 0.0000 | 0.0000 | 0.0000 | 0.0000 |
| Price of wings | $/lb | | 0.4000 | 0.0000 | 0.0000 | 0.0000 | 0.0000 |
| Price of back | $/lb | | 0.1000 | 0.0000 | 0.0000 | 0.0000 | 0.0000 |
| Price of waste | $/lb | | -0.1000 | 0.0000 | 0.0000 | 0.0000 | 0.0000 |
| SETTLEMENT: | | | | | | | |
| PRICES: | | | | | | | |
| Settlement Price, whole bird | | | 0.0000 | 0.0000 | 0.0000 | 0.0000 | 0.0000 |
| Settlement Price | WOG | | 0.0000 | 0.0000 | 0.0000 | 0.0000 | 0.0000 |
| Settlement Price | Breast | | 0.0000 | 0.0000 | 0.0000 | 0.0000 | 0.0000 |
| Settlement Price | Thighs | | 0.0000 | 0.0000 | 0.0000 | 0.0000 | 0.0000 |
| Settlement Price | Drums | | 0.0000 | 0.0000 | 0.0000 | 0.0000 | 0.0000 |
| Settlement Price | Neck | | 0.0000 | 0.0000 | 0.0000 | 0.0000 | 0.0000 |
| Settlement Price | Wings | | 0.0000 | 0.0000 | 0.0000 | 0.0000 | 0.0000 |
| Settlement Price | Back | | 0.0000 | 0.0000 | 0.0000 | 0.0000 | 0.0000 |
| Settlement Price | Waste | | 0.0000 | 0.0000 | 0.0000 | 0.0000 | 0.0000 |
| TOTAL POUNDS: | | | | | | | |
| Whole brd proj. yield | | 325,654.51 | 325,654.51 | 0.00 | 0.00 | 0.00 | 0.00 |
| Whl brd actual yield | | 0.00 | 0.00 | 0.00 | 0.00 | 0.00 | 0.00 |
| WOG proj. yield (optima) | | 268,976.05 | 268,976.05 | 0.00 | 0.00 | 0.00 | 0.00 |
| WOG actual yield | | 0.00 | 0.00 | 0.00 | 0.00 | 0.00 | 0.00 |
| Breast proj. yield (optima) | | 101,279.29 | 101,279.29 | 0.00 | 0.00 | 0.00 | 0.00 |
| Breast actual yield | | 0.00 | 0.00 | 0.00 | 0.00 | 0.00 | 0.00 |
| Thighs proj. yield | | 43,459.24 | 43,459.24 | 0.00 | 0.00 | 0.00 | 0.00 |
| Thighs actual yield | | 0.00 | 0.00 | 0.00 | 0.00 | 0.00 | 0.00 |
| Drums proj. yield | | 34,677.22 | 34,677.22 | 0.00 | 0.00 | 0.00 | 0.00 |
| Drums actual yield | | 0.00 | 0.00 | 0.00 | 0.00 | 0.00 | 0.00 |
| Neck proj. yield | | 16,187.53 | 16,187.53 | 0.00 | 0.00 | 0.00 | 0.00 |
| Neck actual yield | | 0.00 | 0.00 | 0.00 | 0.00 | 0.00 | 0.00 |
| Wings proj. yield | | 29,888.98 | 29,888.98 | 0.00 | 0.00 | 0.00 | 0.00 |
| Wings actual yield | | 0.00 | 0.00 | 0.00 | 0.00 | 0.00 | 0.00 |
| Back proj. yield | | 36,984.44 | 36,984.44 | 0.00 | 0.00 | 0.00 | 0.00 |
| Back actual yield | | 0.00 | 0.00 | 0.00 | 0.00 | 0.00 | 0.00 |
| Waste of carcass | | 63,177.81 | 63,177.81 | 0.00 | 0.00 | 0.00 | 0.00 |
| Waste actual yield | | 0.00 | 0.00 | 0.00 | 0.00 | 0.00 | 0.00 |

FIG. 18d

4. OPTIMUM RESULTS FOR FELT1 SEQUENCED BY AGEB — 180'

|  | TOTAL | DATA SETS USED 1757 | 1756 | 1755 | 1754 | 1753 |
|---|---|---|---|---|---|---|
| PER FLCK BASIS: | | | | | | |
| Beginning age, day | | 98 | 77 | 56 | 35 | 14 |
| Feeding period, day | | 17 | 21 | 21 | 21 | 21 |
| Ending age ............ day | | 115 | 98 | 77 | 56 | 35 |
| Live Wt ............ (optimal) | | 20.03 | 16.40 | 11.45 | 6.55 | 2.76 |
| Bird Size, Shrink Wt ...... (optimal) | | 19.54 | 0.00 | 0.00 | 0.00 | 0.00 |
| Shrink (6 hr. fast) ........... % | | 2.44 | 0.00 | 0.00 | 0.00 | 0.00 |
| FC - Live Wt ........... (optimal) | | 2.23 | 1.98 | 1.74 | 1.58 | 1.50 |
| FC Shrink Wt .......... (optimal) | | 2.28 | 0.00 | 0.00 | 0.00 | 0.00 |
| FC - Post Chill W.O.G. .... (optimal) | | 2.75 | 0.00 | 0.00 | 0.00 | 0.00 |
| FC - Disassembled Total Parts ..... | | 2.82 | 0.00 | 0.00 | 0.00 | 0.00 |
| Predicted Fd use/period ...... tons | 369.72 | 97.30 | 102.73 | 81.71 | 53.57 | 27.78 |
| Actual Feed use/Period ....... tons | 369.72 | 97.30 | 102.73 | 81.71 | 53.57 | 27.78 |
| Feed Cost/Ton Ave ..... (optimal) | | 141.45 | 146.52 | 151.67 | 155.69 | 153.50 |
| Feed Cost/Period ....... (optimal)$ | | 12,380.60 | 14,177.38 | 12,040.94 | 8,415.28 | 4,242.99 |
| Total feed needed .......... tons | | 369.72 | 272.42 | 169.69 | 87.97 | 34.40 |
| Ration cost ............. $/ton | | 127.24 | 138.01 | 147.35 | 157.09 | 152.73 |
| Cumulative Feed Cost ......... $ | | 52,295 | 39,915 | 25,737 | 13,696 | 5,281 |
| Total feed cost ............. $ | 52,295.27 | 12,380.60 | 14,177.38 | 12,040.94 | 8,415.28 | 4,242.99 |
| Feed Cost/LB Live Wt ..... (optimal) | | 0.1567 | 0.1441 | 0.1309 | 0.1208 | 0.1099 |

FIG. 18e

5. OPTIMUM RESULTS FOR FELT1 SEQUENCED BY AGEB —182'

| | | DATA SETS USED | | | | |
|---|---|---|---|---|---|---|
| | TOTAL | 1757 | 1756 | 1755 | 1754 | 1753 |
| Feed Intake .......... lb/bird_day | | 0.6643 | 0.5774 | 0.4515 | 0.2941 | 0.1513 |
| DAILY INTAKE: | | | | | | |
| ME intake ............. kcal/day | | 1,068.49 | 902.52 | 671.85 | 420.26 | 210.25 |
| Calcium intake .......... gm/day | | 2.4839 | 2.5850 | 2.2870 | 1.7047 | 0.9847 |
| Inorg Phos intake ......... gm/day | | 1.2420 | 1.2925 | 1.1435 | 0.8523 | 0.4924 |
| Meth and cys intake ....... gm/day | | 2.1339 | 2.3137 | 2.1967 | 1.6344 | 0.8266 |
| Lysine ................. gm/day | | 2.3287 | 2.6232 | 2.5824 | 2.0388 | 1.0021 |
| PERCENT: | | | | | | |
| Metabolizable Energy ...... kcal/kg | | 3,546.02 | 3,445.73 | 3,280.52 | 3,149.98 | 3,062.89 |
| Calcium ............ % of intake | | 0.8244 | 0.9869 | 1.1167 | 1.2777 | 1.4345 |
| Inorg Phos .......... % of intake | | 0.4122 | 0.4935 | 0.5584 | 0.6389 | 0.7173 |
| Methionine + cys ..... % of intake | | 0.7082 | 0.8834 | 1.0726 | 1.2250 | 1.2041 |
| Lysine ............. % of intake | | 0.7728 | 1.0015 | 1.2610 | 1.5282 | 1.4599 |

6.RESOURCS RESULTS FOR FELT1 SEQUENCED BY AGEB

|  | TOTAL | DATA SETS USED 1757 | 1756 | 1755 | 1754 | 1753 |
|---|---|---|---|---|---|---|
| Blood meal (ton) | 4.9468 | 0.9331 | 1.0899 | 1.0003 | 1.1607 | 0.5973 |
| Corn, ground yellow (ton) | 235.0334 | 72.2632 | 67.9659 | 47.8742 | 27.8688 | 15.5250 |
| DL_methionine 99% (ton) | 1.0371 | 0.1625 | 0.2575 | 0.2742 | 0.2133 | 0.1035 |
| Animal/vegetable fat (ton) | 17.4974 | 6.0777 | 6.0195 | 3.5110 | 1.6205 | 0.2352 |
| Feather meal (ton) | 7.7409 | 1.6622 | 2.0117 | 1.8045 | 1.3169 | 0.7524 |
| L_lysine 78.4% (ton) | 0.0277 | 0.0200 | 0.0077 | 0.0000 | 0.0000 | 0.0000 |
| Limestone, grnd (ton) | 1.4526 | 0.3930 | 0.3966 | 0.3061 | 0.1958 | 0.1334 |
| Meat and bone meal (ton) | 29.4610 | 5.8822 | 7.7279 | 7.0536 | 5.3570 | 2.7780 |
| Mono_dibasic phosphate (ton) | 0.0280 | 0.0000 | 0.0000 | 0.0000 | 0.0000 | 0.0280 |
| Poultry by_products (ton) | 1.6298 | 0.0000 | 0.0000 | 0.0000 | 0.1873 | 1.1269 |
| Salt (ton) | 0.5044 | 0.1544 | 0.1376 | 0.0862 | 0.0819 | 0.0368 |
| Soybean meal 47.5% (ton) | 70.3590 | 9.7543 | 17.1129 | 19.8045 | 15.5680 | 6.4637 |

FIG. 18g

7. OPTIMUM RESULTS FOR FELT1 SEQUENCED BY AGEB — 186'

| | TOTAL | DATA SETS USED 1757 | 1756 | 1755 | 1754 | 1753 |
|---|---|---|---|---|---|---|
| End Product Optimized | | BODY PARTS | BODY PARTS | BODY PARTS | BODY PARTS | BODY PARTS |
| Strain | | NICHOL.88 | NICHOL.88 | NICHOL.88 | NICHOL.88 | NICHOL.88 |
| Number of diets to be fed | 6 | 1 | 1 | 1 | 1 | 1 |
| Flock sex (hens or toms) | | HEN | HEN | HEN | HEN | HEN |
| Beginning age, day | | 98 | 77 | 56 | 35 | 14 |
| Feeding period, day | | 17 | 21 | 21 | 21 | 21 |
| Ending age ........ day | | 115 | 98 | 77 | 56 | 35 |
| Temperature Degrees, F | | 75.00 | 85.00 | 82.00 | 87.00 | 90.00 |
| Humidity, % | | 65.00 | 65.00 | 65.00 | 65.00 | 65.00 |
| Brd Mktg. Age Dys ...... (optima) | | 115 | 0 | 0 | 0 | 0 |
| Bird density sqft/bd ...... (optima) | | 2.40 | 0.00 | 0.00 | 0.00 | 0.00 |
| Start Bird Number ....... (optima) | | 18,201 | 18,201 | 18,201 | 18,201 | 18,201 |
| Bird number at processing | | 16,667 | 0 | 0 | 0 | 0 |
| Projected mortality ........... % | | 8.44 | 7.21 | 5.60 | 5.00 | 4.40 |
| Bird Size, Shrink Wt ...... (optima) | | 19.54 | 0.00 | 0.00 | 0.00 | 0.00 |
| Feed intake .......... lb/bird_day | | 0.6643 | 0.5774 | 0.4515 | 0.2941 | 0.1513 |
| FC - Live WT ........... (optima) | | 2.23 | 1.98 | 1.74 | 1.58 | 1.50 |
| IN LB BASIS: | | | | | | |
| Six hour fast weight ...... (optima) | 19.54 | 19.54 | 0.00 | 0.00 | 0.00 | 0.00 |
| WOG proj. yield ... (optima) | 16.14 | 16.14 | 0.00 | 0.00 | 0.00 | 0.00 |
| Breast proj. yield ... (optima) | 6.08 | 6.08 | 0.00 | 0.00 | 0.00 | 0.00 |
| Thighs proj. yield ......... | 2.61 | 2.61 | 0.00 | 0.00 | 0.00 | 0.00 |
| Drums proj. yield ......... | 2.08 | 2.08 | 0.00 | 0.00 | 0.00 | 0.00 |
| Neck proj. yield ......... | 0.97 | 0.97 | 0.00 | 0.00 | 0.00 | 0.00 |
| Wings proj. yield ......... | 1.79 | 1.79 | 0.00 | 0.00 | 0.00 | 0.00 |
| Back proj. yield ......... | 2.22 | 2.22 | 0.00 | 0.00 | 0.00 | 0.00 |
| Waste of carcass ............. | 3.79 | 3.79 | 0.00 | 0.00 | 0.00 | 0.00 |

FIG. 19

```
                              THE WALA GROUP RATION REPORT (short form)
        RATION ID #   38 using BROIL_NL  model was formulated on 8/31/94 at 4:02PM for FLOCK      code TEST4

CLIENT: Rhone Poulenc              ENTERPRISE: TEST4                    FLOCK    : TEST4
=============================================================================================================
                                     PERFORMANCE/PRODUCTION VARIABLES
              DESCRIPTION                       VALUE         DESCRIPTION                       VALUE
              -----------                       -----         -----------                       -----

Diet........................    FINISHER        Age weighed, days............        0
              Placement Date..............    8/01/94         Bird number in B.P.U.........        0
              Male.......................%      50.00         Average field body weight, lb.   0.0000
              Female ....................%      50.00         Number of birds being weighed.       0
              Strain......................    AA*PETSN        Stndrd devition of bird weight   0.0000
              End Product Optimized.......    LIVE BIRD       ...............FLOCK CONDITION   ..........
              B.P.U. floor space......sqft     100,000        Number of diets being fed....        3
              Time period between cycle, day       14         Temperature.........degrees F    80.00
              Using nutrient digestibility..    A) NO         Humidity, %..................    65.00
              Feed form...................    B) PELLETS     Periods.................(dys)       14
              Feed milling cost, $/ton....     0.0000         No. of Birds placed...(optima)  156,813
              Feed delivery cost, $/ton...     0.0000         Ave bird number in period....   149,592
              Feed/Period.............tons     258.91         Bird Density sqft/bd..(optima)   0.0000
              Breast blister price reductn,%    0.00          Bird Mktg. Age Dys....(optima)       0
              Hours of fast prior to process   10.00          .......... PERIOD PERFORMANCE   ..........
              Age at Feed Delivery....(dys)      21           Live Wt..............(optima)      3.35
              ...........field Flock checks  ..........       Feed intake, lb/bird_day.....    0.2473
              Diet no. to start for optimztn     1

=============================================================================================================
                                                    |         RATION DATA
                                                    |
INGREDIENT     AMOUNT OF    COST    COST IN   % OF  |                          AMOUNT OF
SHORT NAME     INGREDIENT   PER CWT RATION   RATION |    NUTRIENT NAME         NUTRIENT  UNITS     NIPD     UNITS
----------     ----------   ------- ------   ------ |    -------------         --------  -----     ----     -----
*CORN........ 1284.4016    5.6600   72.6971   64.22 | METABOLIZABLE ENERGY.... 2  3260.959 KC/KG    355.081
SOYMEAL (47.5). 390.2688  10.7600   41.9929   19.51 | PROTEIN (CRUDE)........  1    20.531 -PCT-  22356.166
POULTRY B/P.... 180.0000  13.1700   23.7060    9.00 | CALCIUM................ 14     0.963 -PCT-   1049.075 MG/KG
LIME (FINE)....   6.9616   1.1600    0.0808    0.35 | PHOSPHORUS (INORGANIC). 16     0.482 -PCT-    524.537
PHOS/DEFLOR P18  22.6039  12.0000    2.7125    1.13 | SODIUM................. 21     0.199 -PCT-    216.657
CHOLINE (70%)..   2.2680  44.0000    0.9979    0.11 | METHIONINE............. 51     0.642 -PCT-    699.282
L-LYSINE (78)..   1.3843 118.0000    1.6334    0.07 | METHIONINE + CYSTINE... 53     0.955 -PCT-   1039.903
RHODIMET-88 %     6.1830 120.0000    7.4196    0.31 | LYSINE................. 54     1.086 -PCT-   1182.082
SALT...........   3.9289   2.0000    0.0786    0.20 | ARGININE............... 55     1.415 -PCT-   1541.241 -PCT-
FAT (AN/VEG)... 100.0000  13.8500   13.8500    5.00 | TRYPTOPHAN............. 56     0.221 -PCT-    240.829
GROWER VIT PM     1.0000 311.0000    3.1100    0.05 | THREONINE.............. 63     0.813 -PCT-    884.840
TRACE MINERAL     1.0000  23.7700    0.2377    0.05 | LINOLEIC ACID (18-2)... 83     1.664 -PCT-   1811.845
                                                    | XANTHOPHYLL............ 91    13.573 MG/KG     1.478
              ----------           ---------  ------|
      TOTAL    2000.0000           168.5164  100.00 |

* by name means Nutrilab(tm) values used for ration |
=============================================================================================================
WG Index =  0.000055                                |      UNUSED             COST PER CWT
                                                    |      INGREDIENT        ACTUAL   REQUIRED
                                                    |      ----------        ------   --------
                                                    |      PROPAK-NEW        16.4500    9.3297
```

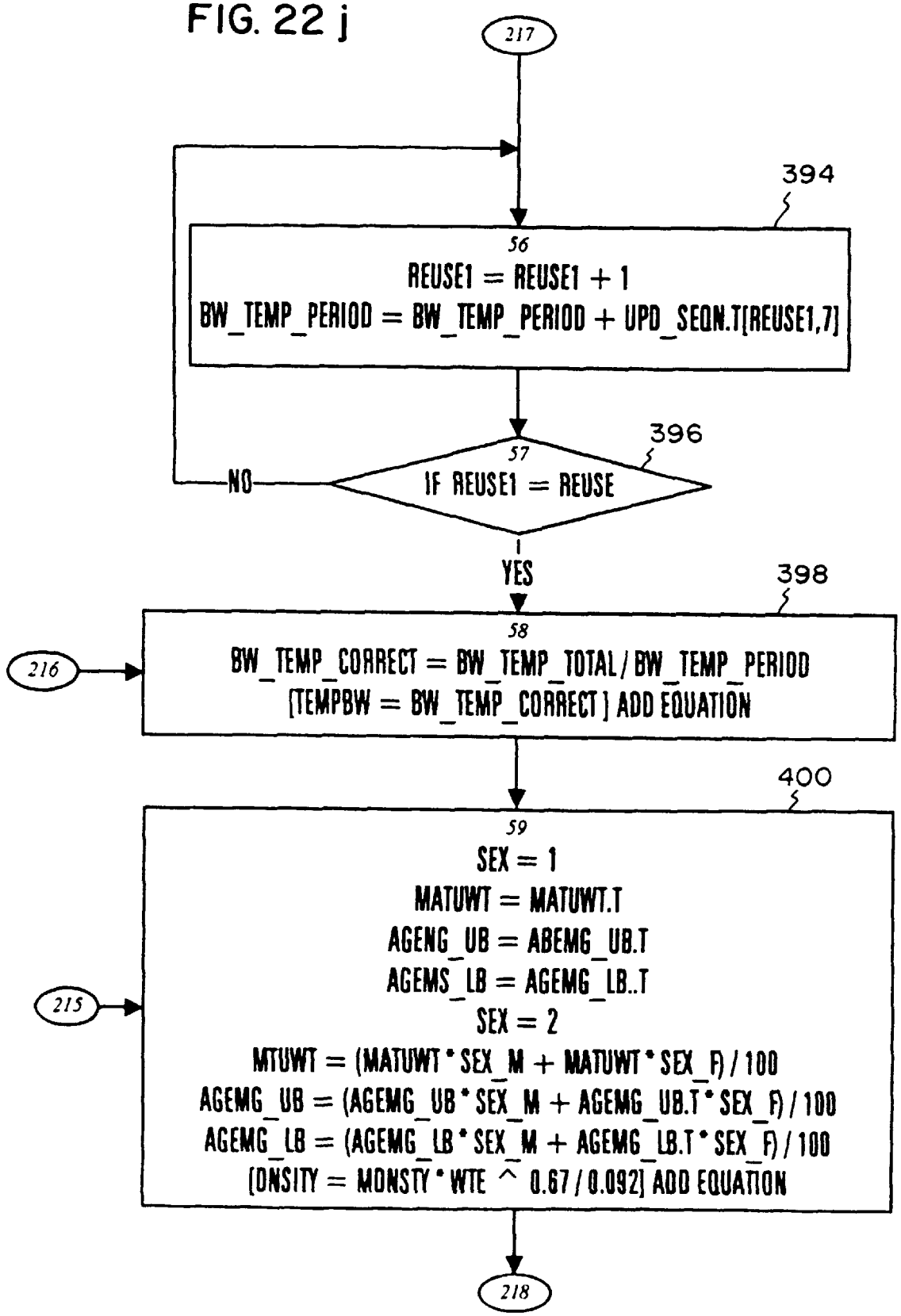

FIG. 22 t

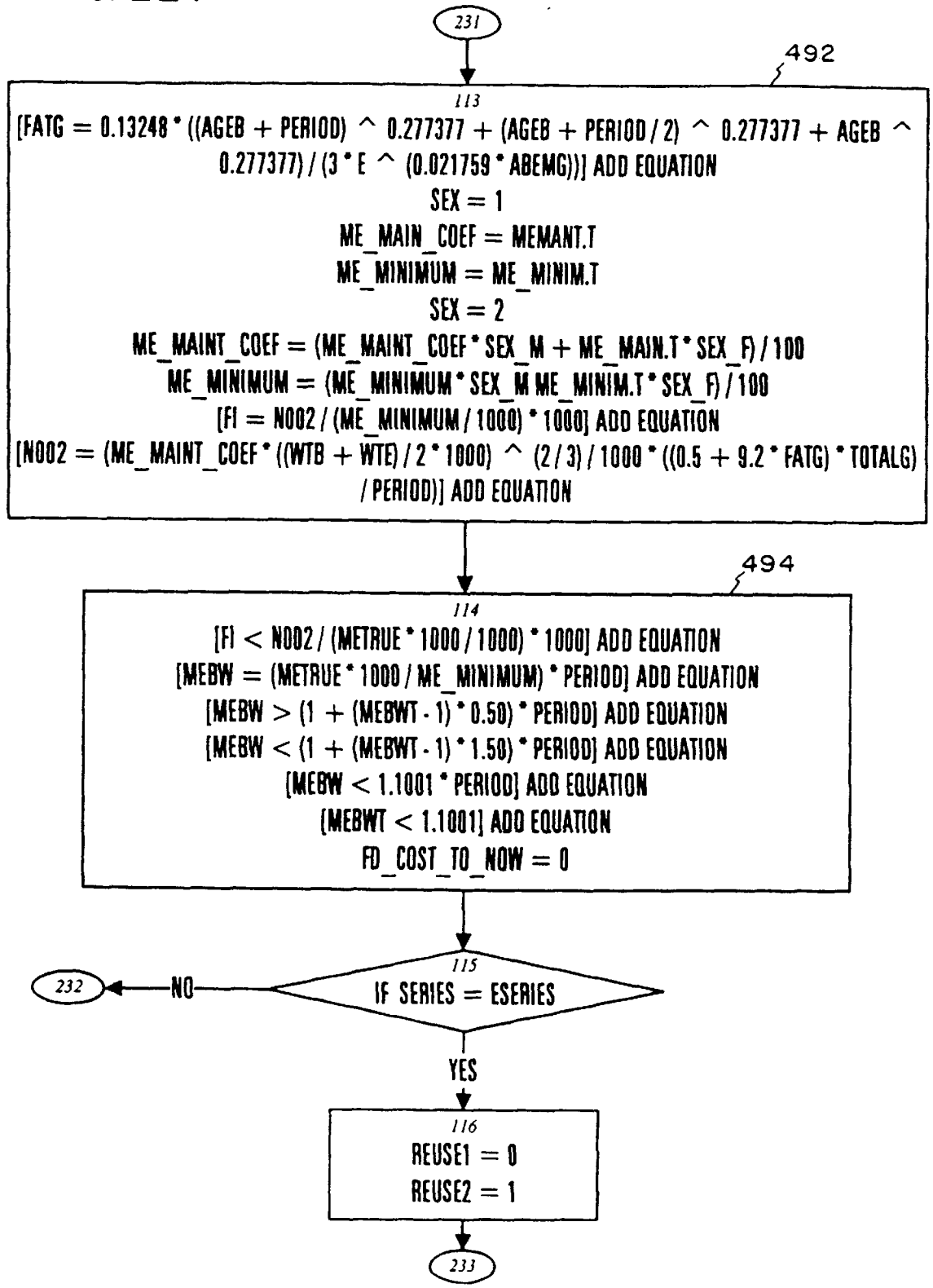

(231) →

492 / 113
[FATG = 0.13248 * ((AGEB + PERIOD) ^ 0.277377 + (AGEB + PERIOD / 2) ^ 0.277377 + AGEB ^ 0.277377) / (3 * E ^ (0.021759 * ABEMG))] ADD EQUATION
SEX = 1
ME_MAIN_COEF = MEMANT.T
ME_MINIMUM = ME_MINIM.T
SEX = 2
ME_MAINT_COEF = (ME_MAINT_COEF * SEX_M + ME_MAIN.T * SEX_F) / 100
ME_MINIMUM = (ME_MINIMUM * SEX_M ME_MINIM.T * SEX_F) / 100
[FI = N002 / (ME_MINIMUM / 1000) * 1000] ADD EQUATION
[N002 = (ME_MAINT_COEF * ((WTB + WTE) / 2 * 1000) ^ (2/3) / 1000 * ((0.5 + 9.2 * FATG) * TOTALG) / PERIOD)] ADD EQUATION

494 / 114
[FI < N002 / (METRUE * 1000 / 1000) * 1000] ADD EQUATION
[MEBW = (METRUE * 1000 / ME_MINIMUM) * PERIOD] ADD EQUATION
[MEBW > (1 + (MEBWT - 1) * 0.50) * PERIOD] ADD EQUATION
[MEBW < (1 + (MEBWT - 1) * 1.50) * PERIOD] ADD EQUATION
[MEBW < 1.1001 * PERIOD] ADD EQUATION
[MEBWT < 1.1001] ADD EQUATION
FD_COST_TO_NOW = 0

115
IF SERIES = ESERIES
— NO → (232)
YES ↓

116
REUSE1 = 0
REUSE2 = 1

↓ (233)

FIG. 22 a-a
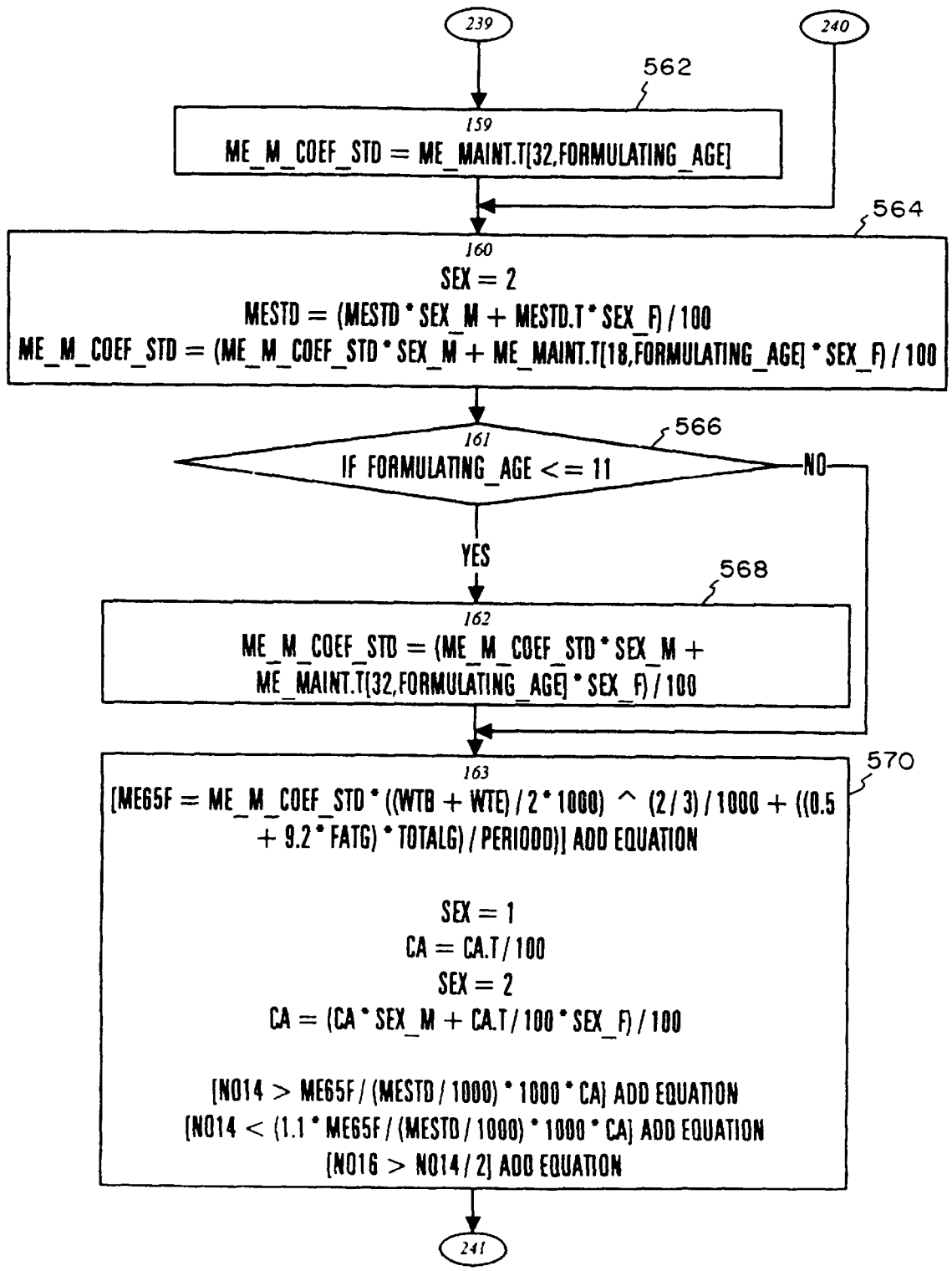

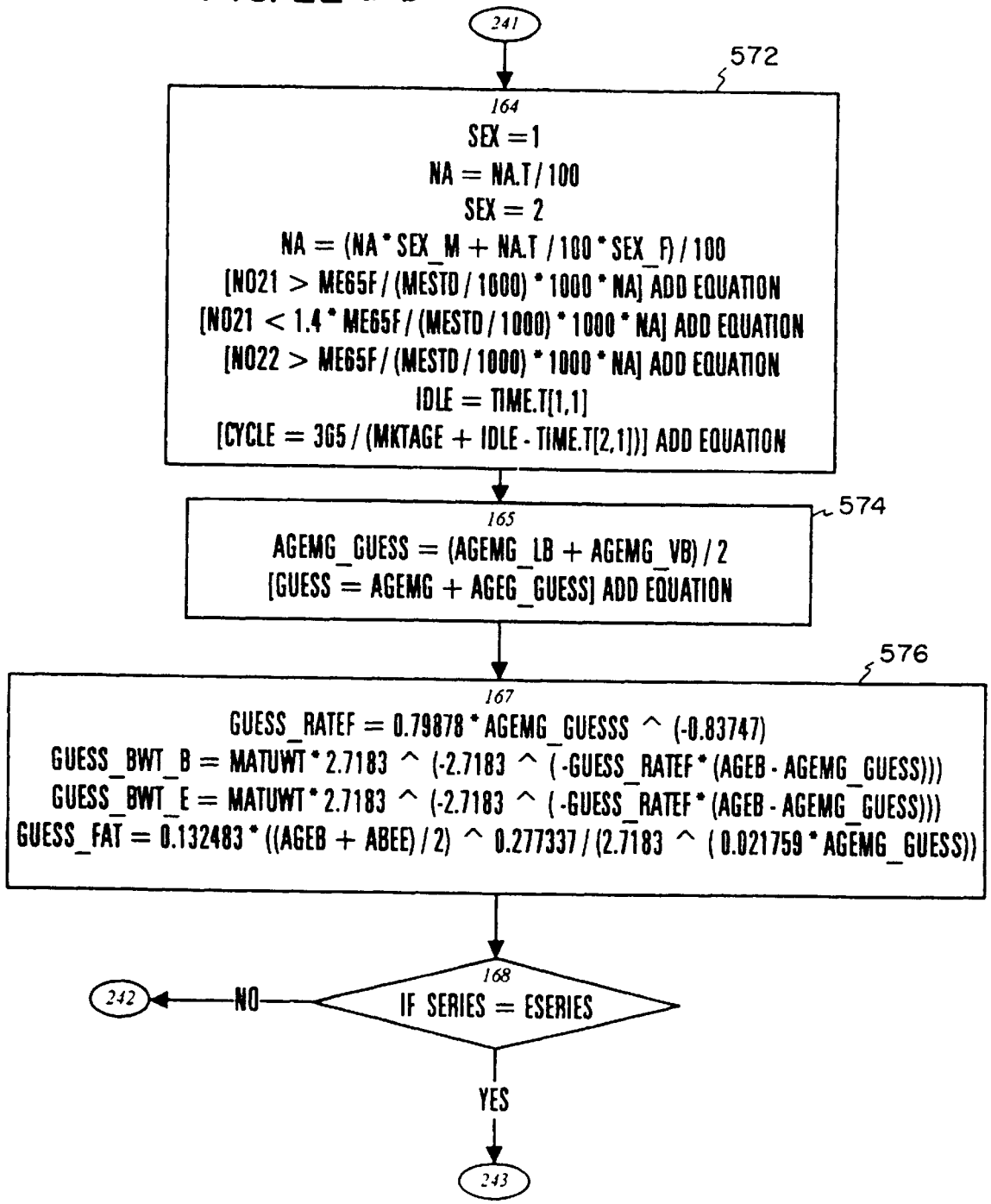
FIG. 22 a-b

FIG. 22 a-c
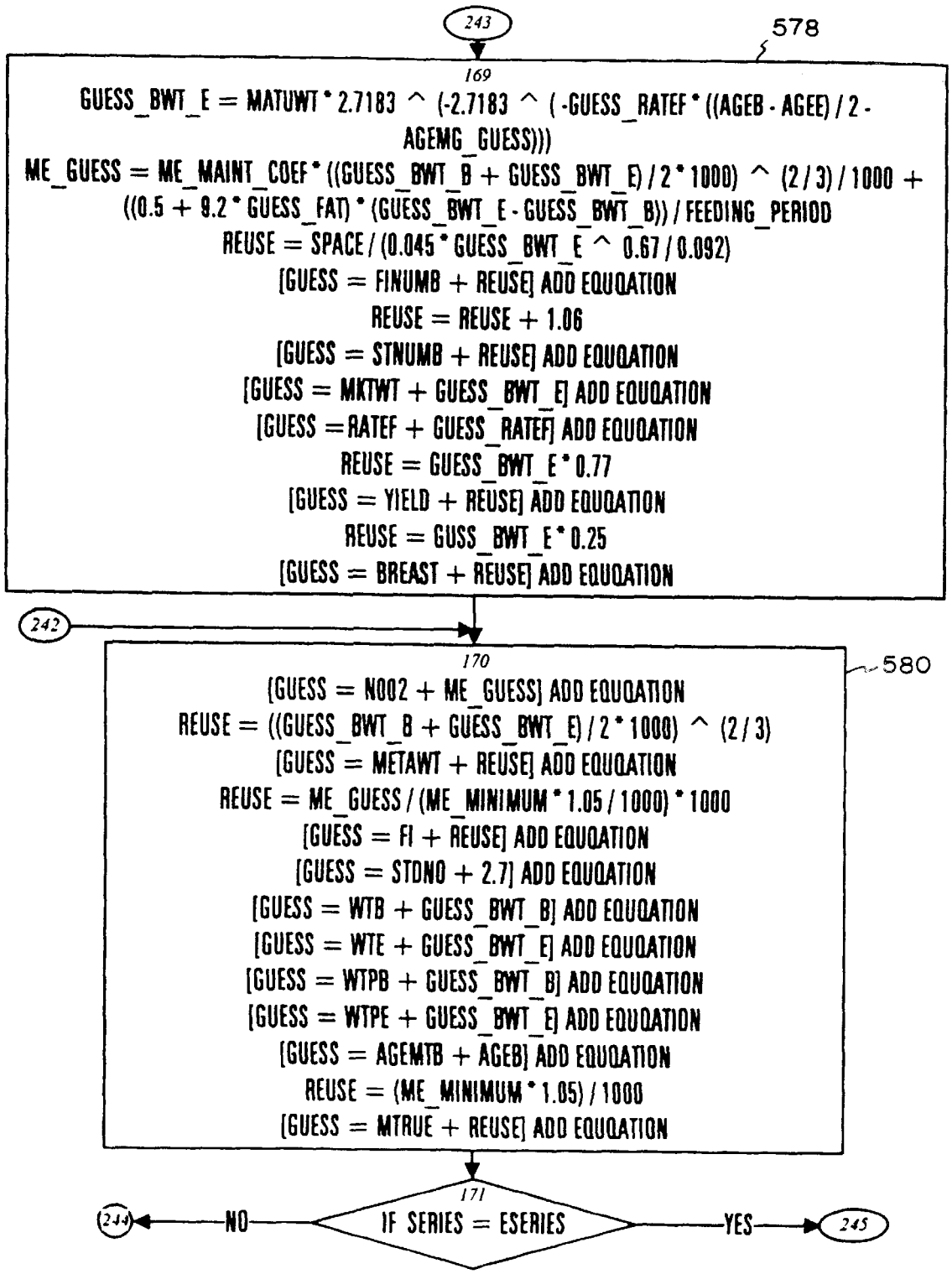

FIG. 22 a-d
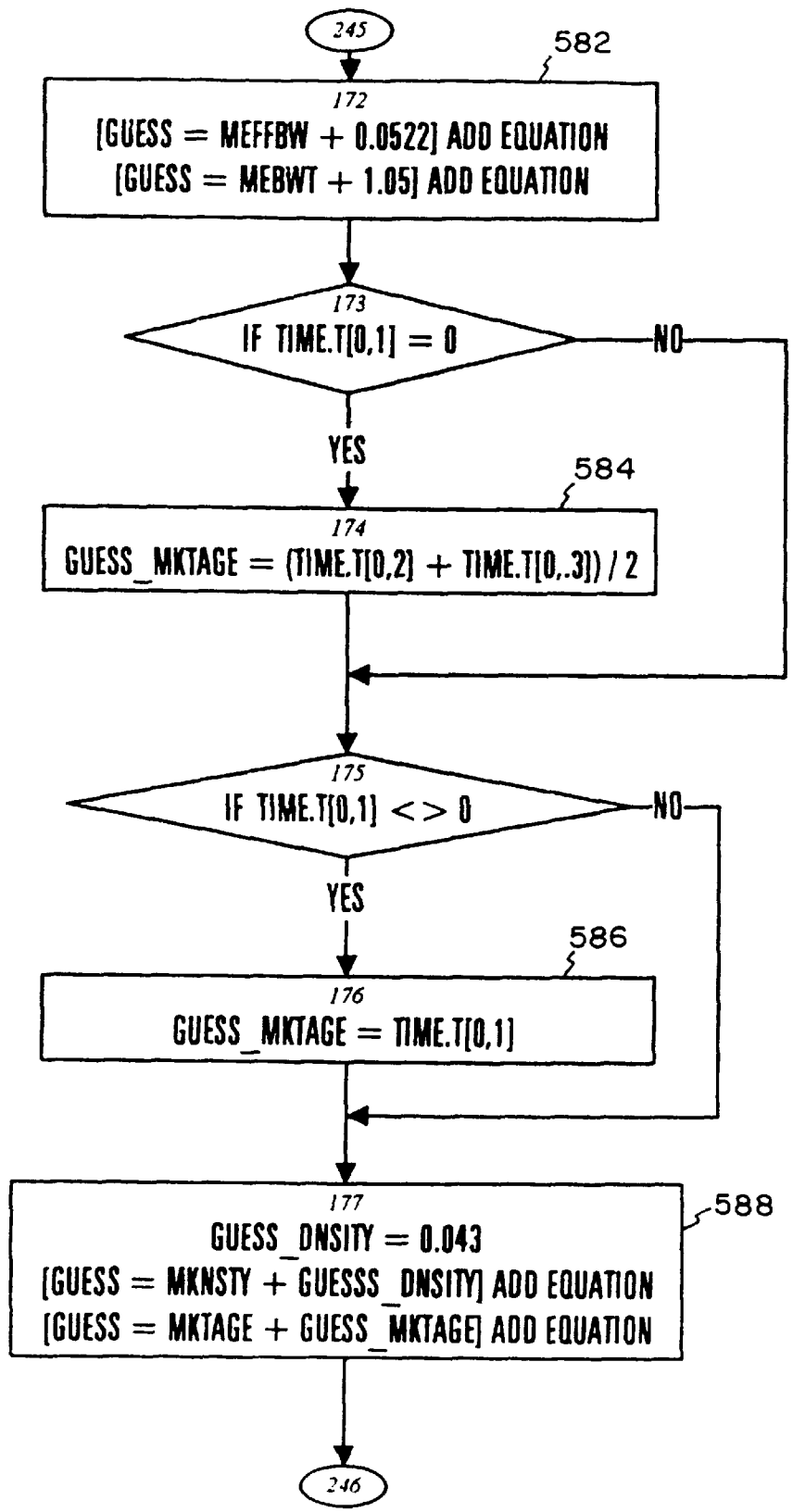

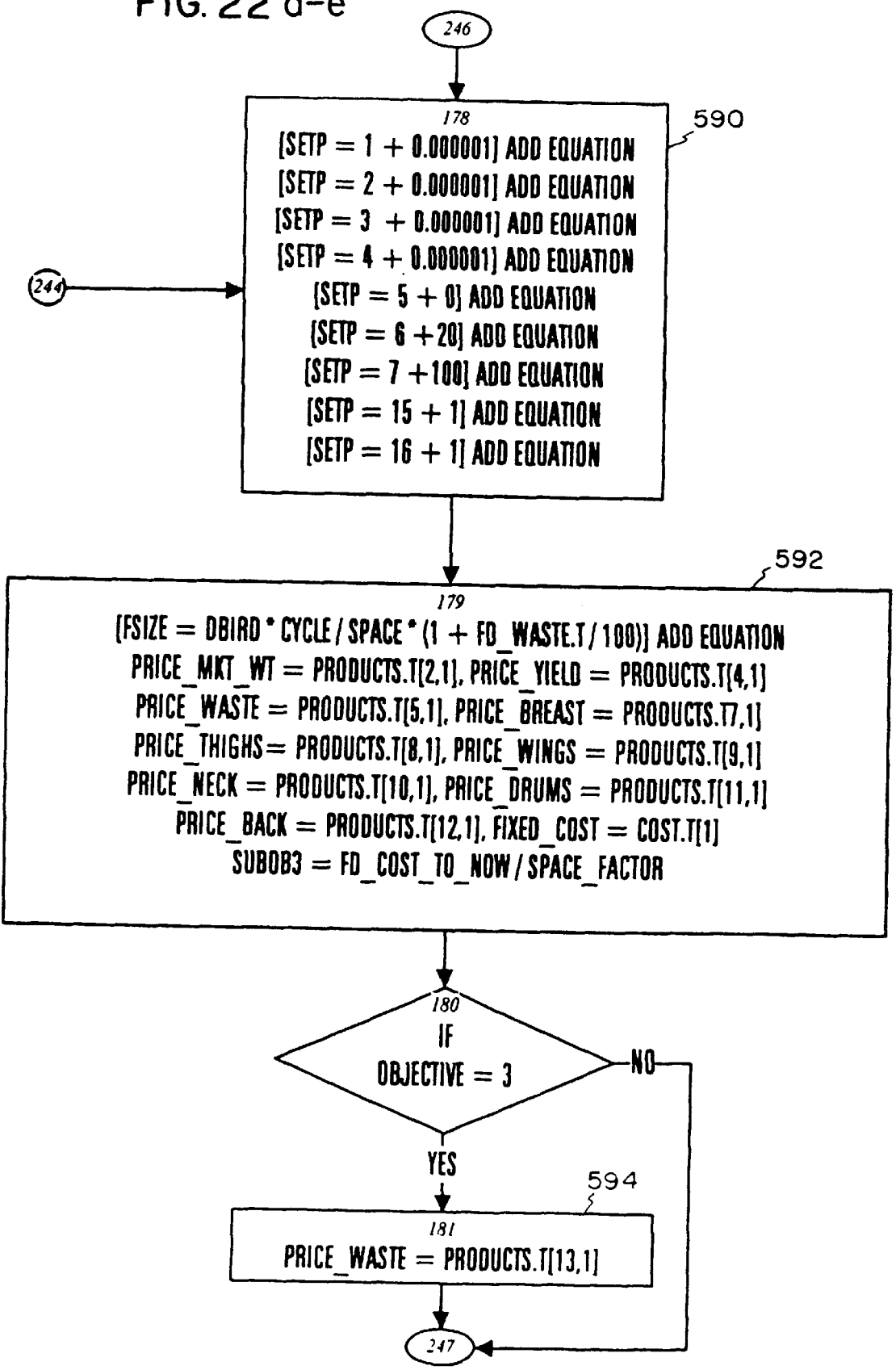
FIG. 22 a-e

FIG. 22 a-f
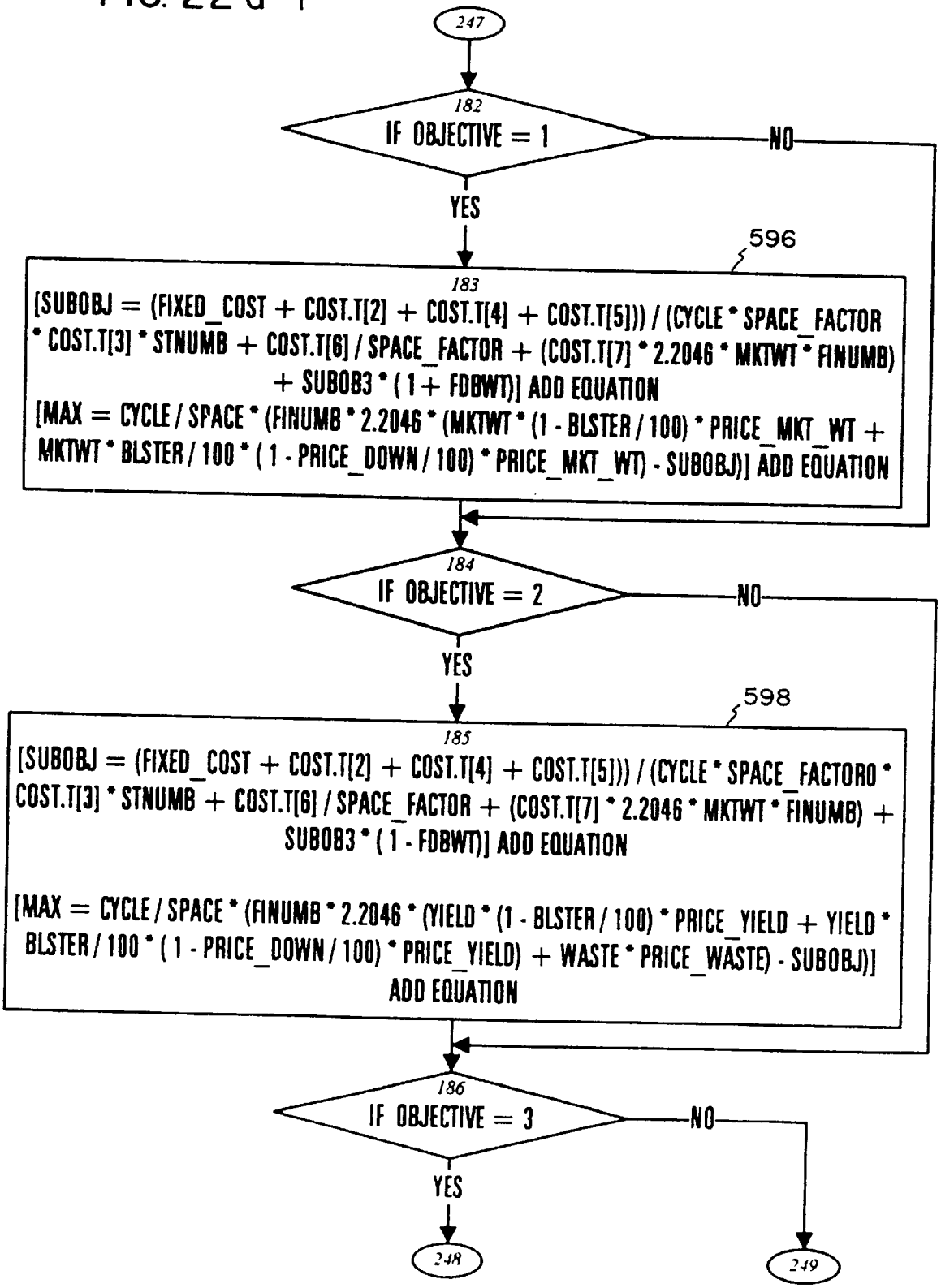

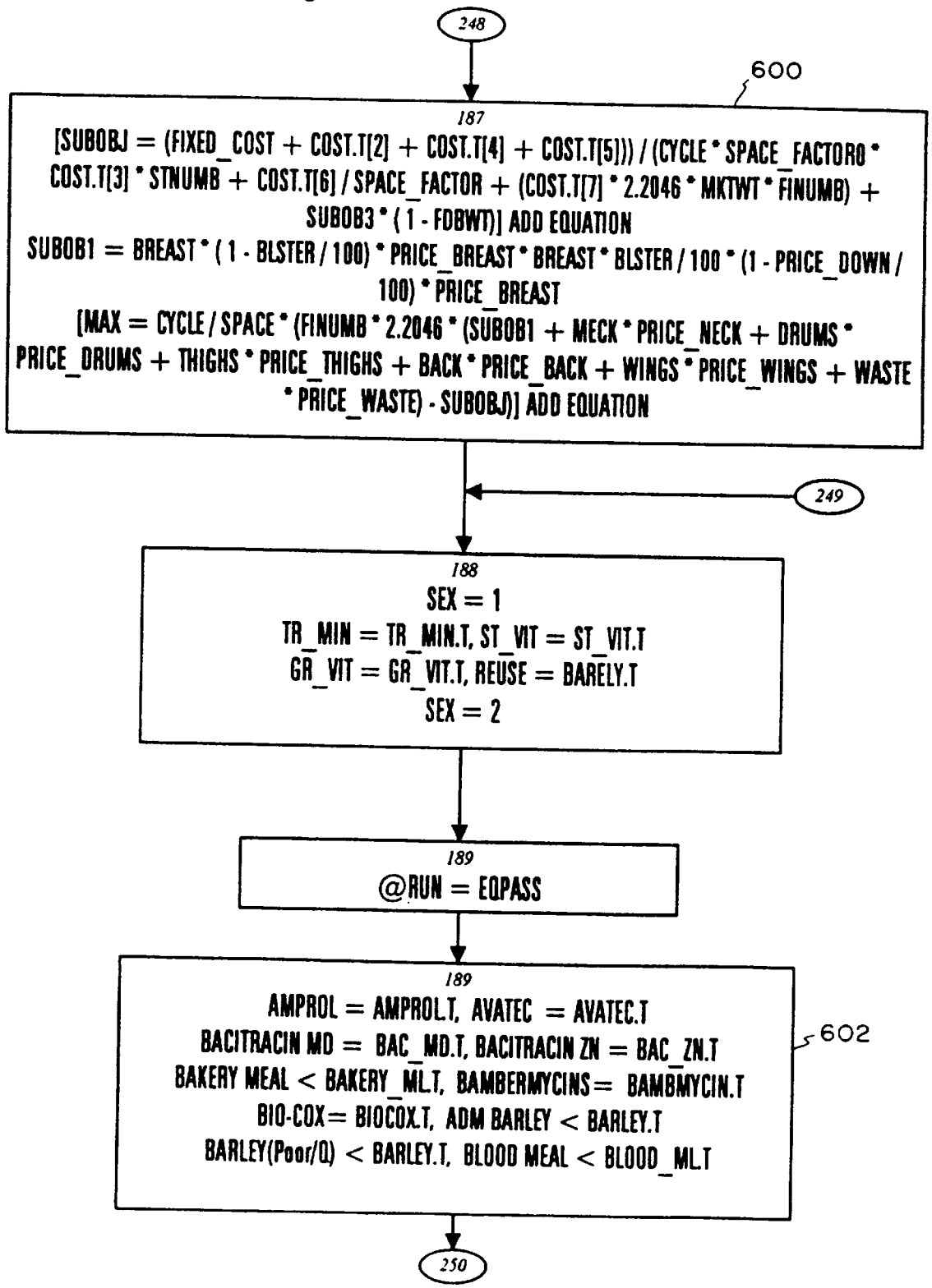
FIG. 22a-g

FIG. 22 a-h
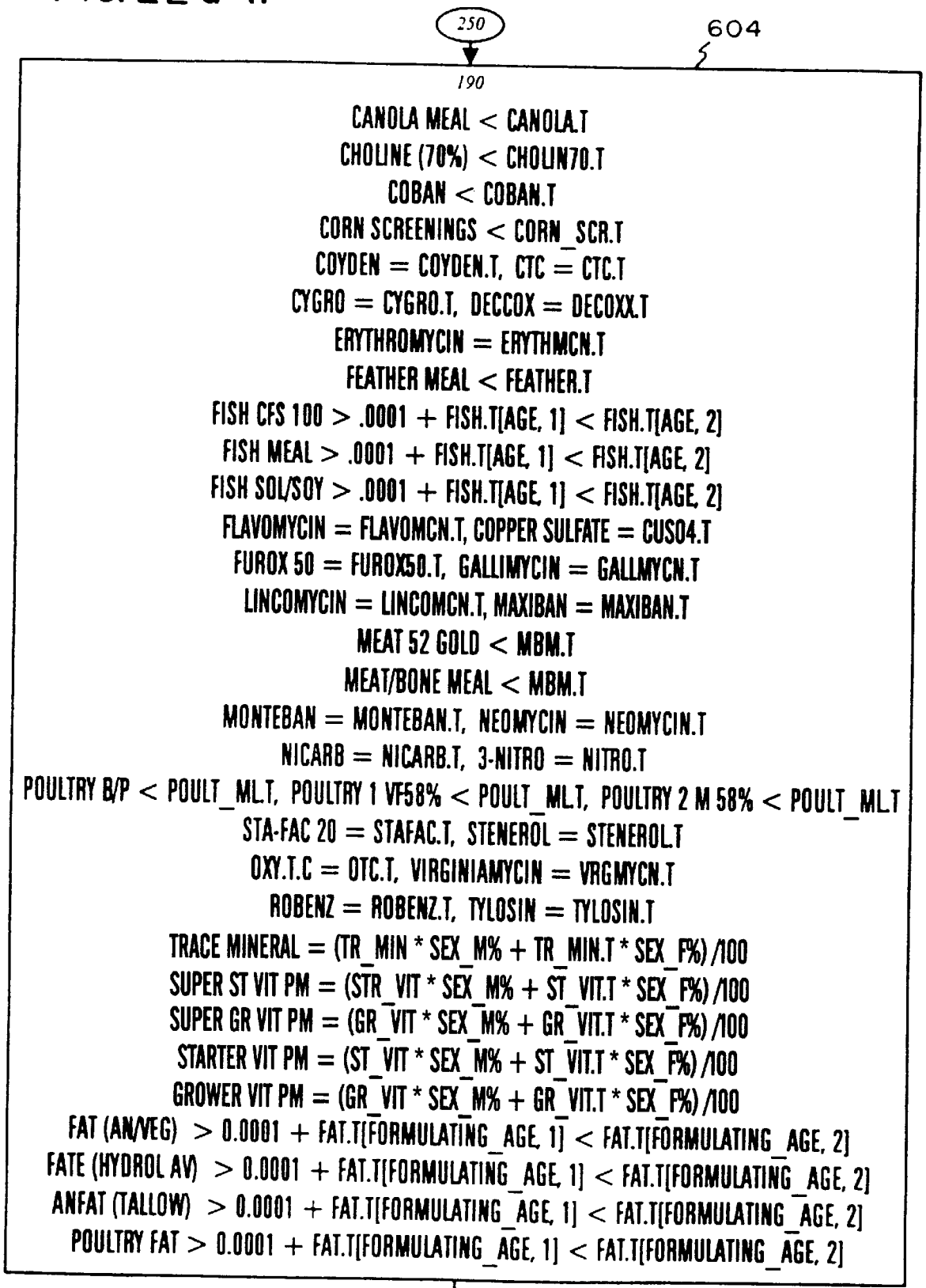

FIG. 22 a-i
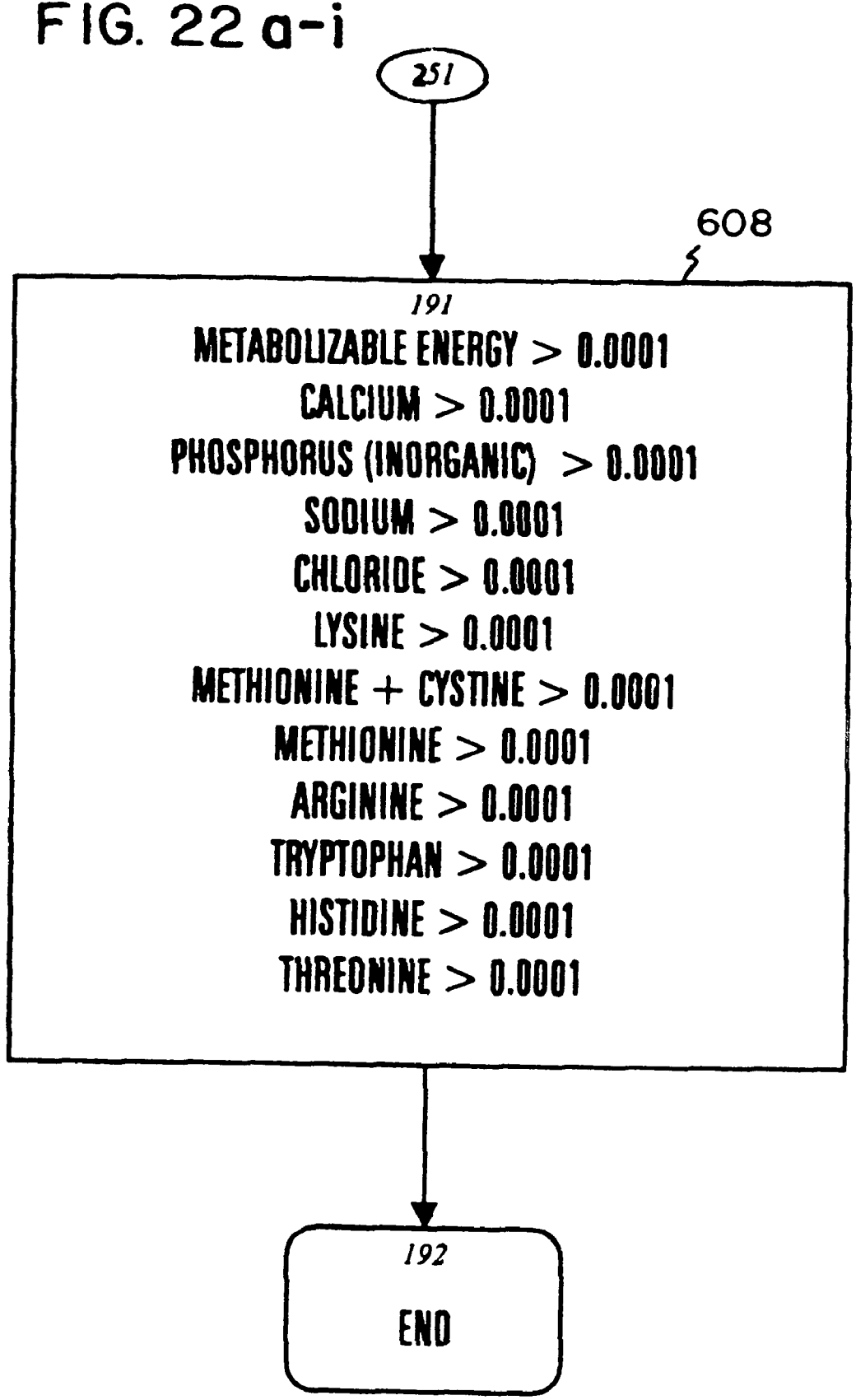

UTILIZATION EFFECTIVENESS OF NUTRIENTS IN A POPULATION

REFERENCE TO CO-PENDING APPLICATIONS

The present application is a continuation-in-part of U.S. application Ser. No. 08/345,210, filed Nov. 28, 1994, now abandoned which is a file wrapper continuation of U.S. application Ser. No. 08/125,454, filed on Sep. 22, 1993, pending.

TECHNICAL FIELD

This invention relates generally to animal growth, managed environment pollution control and more specifically to feeding a population of animals so that the utilization effectiveness of the nutrients in the feed is optimized and conserved.

BACKGROUND

How animals grow and how they should be fed so as to maximize enterprise economics and manage accelerated animal raising environmental pollution; are questions animal scientists have attempted to address for a long time. Further, due to genetic improvements, changes in living environments and economic factors, the animals are not necessarily fed to reach the same body size or have the same growth rate from one time period to another. In view of these complexities, it is challenging to meet both market requirements and maximize the business margins at various genetic and environmental conditions. One method, considered by many to be the best way to solve the foregoing problems is nutrition modeling. Such modeling is attractive due to its nature of describing the relationship between nutrients and animal growth under different genetic and environmental conditions.

Those skilled in the art will appreciate that the efficiency of nutrient utilization (i.e., the proportion of digestible nutrient that can be biologically utilized by an animal for tissue synthesis and other metabolic functions) is one of the most important factors influencing growth model accuracy. However, due to variations in results from experiment to experiment, as well as the many approaches in interpreting the results, a single nutrient efficiency value of a dietary amino acid often has a broad range. In one study, for example, the efficiency value of a dietary amino acid for body tissue protein deposition of poultry ranged from 75% to 85%. These large discrepancies in nutrient efficiency rates contributes to large secondary errors in animal growth model construction. Rigid (singular) nutrient efficiency values have been used for model construction in the past (e.g., Fisher, C. 1983, The physiological basis of the amino acid requirements of poultry. In: Protein Metabolism and Nutrition (editors M. Arnal, R. Pion and D. Bouin), Proc IV Int. Sym., Clermont-Ferrand. Vol. 1, pp. 385–404. Les colloques de l'INRA, No. 16; and Talpaz H., J. R. de la Torre, P. J. H. Sharpe, and S. Hurwitz, 1986, "Dynamic optimization model for feeding Boilers," *Agricultural Systems,* 20:121–132).

One of the major reasons for the large differences in nutrient efficiency value is that animals are fed on a population basis. Thus, each individual animal has its own growth potential and its own nutrient requirement to meet that potential. When these diverse individual animals are assembled together in a flock, herd, school of fishes, etc., the resultant population average of nutrient efficiency of utilization depends on the intra-population variation of individual animal nutrient requirements and associated dietary nutrient level of a tested population. The results of these tests were that higher dietary nutrient levels fed to animals resulted in lower nutrient efficiency. The reason for the lower efficiency was that the nutrient requirement for a larger proportion of animals in the population was met, and only the higher nutrient requiring animals use the extra nutrient for production.

The Reading Model (see, Fisher, C., T. R. Morris, and R. C. Jennings, 1973, "A model for the description and prediction of the response of laying hens to amino acid intake," *British Poultry Science,* 14:469–484) describes the animal nutrient requirement based on a population variation. It was originally used in the description of egg production for laying hens. The essential feature of this approach is to look at nutrient response of each bird independently and then to derive the population response as an integration of each individual bird response. The "optimum" flock requirement of each nutrient can be calculated through this approach by knowing the unit cost of this individual nutrient and value of unit output product.

Although the Reading Model approach is useful in some applications, it has several drawbacks as indicated herein:

1. The approach calculates optimum requirement of each nutrient independently. Therefore, nutrient balance and interactions among nutrients are ignored.
2. The cost of each calculated nutrient is required to use this model for enterprise economics. This can be a severe obstacle due to the fact that nutrient cost is mostly associated with each ingredient (i.e., each ingredient contains many nutrients). The final nutrient cost depends on the final ingredient composition of the diet due to nutrient competition among the available ingredients to meet minimum nutrient constraints during an optimization process.
3. The calculation of optimum nutrient requirement of a population is based on the economic break point of nutrient cost and value of product in the Reading Model. This may not be true due to the commercial and financial integration of multiple "divisions" within a modern enterprise. Optimum nutrient level can be higher or lower than the one at the economic break point due to higher or lower overhead costs such as costs of processing, labor, production, multiple value added products derived from a single farm product, etc.

Therefore, there arises an industrial need for a method, process and an apparatus for determining the optimum utilization effectiveness of nutrients for a population of animals. Additionally, the method and apparatus preferably should be capable of being used in combination with an apparatus and method for generating animal growth alternatives. The present invention directly addresses and overcomes the shortcomings of the prior art.

SUMMARY

The present invention provides a method and apparatus to determine growth response in a population of animals due to consumed nutrients using the process of nutrient efficiency theory. The inverted process overcomes the limitations discussed above and can be used in an automated-machine optimization process or a multi-purpose computer. The process allows for metering the precise quantum of nutrients to get a measured quantifiable output of edible tissue. This also serves the purpose of managing heavy metal, nitrogen and phosphorus pollution caused from animal feed. Such pollution can be found in animal facilities, neighboring environments, and natural water tables in the country. However, it will be readily apparent to those skilled in the art upon a reading of the present specification that the invention is also applicable to other environments. Therefore, while the computer example will be discussed herein, the present invention is not so limited, and various aspects may be applied to other methods and applications.

The nutrition modeling of land and marine animals, including poultry, is a critical component of their respective enterprise optimization. The optimization accuracy depends on the description of utilization efficiency of consumed nutrients in a population of animals. The present invention provides for a method, process and apparatus to determine utilization efficiency of consumed nutrients for meat production in a population. The present invention uses a model which describes utilization efficiency on at least three component parts of nutrient utilization—more specifically, maintenance, linear gain, and non-linear gain. Nutrient utilization efficiencies for maintenance and linear gain are fixed value(s), but efficiency for non-linear gain is a result of population variation and efficiency of linear gain.

In a preferred embodiment constructed according to the principles of the present invention, a computer processor acts on program logic to receive input from a user or a stored file on the population and nutrients. It uses a plurality of stored simultaneous equations, and solves them simultaneously using an optimizer program. The results are then stored and/or displayed. Additionally, the results are also used as a part of a computer program based apparatus and method for generating poultry growth alternatives. The apparatus and method for generating poultry growth alternatives is the subject of a corresponding copending patent application which is assigned to the assignee of the present application. Such corresponding patent application is entitled APPARATUS AND METHOD FOR GENERATING POULTRY GROWTH ALTERNATIVES, and is being filed on Sep. 22, 1993 concurrently herewith, the inventors being Jinkui Liu, Fazal Wala, and Harry E. Meek. Such application is hereby incorporated in its entirety herein by reference and made a part hereof.

Therefore, according to one aspect of the present invention, there is provided: An apparatus for determining an optimal rate of growth for a population of animals and for determining a composition of feed for the population of animals so that the utilization effectiveness of nutrients is substantially optimized and nutrient resource conserved simultaneously, the apparatus comprising: (a) a first knowledge base configured to store information regarding predetermined characteristics of a population of the animals; (b) a second knowledge base configured to store information regarding ingredients that may be included in feed that is provided to the population of the animals; (c) first means for generating a model based upon the information stored in the first and second knowledge bases, the model describing the growth rate of the population of animals and having a plurality of simultaneous equations, the means for generating the model further having means for accessing the first and second knowledge bases; (d) second means for generating nutrition equations for determining the utilization effectiveness of nutrients by the population of animals; (e) an optimizer for solving the simultaneous equations thereby determining the optimal growth rate for the population of animals and for determining an optimal utilization effectiveness of the nutrients; and (f) an interface for transferring the model between the first means and the optimizer and for transferring the nutrition equations between the second means and the optimizer; wherein the population of animals will yield a substantially maximized enterprise net margin when raised and fed so that the optimal growth rate and the optimal nutrient utilization effectiveness are substantially realized.

Another embodiment of the present invention provides: An apparatus for determining the composition of feed for a population of animals so that the utilization effectiveness of nutrients is substantially optimized, the apparatus comprising: (a) first means for determining a number of standard deviations for an average non-linear gain of the population of animals and for determining a nutrient efficiency ratio (EFR) in accordance with the following function: EFR=f(STD) where EFR is the nutrient efficiency ratio and STD is the number of standard deviations; (b) a knowledge base containing information regarding raw materials available for use in feed including ingredients available for use in the feed and the nutrient composition for each of the ingredients; and (c) second means operatively connected to the first means and the knowledge base, the second means for determining the amount and composition of feed for feeding the population of animals so that the population will substantially realize the optimal utilization effectiveness of nutrients.

Yet another embodiment of the present invention provides: A process of feeding and managing pollution in a population of animals so that utilization effectiveness of consumed nutrients is optimized, the process comprising the steps of: (a) determining a standard deviation for an average period gain of the population and an average period gain potential of the population; (b) comparing the real weight gain of the population with the average period gain potential to determine a number of standard deviations of non-linear gain, wherein nutrients to support the linear and/or non-linear gain may be determined; (c) determining the amount of nutrients that support the linear and/or non-linear gain; and (d) feeding the determined nutrients to the population of animals, wherein the utilization effectiveness of the nutrients is substantially optimized.

Another embodiment of the present invention provides: A program storage device readable by a computer, tangibly embodying a program of instruction executable by the computer to perform method steps for optimizing the utilization effectiveness of nutrients of a population of animals, the method comprising the steps of: (a) determining a number of standard deviations for an average non-linear gain of the population of animals; and (b) determining a nutrient efficiency ratio (EFR) in accordance with the following function: EFR=f(STD); where EFR is the nutrient efficiency ratio and STD is the number of standard deviations.

Yet another embodiment of the invention is directed to: A computer program article of manufacture comprising: a computer usable medium having computer readable program code embodied thereon for optimizing the utilization effectiveness of nutrients of a population of animals, the computer readable program code comprising: (a) computer readable program code means for causing a computer to determine a number of standard deviations for an average non-linear gain of the population of animals; and (b) computer readable program code for causing the computer to determine a nutrient efficiency ratio (EFR) in accordance with the following function: EFR=f(STD) where EFR is the nutrient efficiency ratio and STD is the number of standard deviations.

While the invention will be described with respect to a preferred embodiment computer based method and apparatus, and with respect to particular computer program operational steps and components used therein, it will be understood that the invention is not to be construed as limited in any manner by either such configuration or components described herein. For example, several of the claims are directed to a method of feeding a population of animals. Further, while the preferred embodiment of the invention will be described in relation to poultry, it will be understood that the scope of the invention is not to be limited in any way by the particular animal or poultry environment in which it is employed. The principles of this invention apply to animal growth, and more specifically for modeling the utilization of effectiveness of nutrients in a population using a knowledge based computer program.

These and other various advantages and features which characterize the invention are pointed out with particularity in the claims annexed hereto and forming a part hereof. However, for a better understanding of the invention, its advantages and objectives obtained by its use, reference should be made to the drawings which form a further part hereof and to the accompanying descriptive matter, in which there is illustrated and described a preferred embodiment of the invention.

BRIEF DESCRIPTION OF THE DRAWINGS

Referring to the Drawings, wherein like numerals represent like parts throughout the several views:

FIGS. 2 and 3 are tables of nutrient utilization efficiency ratios with respective standard deviations;

FIGS. 5–19 are menus, screen displays, and a sample report of a preferred embodiment knowledge based computer program which implements the present invention;

DETAILED DESCRIPTION

As mentioned above, the principles of this invention apply to animal growth, and more specifically to feed animals so that the utilization effectiveness of the nutrients in the feed is optimized and such resource being simultaneously conserved. Feeding animals in this manner involves modeling the utilization effectiveness of nutrients and nutrient pollution control in a population using a knowledge based computer program. The amount and nutrient composition of the feed can then be determined. Once the utilization effectiveness of the nutrients is modelled, the population can be fed accordingly so as to meet certain enterprise objectives. The model is intended to operate in a multipurpose computer environment.

In order to better understand the present invention, the description of the preferred embodiments will be deferred pending a description of the theory used for the model and the preferred embodiment computer program engine. For purposes of clarity and simplicity, the present invention will be described in terms of poultry al though it can be used with all animals.

Theory of Model

A discrepancy between individual and population response to consumed nutrients on growth results when the overall nutrient requirement of a small proportion of individuals in the population are met. In this setting, even with increased levels of nutrition, more and more individuals in the population will not respond via higher growth. Therefore, the per unit nutrient input results in a smaller overall production gain—which reflects the microeconomic concept of diminishing return.

It is logical to assume that at a starting point of diminishing return, the nutrient requirement for maintenance of all individuals and partial gain (or linear gain) are met for growing poultry. The population variation has an effect only on the remainder gain (i.e., the non-linear gain). Thus, if the nutrient efficiency is known at this point, then the point will also be known at which efficiency will decrease with each increase in the nutrient level.

Many experiments have been conducted to study the poultry nutrient requirements for maintenance and body weight gain. The most popular model for poultry is the nutrient maintenance and gain model, i.e. maintenance is proportional to the 0.67 power of body weight ($BW^{0.67}$) and the requirements for gain are linearly related to the gain itself. Therefore, the total dietary nutrient requirement for maintenance and gain can be calculated using total body weight, weight gains, and their respective efficiencies.

Several questions follow from this model. First, what is the average linear gain. Second, what is the average non-linear gain in a population. Finally, what is the efficiency for the foregoing.

A. Nutrient Efficiency for Non-Linear Gain

Figure 1:
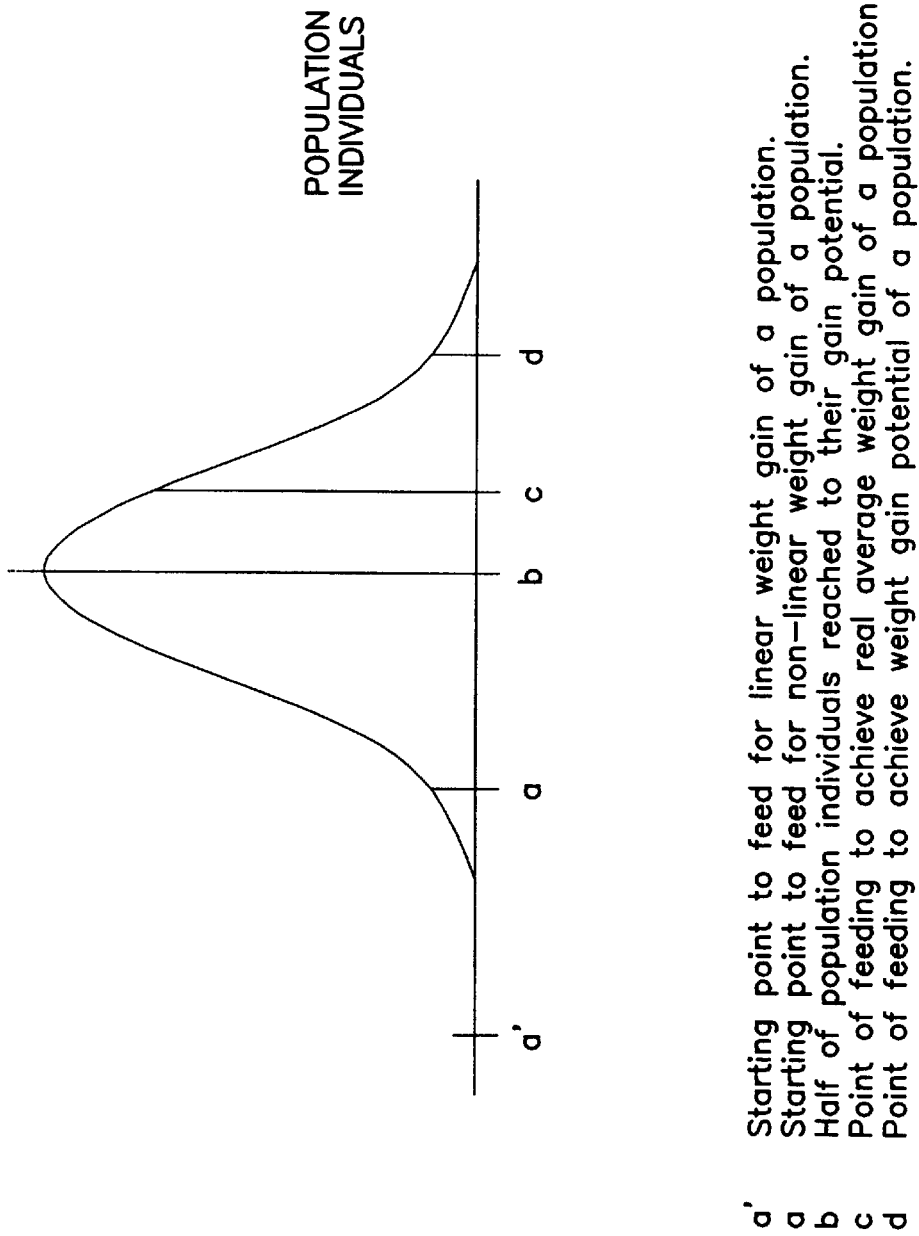
FIG. 1 is a bell curve illustrating weight gain distribution of an animal population.

It is commonly accepted that the average daily gain in a population follows a normal distribution (See FIG. 1). Two standard deviations on each side of the mean should cover about 95% of individual daily gains in a population and three standard deviations should cover 99% of them. Thus, if three standard deviations are used, then over 99% of the individual total non-linear gains will be in the range of six (i.e., 3×2) standard deviations (e.g., from point "a" to "d") around the mean. It can then be theorized that the point of diminishing return start at point "a". When all the birds are fed to meet their potential, then the non-linear gain distribution in the population should be close to point "d", i.e. three positive standard deviations.

However, due to changes in enterprise economic conditions, many times the nutrient levels are not supplied to meet the full growth potential (under feeding). If the nutrition level is supplied to meet the bird proportion to point "c" instead of "d", then the number of standard deviations for non-linear gain, which is less than three, can be obtained from a normal distribution table based on the fraction area of higher than point "c".

Still referring to FIG. 1, the nutrient efficiency of non-linear gain is affected by the fraction of the area higher than point "c". With decreases of this area, nutrient utilization will become less efficient. Therefore, calculation of a nutrient efficiency ratio can be done as follows.

Assuming that there is a Normal distributed population of birds when the nutrient level is low (point "a" of FIG. 1, e.g., a −3 standard deviation), 99.87% of birds in the population would gain body weight with each increase in nutrient level. At that instant point, the efficiency ratio would be 99.87%. However, with increased nutrition to −2 standard deviations, then 97.72% of birds in the population would gain (i.e., 2.28% of the birds have reached their genetic potential based on Normal Distribution). Similarly the efficiency ratios at standard deviations 0, 2 and 3 would be 50, 2.28 and 0.13%, respectively.

The efficiency is not based on an instant point to calculate nutrient requirement of overall average non-linear gain. Instead, the average efficiency for the total non-liner gain should be calculated. This can be done by averaging all the instant efficiency ratios and decreasing the distance between each instant point. For the above example, the approximate efficiency ratio for three standard deviations of non-linear gain would be (99.87+97.72+50+2.28+0.13)/5=50%. Supposing the efficiency for linear gain is 90%, the one for non-linear gain would be 90%×50%=45%.

A more accurate description of efficiency ratios for non-linear gains are listed in FIGS. 2 and 3 with a distance of 0.01 standard deviation between two instant points. This table ranges from −3 to 3 standard deviations and demonstrates the decreasing efficiency with increasing the standard deviation.

In order to optimize certain enterprise financial functions simultaneously, a continuous function has to be developed. The function should be in the form as follows:

$$EFR = f(STD) \tag{1}$$

where:

EFR—Nutrient efficiency ratio

STD—Standard deviations standing in the bell curve (−3 to 3)

Data of FIG. 2 and 3 is fitted into a regression equation in a function form of (1) as follows:

$$EFR = 0.84258 \, e^{\wedge}(0.011014 e^{\wedge} STD)/e^{\wedge}(0.1482 \, STD + 0.339 \, STD^{\wedge}2)$$

r=0.9997

Where:

e—2.71828 r—Correlation coefficient

The efficiency of non-linear gain is calculated as:

$$EFNL = EFL \times EFR \tag{2}$$

Where:

EFNL—nutrient efficiency of non-linear gain.

EFL—nutrient efficiency of linear gain.

EFL can be determined experimentally by feeding a group of birds with various dietary nutrient levels. The best nutrient utilization efficiency of gain would be used as EFL.

B. Partition of Linear and Non-Linear Gain

Nutrient efficiency ratios (FIGS. 2 and 3) can be used not only for calculating nutrient efficiency of non-linear gain but also for determining the average amount of non-linear gain in the population. For example, if the nutrition level is supplied to gain weight from point "a" to "d", then the individual distribution for non-linear gain increased six standard deviations (e.g., −3 to +3), but the average non-linear gain of population only increased three standard deviations (e.g., −3 to 0). This is because at standard deviation +3, only 50% (0.5001, FIG. 3) of gains in the population for six standard deviations is achieved (50%×6= 3). Therefore, the average non-linear gain for the population is three standard deviations when a nutrition level is supplied close to their maximum growth potential.

For conditions of underfeeding, if birds are fed to standard deviation two (i.e. five standard deviations: −3 to 2) for individual distribution, then the average non-linear gain of the population would be 2.991 (5×0.5982) standard deviations (FIG. 3). Similarly, for standard deviations 0, −2, and −3 their population average would be 2.6004 (−3 to 0 is 3 standard deviations, 3×0.8668=2.6004), 0.9931 (−3 to −2 is 1 standard deviation, 1×0.9931=0.9931), and 0 (−3 to −3 is 0 standard deviation, 0×0.9987=0), respectively.

With known total weight gain potential (from birds that have gained in the range of a' to d, FIG. 1), real average weight gain (from birds that have gained in the range of a' to c) and three standard deviations of weight gain as average non-linear gain potential (from birds that have gained in the range of a to d), gain differed from potential (from birds that have gained in the range of c to d) can be calculated by subtracting real average weight gain (from birds that have gained in the range of a' to c) from total weight gain potential (from birds that have gained in the range of a' to d). Dividing the gain differed from potential by the standard deviation of weight gain would be the deviated number of standard deviations of real from potential. Subtracting the deviated number of standard deviations from 3 would be the number of standard deviations for non-linear gain.

The product of the number of standard deviations of non-linear gain and the standard deviation of weight gain is the real average non-linear gain of the population (from birds that have gained in the range of a to c). The real average linear gain (from birds that have gained in the range of a' to a) is the difference between real average weight gain (from birds that have gained in the range of a' to c) and real average non-linear gain (from birds that have gained in the range of a to c).

For example, an average gain potential of body protein for a population is 500 grams and the real average protein gain of the population is 490 grams with standard deviation of protein gain as 60 grams.

Average linear gain and non-linear gain of the population:

Gain differed from potential: 500−490=10 grams.

Deviated number of standard deviations of real from potential:

10/60=0.1667 standard deviations.

Number of standard deviations for non-linear gain:

3−0.1667=2.8333 standard deviations.

Real average non-linear protein gain of population:

2.8333×60=170 grams.

Real average linear protein gain of population:

490−170=320 grams.

Efficiency ratio of non-linear gain:

Increased number of standard deviations of individual bird distribution from standard deviation −3(NOSTD) to achieve real average non-linear gain:

NOSTD=2.8333/EFR

Define relationship between increased number of standard deviation (NOSTD) and standard deviations standing in the bell curve (STD)

NOSTD=STD+3

Therefore, STD+3=2.8333/EFR

EFT=2.8333/(STD+3)

Because STD is unknown in this case, simultaneous functions in the form of EFR=f(STD) have to be solved to derive the EFR:

$$EFR = 0.84258 e^{\wedge}(0.011014 e^{\wedge} STD)/e^{\wedge}(0.1482 \, STD + 0.339 \, STD^{\wedge}2)$$

$$EFR = 2.8333/(STD+3)$$

Solutions are:

EFR=0.7604

STD=0.7261

Where:
- EFR—Nutrient efficiency ratio.
- STD—Standard deviations standing in bell curve (−3 to 3).
- NOSTD—Increased number of standard deviations of individual bird distribution to achieve real average non-linear gain.

Assuming dietary protein efficiency of linear gain of 0.85 is determined experimentally, the nutrient efficiency of non-linear gain would be 0.6463 (0.85×0.7604). Therefore, dietary protein requirement of linear gain would be 376.5 grams (320/0.85) and dietary protein requirement of non-linear gain would be 263.0 grams (170/0.6463).

C. Conclusion

The current invention demonstrates that overall nutrient utilization efficiency is not a constant number as dictated by scientific convention due to existence of inherent variation within a population. Instead, the nutrient requirement for gain can be separated into linear gain and non-linear gain. The change in efficiency is only associated with non-linear gain, which can be calculated with efficiency of linear gain and the efficiency ratio of non-linear gain.

This invention can be applied in a robust non-linear optimization process with a known standard deviation of weight gain and a known total weight gain potential in order to optimize the real average weight gain. The result of the invented process allows end users to determine and target feeding programs to specific segments of a population curve such that the entire population economics is significantly augmented. The standard deviation is utilized for deciding proportion of real non-linear gain among the real average weight gain and its nutrient efficiency.

Embodiment

Figure 4:
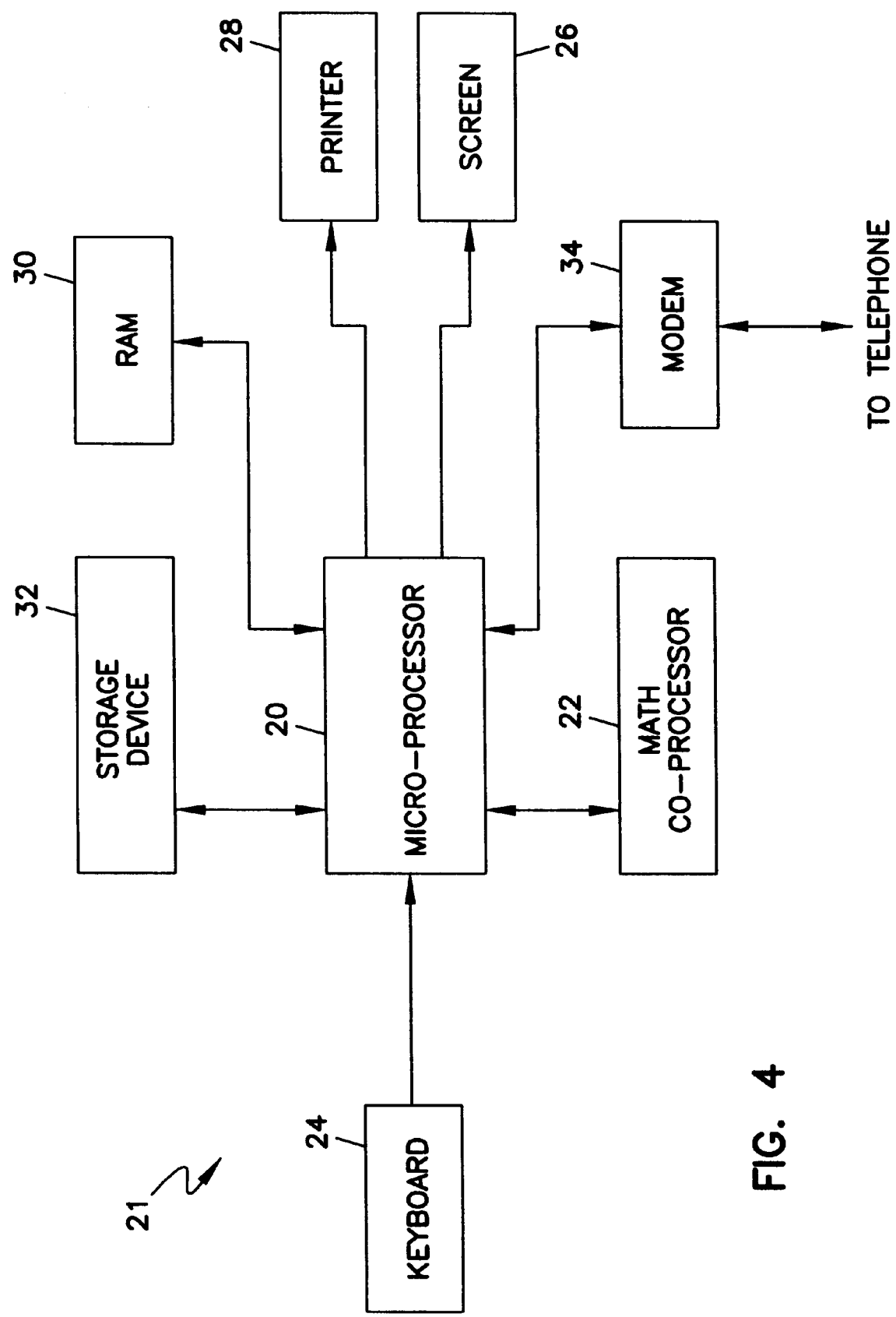
FIG. 4 is a functional block diagram of a multipurpose computer useful for practicing the process of the present invention.

As one skilled in the art will appreciate and as shown in FIG. 4, the present invention is preferably utilized with a personal computer (hereinafter PC), shown generally at 21, that is based on Intel's 80486 microprocessor 20 with a 66 MHz clock, Intel's PENTIUM™ processor, a high speed RISC processor, or any other plethora of commercially available processors. The computer 21 also preferably has a math co-processor 22 for completing mathematical computations. The computer 21 also includes a keyboard 24, screen 26, printer 28, random access memory 30, and a storage device 32. The storage device 32 may include magnetic means (i.e., floppy disk drive, hard drive, or tape drive), optical disk means, firmware, or any other appropriate memory storage device. The storage device 32 is preferably used to store the execution program and data generated by the execution program.

The computer 21 may also include means such as a modem 34 and communications software for loading input data or the execution program from a remote location. As one skilled in the art will further appreciate, other types of computers might be used such as a main frame, portable computer, note-book computer, or mini-computer.

In operation, the user loads the execution program from the program memory storage location into the random access memory 30. Those skilled in the art will appreciate that the program might be stored on magnetic media, (i.e., floppy disk drive, hard drive, or tape), read only memory (i.e., optical disk), firmware, or any other appropriate storage device 32. The program might also be transmitted from a remote location such as from a file server, a main frame, or other PC that has a communication link with computer 21.

Next, a description of a preferred program will be described. The program is specific to poultry. However, those skilled in the art will appreciate that other animals might also be the subject matter. First, a brief discussion of the overall program operation will be first presented. Subsequently, a more detailed discussion of the implementation of the nutrient efficiency will be provided.

Figure 5:
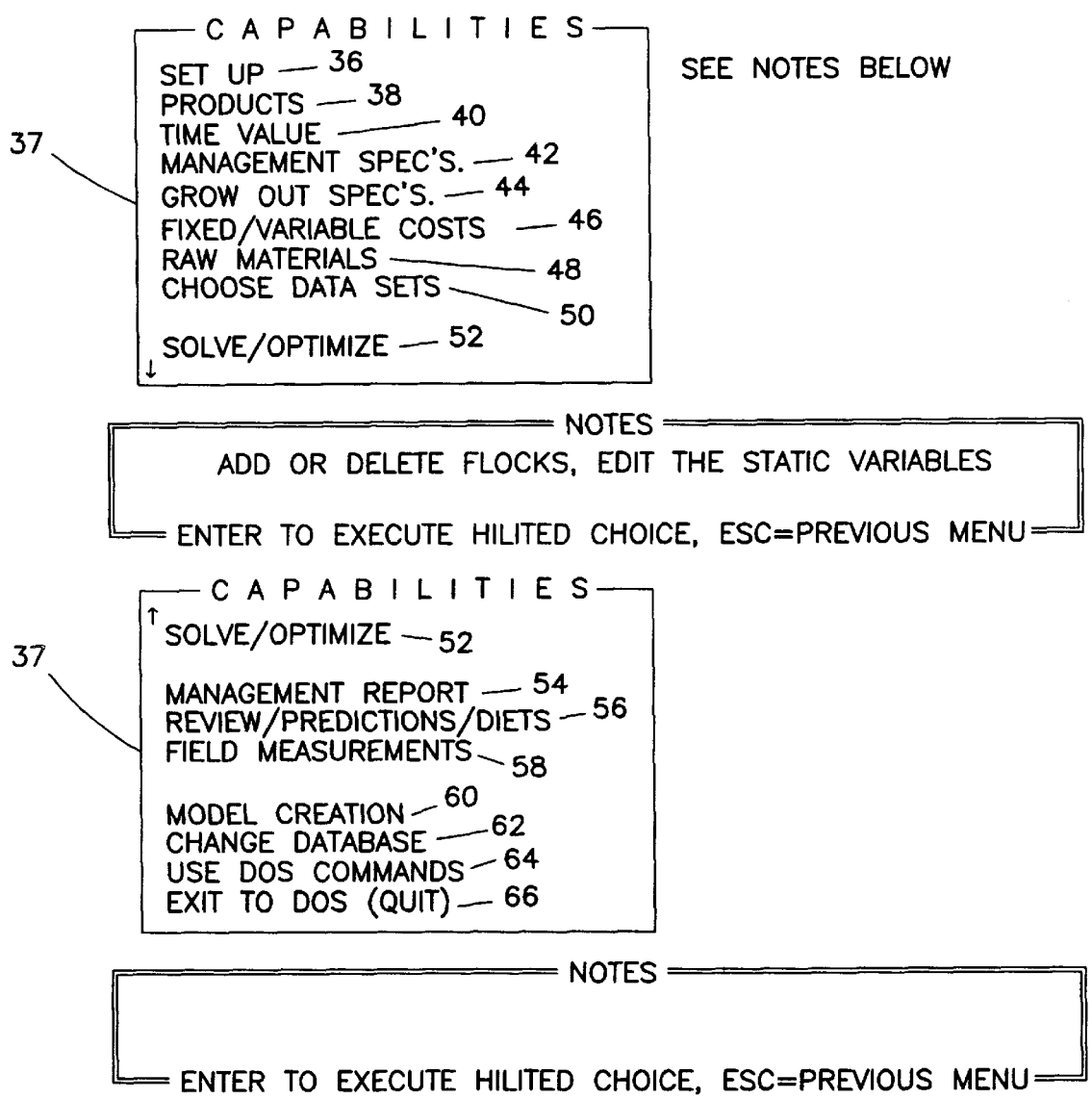

Referring to FIG. 5, a main menu 37 is displayed on the computer screen after the program is loaded. The menu has the following options: Setup 36, Products 38, Time Value 40, Management Spec's 42, Grow Out Spec's 44, Fixed/Variable Costs 46, Raw Materials 48, Choose Data Sets 50, Solve/Optimize 52, Management Report 54, Review/Predictions/Diets 56, Field Measurements 58, Model Creation 60, Change Database 62, Use DOS Commands 64, and Exit to DOS (Quit) 66. It will be appreciated that many other options might also be provided, and that the options described herein are not to be construed in a limiting manner.

The first main menu 37 option is Setup 36. On invoking this option, a user with basic industry knowledge can define a new flock or business production unit of birds or edit information concerning an existing flock or business production unit. As shown in FIG. 6, the Flock Data computer screen 68 is displayed when the Setup menu 36 item is chosen. From this screen, the user has four options. The user can highlight an existing flock and press enter at which time the Flock Data Maintenance screen 70, FIG. 7, will appear on the display. The user can then edit the displayed information, which includes the name of the farm 72 where the flock is kept; the name of the particular flock 74; the entity from which the flock was purchased 76; a reference code 78 that identifies the flock; model selector 80; and whether the user wishes to have automatic age calculation 82. Automatic age calculation is also provided for. Finally, the user can choose to delete the listing of a particular flock or return to the main menu 37.

The second item on the main menu 37 is Products 38. Upon choosing this menu item, the table entitled "TABLE: PRODUCT.T" 84 is displayed. See FIG. 8. The information entered into this table includes the price per pound for a whole bird, a gutted carcass, and each of the individual body parts. The information entered also includes the amount of poultry product that the user wants to have available for market. More specifically, the user enters the range of acceptable weight that he/she plans to sell. If the user plans to market the poultry in parts, an acceptable range of weight for each type of part is entered. The price is entered into column 86, the minimum acceptable weight is entered into column 88, and the maximum acceptable weight is entered into column 90.

The third item on the main menu 37 is Time Value 40. When this menu item is selected, a screen entitled "TABLE: TIME.T" 92 is displayed on the computer screen. See FIG. 9. The data that is entered into the table displayed in this screen includes, the age that the poultry will be sold 94, the amount of time that a barn will be empty between flocks 96, the length of the brooding period if the particular strain of birds has a brooding period 98, and the square footage provided for each bird within the barn 100. The unit of measurement for all time periods is days. The desired values are entered into the first column 102 of the table if the user knows the precise time period or allowable square footage per bird. Otherwise the user can enter an acceptable range of time or square footage in the second and third columns 104 and 106. If the user enters a range, the program will calculate the optimum value in order to maximize the user's return on investment.

The fourth item on the main menu 37 is Management Spec's 42. Upon choosing this menu item, the table entitled "INFORMTN.T" 108 is displayed on the screen. See FIG. 10. Information in this table is broken down into a plurality of time intervals during the life of the poultry. Each interval is called a series 110 and corresponds to a production period. In the column entitled "Age, Days" 112 the user can enter the age of the flock at the end of each interval. In the column entitled "TEMP (F)" 114 the user can enter the ambient temperature of the flocks environment. In the column entitled "HUMIDITY, %" 116 the user can enter the humidity of the flock's environment. One skilled in the art will realize that data concerning other environmental factors may also be included in the INFORMTN.T table 108.

The fifth item on the main menu 37 is Grow Out Spec's 44.

The sixth item on the main menu 37 is Fixed/Variable Cost 46. Upon choosing this item, the table entitled "COST.T" 126 is displayed. See FIG. 12. Data listed in this table includes "FIX, $/YR" 128, which is fixed costs per year; "PRCSS, $/YR" 130, which is the cost of processing per year; "CHICK, $/BD" 132, which is the allocated operational hatchery cost per chick delivered to growout house; "MARKT, $/YR" 134, which is the cost of marketing per year; "PRPNE, $/YR" 136, which is the cost of building heat energy per year; "BROOD, $/FL" 138, which is the cost of brooding each flock of birds if the flock is of the type that requires brooding; and "GRWER, $/LB" 140, which is the cost per pound of live weight paid to the contract grower.

The seventh item on the main menu 37 is Raw Materials 48. Upon selection of this item, a sub-menu entitled "Raw Materials" 142 is displayed. See FIG. 13. The first item on the sub-menu is Select and Price Ingredients 144. Upon selecting this first sub-menu item, the table entitled "INGREDIENT UPDATE" 146 is displayed. See FIG. 14.

The table includes columns entitled AVAIL. 147, GROUP 148, SHORT NAME 150, MIN 152, MAX 154, CTRL 156, COST 157/CWT, NU 158, and HA 160. The AVAIL. 147 column lists whether that particular ingredient is available to be included in the feed. As shown in FIG. 15, the possible listings in this column include Avail 162, which means that the ingredient is available to the user; Maybe 164, which means to make the ingredient very expensive; use only if nutrient content is essential for formulation; No 166, which means that the ingredient is not available to the user; and Cost 168, which means, do not use in formulation but compute the competitive price. The GROUP column 148 lists ingredient classification. The SHORT NAME 150 column lists the common name of the ingredient. The MIN column 152 lists the minimum amount of that ingredient that the user wants to include in the feed. The units of measurement for this data is percentage. The MAX column 154 lists the maximum amount of the ingredient that the user wants to include in the feed. The CTRL column 156 lists settings could not be changed by user in this screen. The COST/CWT column 157 lists the cost of each ingredient per 100 lbs. The Nu column 158 lists choice of predicting nutrient content based on proximate analytical values of an ingredient. HA column 160 lists hand adding values. As will be discussed in more detail below, an ingredients database lists the types and amounts of the nutrients that are included in each ingredient. The amount of each nutrient listed in the database corresponds to the amount of nutrient that is found in a typical crop that has a standard weight per bushel. One skilled in the art will further realize that the amount of each nutrient can vary with the weight of the crop per bushel. Thus, the program has the capability of recalculating the amount of nutrients in each ingredient if the weight per bushel is entered into the computer.

It will be appreciated that to determine the utilization effectiveness of nutrients in a population as discussed above, standard deviation and nutrient content of gain need to be known. When these factors are known or entered, together with the potential for period gain of the population, then the standard deviations for non-linear gain relative to feeding of the population may be determined.

The eighth item on the main menu 37 is Choose Data Sets 50. When this item is chosen, the "TO BE FORMULATED" 170 screen is displayed. See FIG. 16. This menu option allows a user to select the particular flock that is to be optimized.

The ninth item on the main menu 37 is Solve/Optimize 52. When this item is chosen the computer 21 of the present invention will calculate the optimum growth within each designated time interval during the life of the flock. The computer 21 then calculates the optimal diet, living environment, and age at which the flock should be sold. The diet consists of the amount of ingredients that should be included in the feed and the duration it needs to be fed. The living environment includes the number of birds that are included in each flock and the density of the birds (e.g., the square feet per bird within the house). The age of the bird is number of days between the birth of the birds and the date at which the bird should be sold to a processing plant.

One skilled in the art will realize that the computer 21 also calculates data concerning the volume of end products that each flock will generate and financial data concerning the amount of revenue, costs, and return on investment. One skilled in the art will further realize that other financial data may be calculated by the computer.

The tenth item of the main menu 37 is Management Report 54. Upon selection of this menu item, a list of the possible reports 172 is displayed on the screen. See FIG. 17. There are seven reports that the user can choose. The first report is entitled OPTIMUM RESULTS 174 and lists the optimal performance and environmental constrains to which the user must conform in order to realize the maximum possible return on investment. One skilled in the art will realize that such data includes the optimal flock size, the optimal age at which the flock should be sold, the optimal bird density in units of bird per square foot, the weight of the bird at sale, etc. The second report is entitled OPTIMUM PERFORMANCE 176 and includes data that relates to the length of each feeding period, the amount of feed given to the flock, the amount of feed that is consumed by the flock, etc. The third report is entitled OPTIMUM YIELD 178 and includes data that relates to the total weight of the flock that is available for sale, the costs of raising the flock, and the price received for the flock. The fourth report is entitled OPTIMUM FD/FACTORS 180 and includes information that relates to the amount and cost of the feed that a flock will consume. The fifth report is entitled OPTIMUM NUT/ALLNCE 182 and includes information that relates to the nutrients consumed by the flock. The sixth report is entitled RESOURCES RAW/MATRLS 184 and includes information related to the amount of the right choice of ingredients that are consumed by the flock. The seventh report is entitled OPTIMUM INDIV-BIRD 186 and includes information related to the characteristics of the birds in each flock, the environmental conditions in which the flock will live, the average size of each bird within the flock, and the average amount of feed consumed by each bird within the flock. Samples of the reports that are generated are shown in FIG. 18 and labeled 174', 176', 178', 180', 182', 184', and 186'.

The eleventh item on the main menu is Review/Predictions/Diets 56. When this item is selected, the computer 21 displays the predicted value of data concerning the weight of the flock, the amount of feed consumed, the weight of the various part of a bird, and other miscellaneous data concerning the environment of the flock. See FIG. 19. This information may also be updated to reflect actual data during the life of a flock. Upon entering the actual values, the SOLVE/OPTIMIZE 52 menu item may be reselected in order to update the optimal diet, living environment, and age at which the flock should be sold.

Preferably, the computer 21 is programed using the Clarion database software. Clarion is published by Clarion Software Corporation, which is located in 150 East Sample Road, Pompano Beach, Fla. 33064. One skilled in the art will realize that any software utility and programming language may be used to derive similar results. During execution of the program, the microprocessor 20 sequentially executes each individual instruction. However, as described herein, the operation of the microprocessor implementing the program will be defined in terms of major functional steps.

Figure 20:
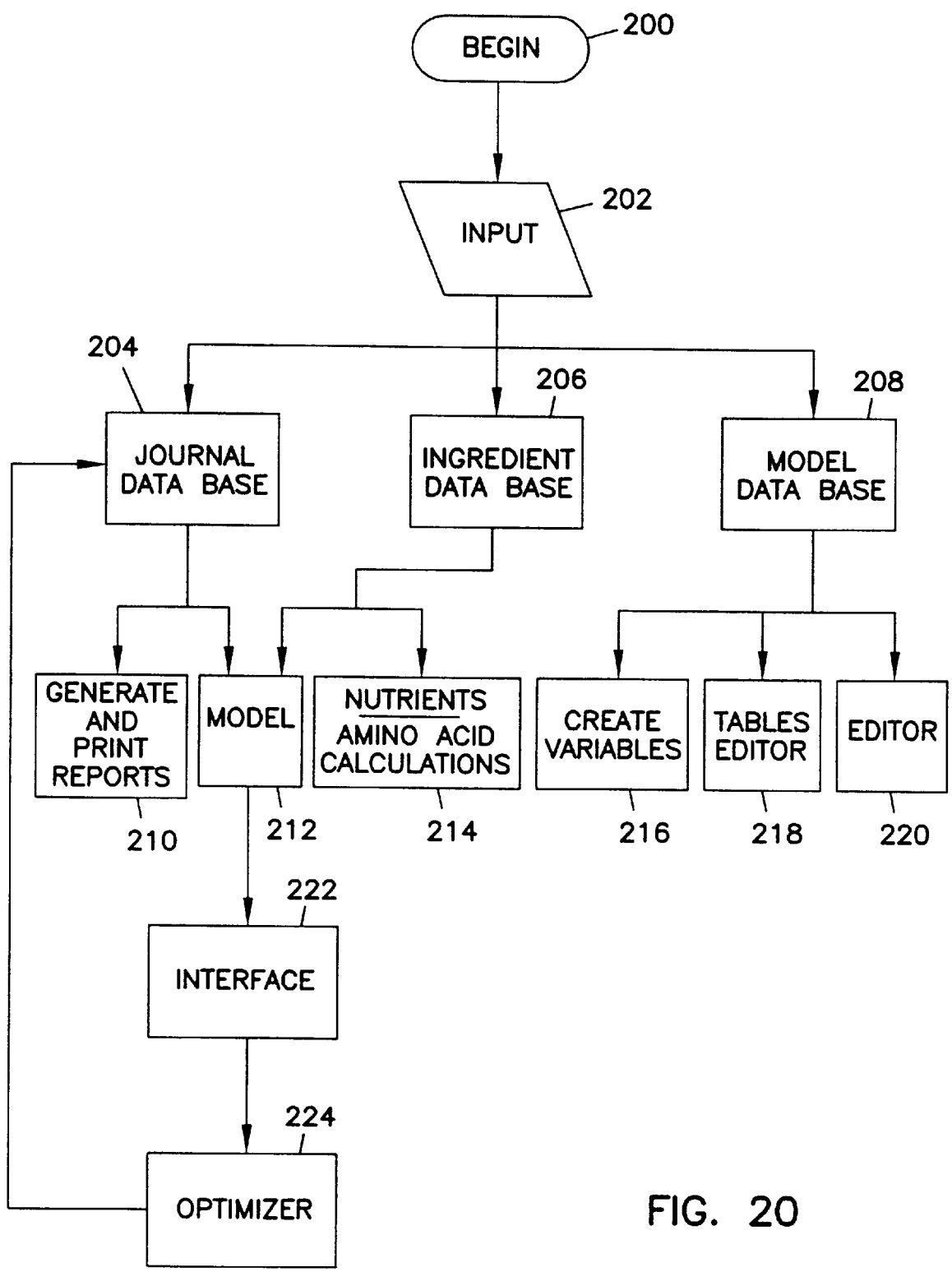
FIG. 20 is a functional block diagram of program logic used to implement the principles of the invention.

Referring to FIG. 20, the program that controls the computer of the present invention begins at block 200. The user may input information into the databases at Block 202. The information inputted may enter either the Journal database 204, Ingredient database 206, or Model database 208. The Journal database, block 204 stores information that relates to the characteristics of the flock such as sex, weight, number, strain, etc. This database also stores the information that is generated by the model and the optimizer. Such information relates to the optimal diet, environmental conditions, flock size, predicted mortality rate, predicted yield, financial figures, etc. The Ingredient database, block 206, stores information that relates to the potential ingredients that may be included within the feed and the nutritional values of the various ingredients. One skilled in the art will realize that the Ingredient database also includes equations that the user can execute to recalculate the value of the amino acid nutrients and metabolized energy. These equations are based on the weight per bushel and protein content of the ingredients. The Model database, block 208, includes information that relates to the actual code of the execution files. The model database also includes information that relates to the variables that are used within the execution files.

One skilled in the art will realize that the blocks 210, 212, 214, 216, 218, and 220 represent the various execution programs that are required for program execution. Each of these blocks may contain a plurality of execution files in order to fulfill its function. The source code for the model is attached hereto as Appendix 1. As described above, the execution files and the databases are preferably written utilizing the Clarion database software.

At block 212, the user may execute the model that forms the equations that are described in the section above titled Theory and listed in Appendix 1. This section also forms equations that calculate the predicted mortality rate and other effects of living conditions, predicted yield for various economic body parts, and nutrient calculations. More specifically, the model will create a plurality of simultaneous equations that it will pass through the interface, block 222, to the Optimizer, block 224.

The interface, Block 222, reconfigures the information generated by the Model, Block 212, into a form that is acceptable by the Optimizer. The interface is preferably written in C++. The optimizer should be a non-linear optimizer, which are well known in the art.

The Optimizer, Block 224, will solve the simultaneous equations in order to create the optimal values for each of the variable that describe the predicted mortality rate and other effects of living conditions, predicted yield for various economic body parts, and nutrient calculations. This information is then passed to the Journal database, Block 204, where it is stored.

At block 210, the user may execute the files that generate and print reports. These reports are described in detail above. At block 214, the user may edit the tables that store information that about the various ingredients that may be included in feed. More specifically, the user may delete or add ingredients, and edit the nutritional values associated with each ingredient. Additionally, the user may execute amino acid and energy equations that recalculates the values of the amino acid and metabolizable nutrients based on the weight per bushel and protein content of each ingredient. The information manipulated by block 214, is stored in the Ingredient database, block 206.

At block 216, the user may create variables used in the various execution files. One skilled in the art will realize that at block 218 the user may create and edit the various tables that are used to organize and store information within the databases. Finally, the user may create and edit the execution files and databases at block 220.

Figure 22A:
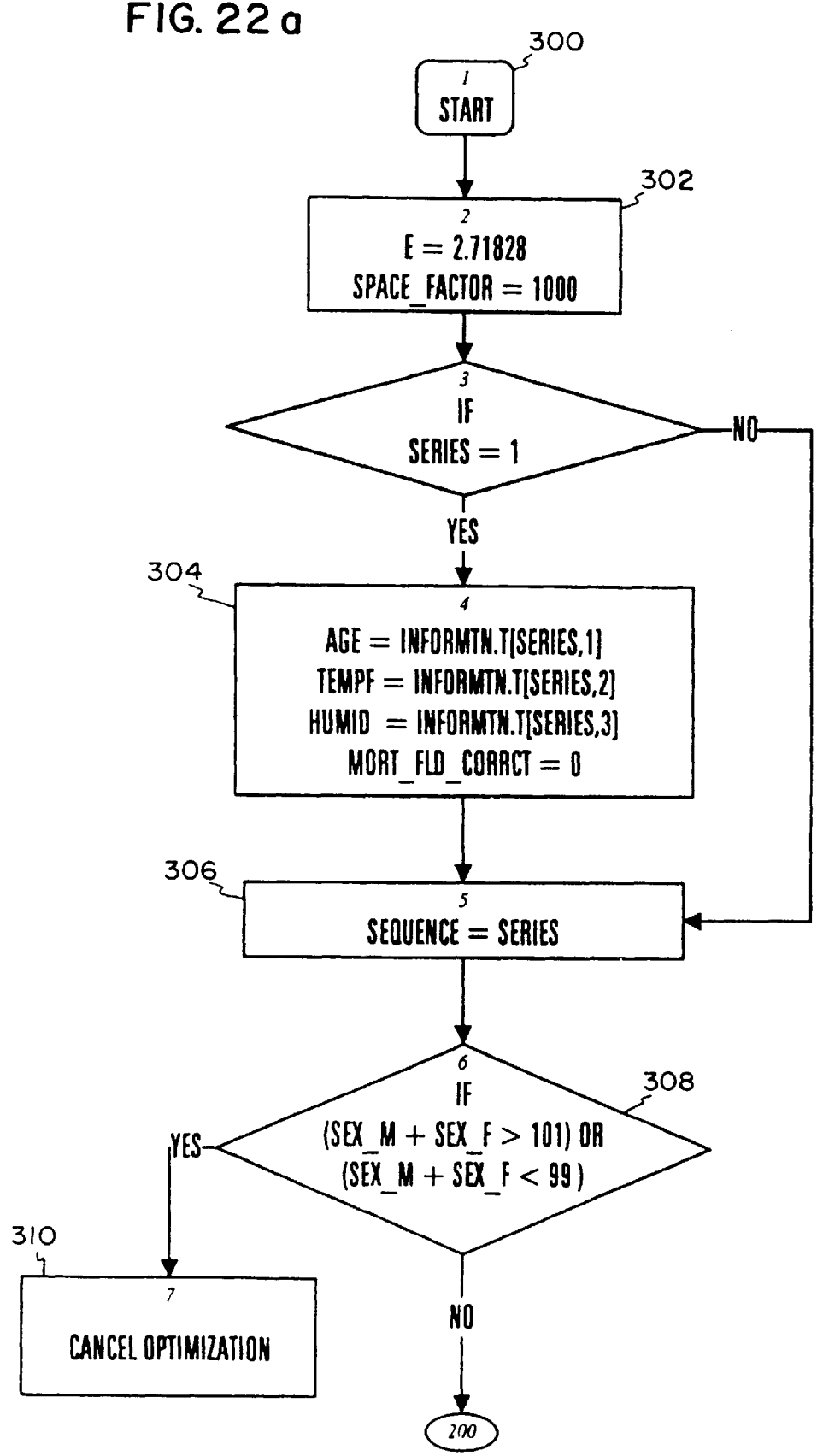
FIGS. 22a–22ai set forth a flow chart showing the detailed operation of the program logic shown in FIGS. 20 and 21.
Figure 22B:
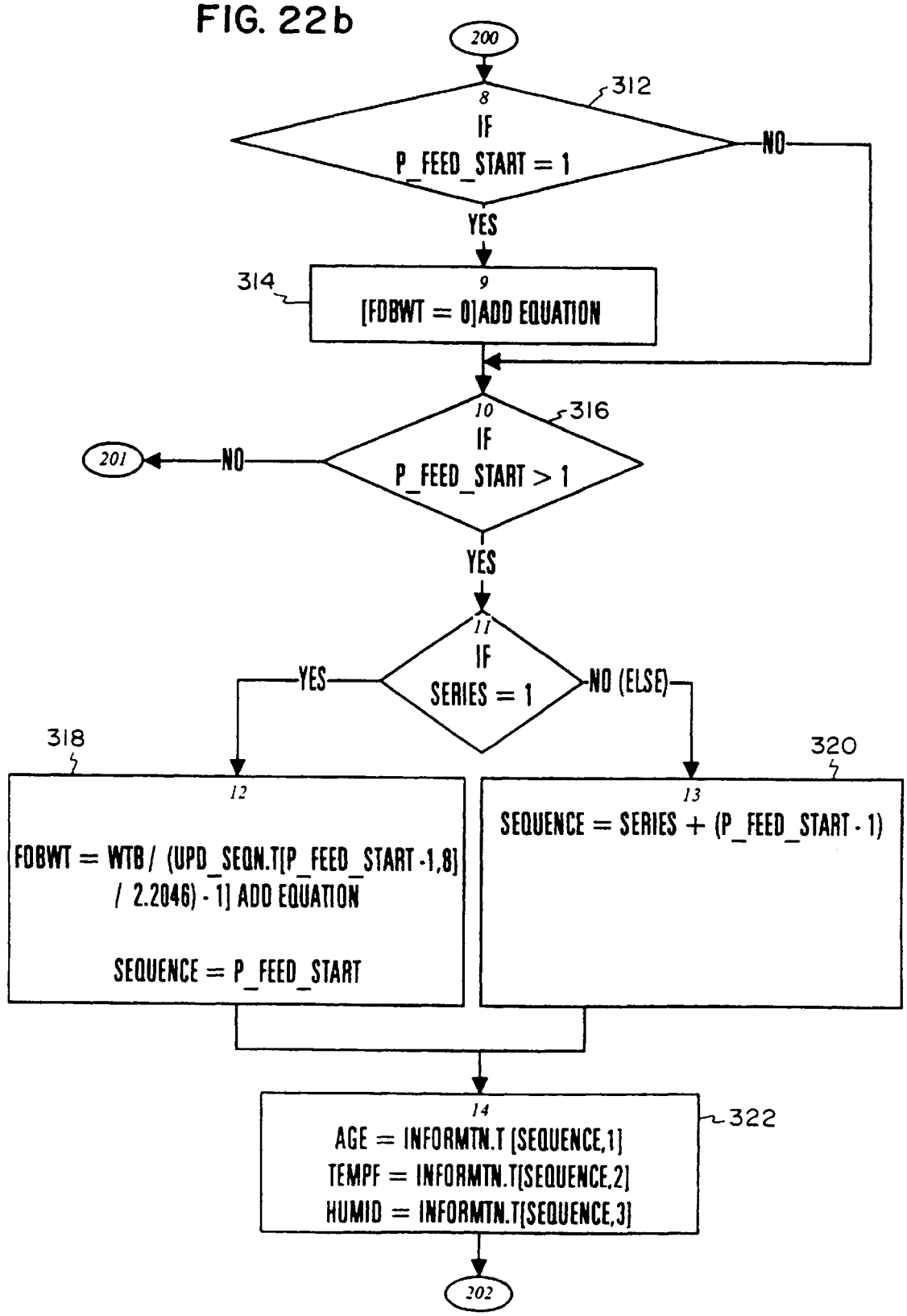
Figure 22C:
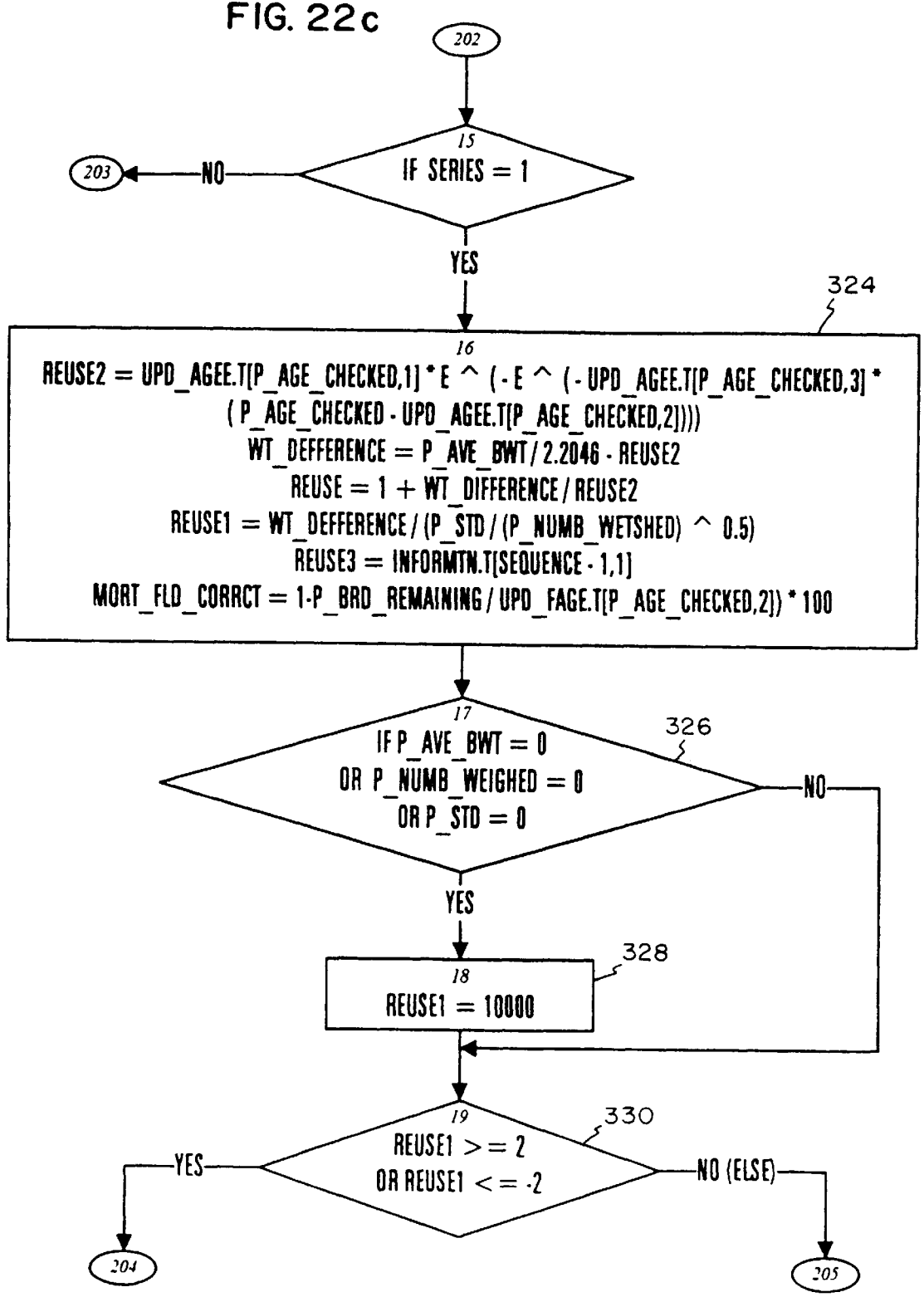
Figure 22D:
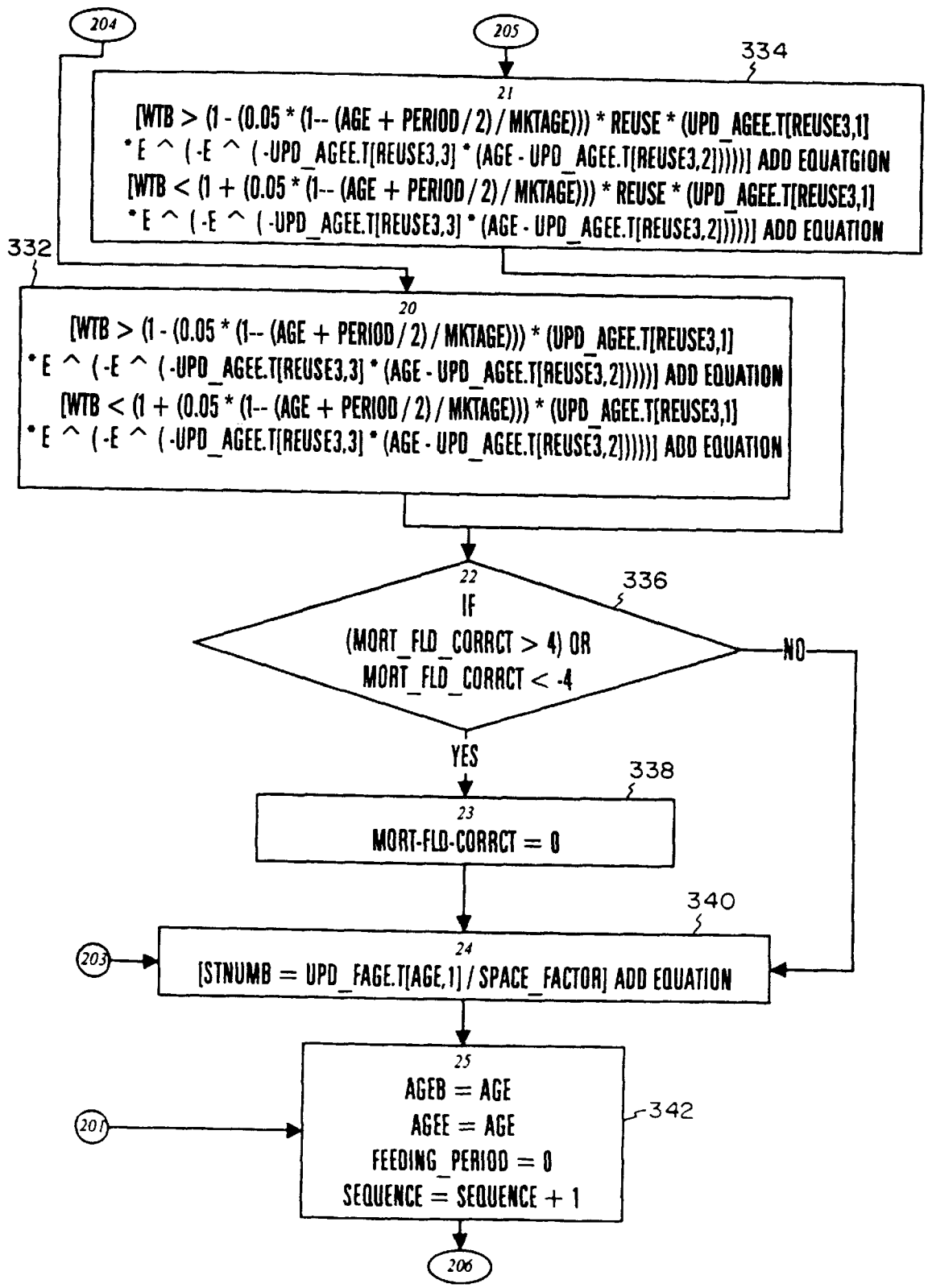
Figure 22E:
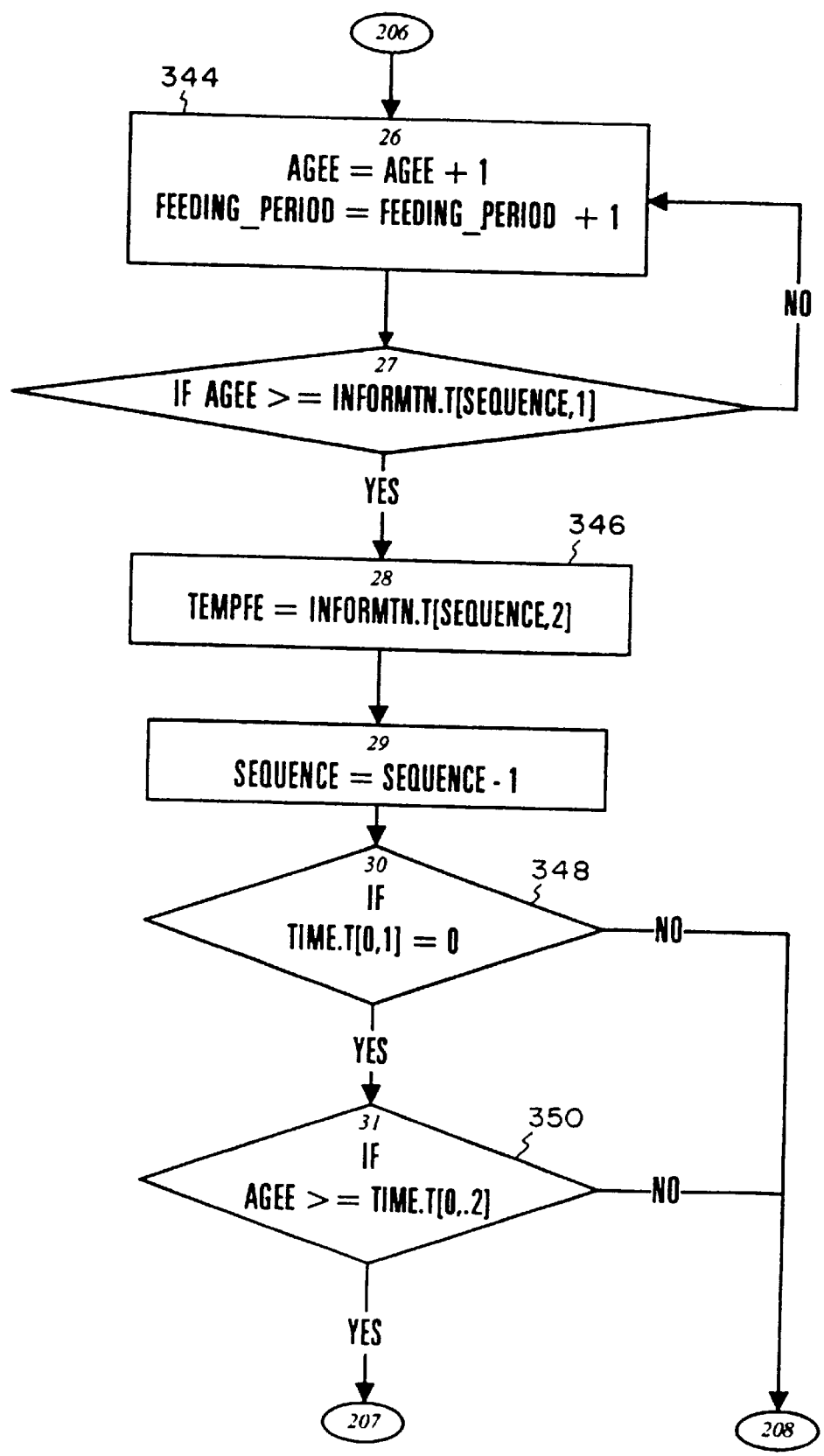
Figure 22F:
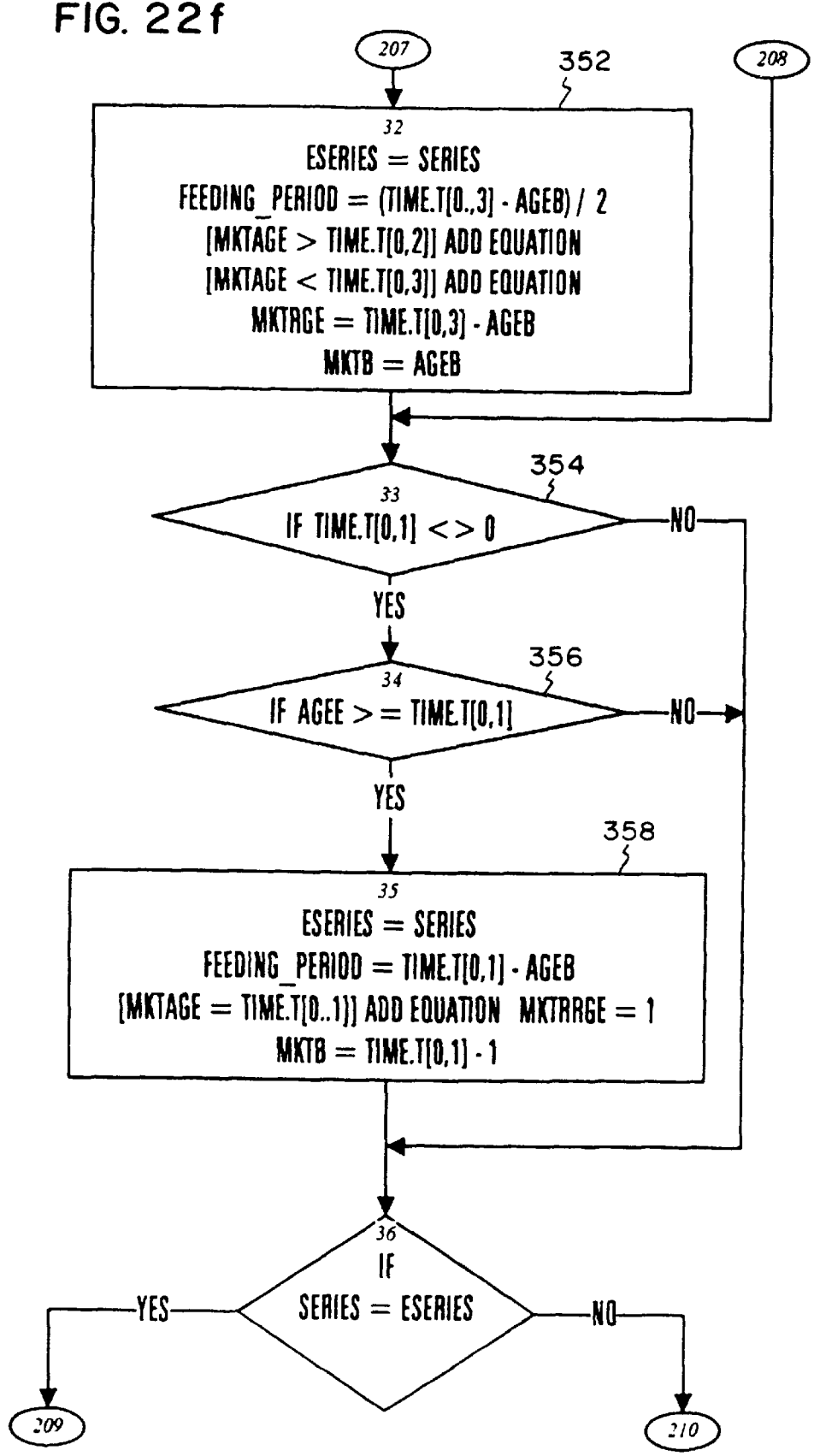
Figure 22G:
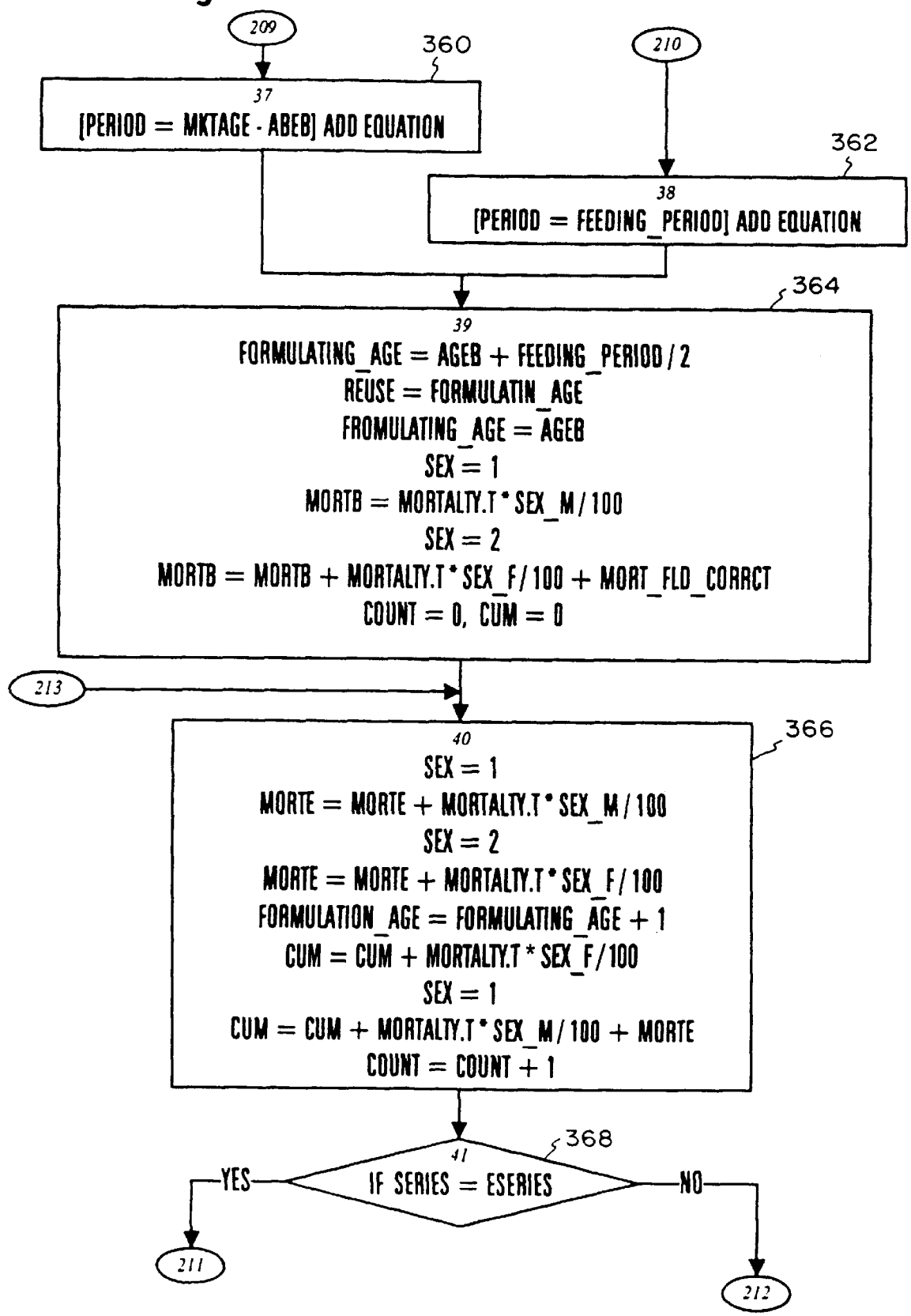
Figure 22H:
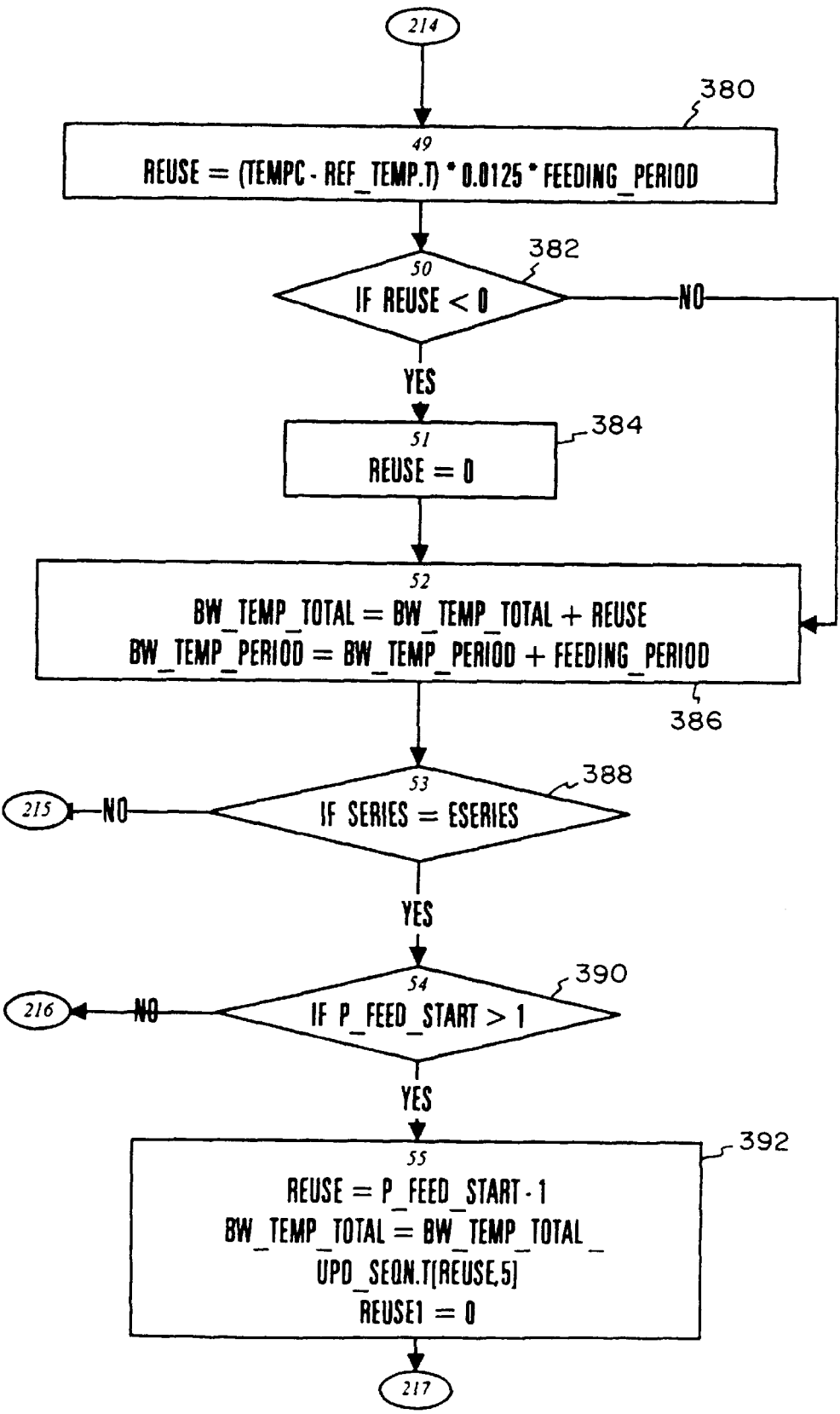
Figure 22I:
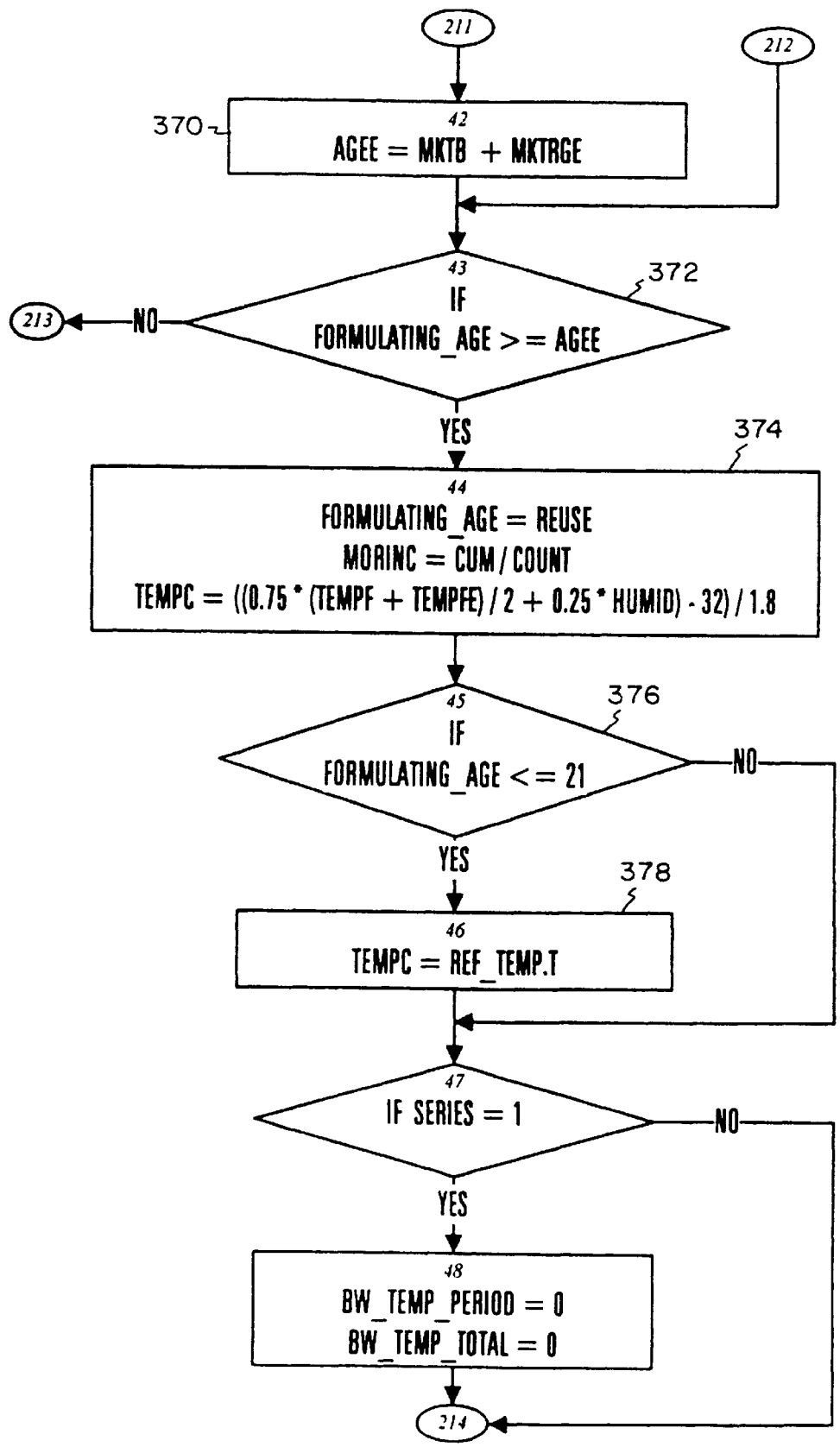
Figure 22K:
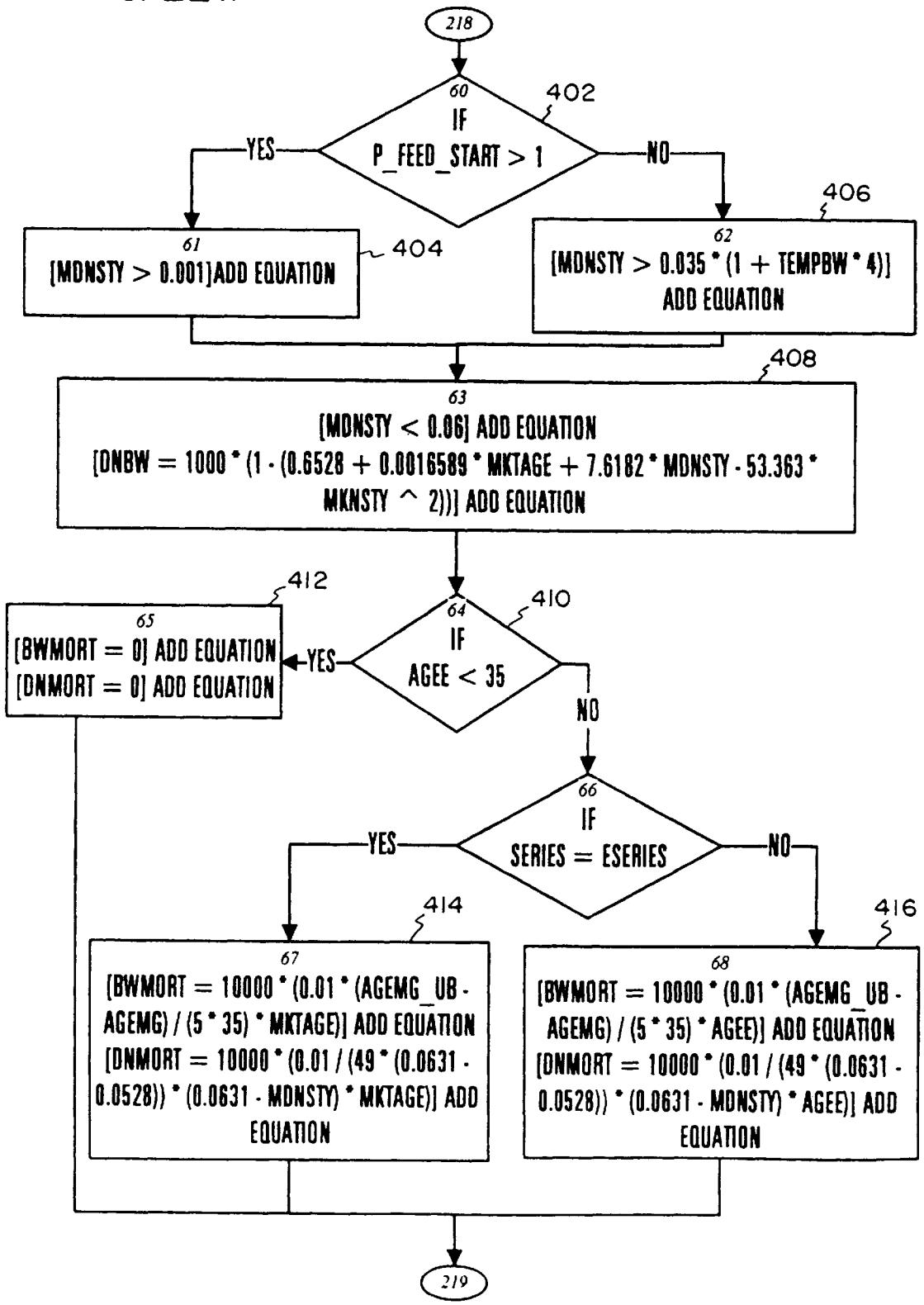
Figure 22:
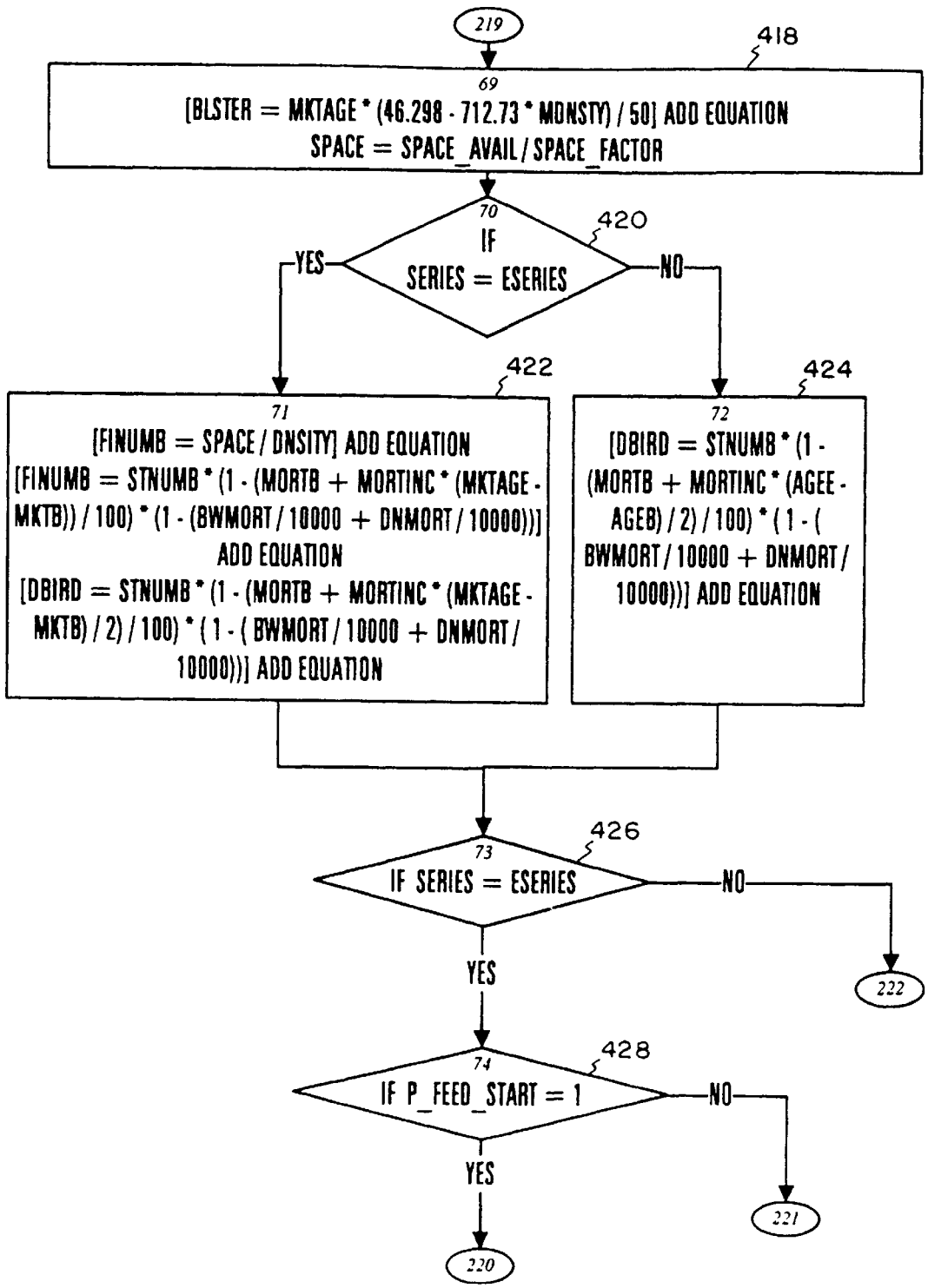
Figure 22:
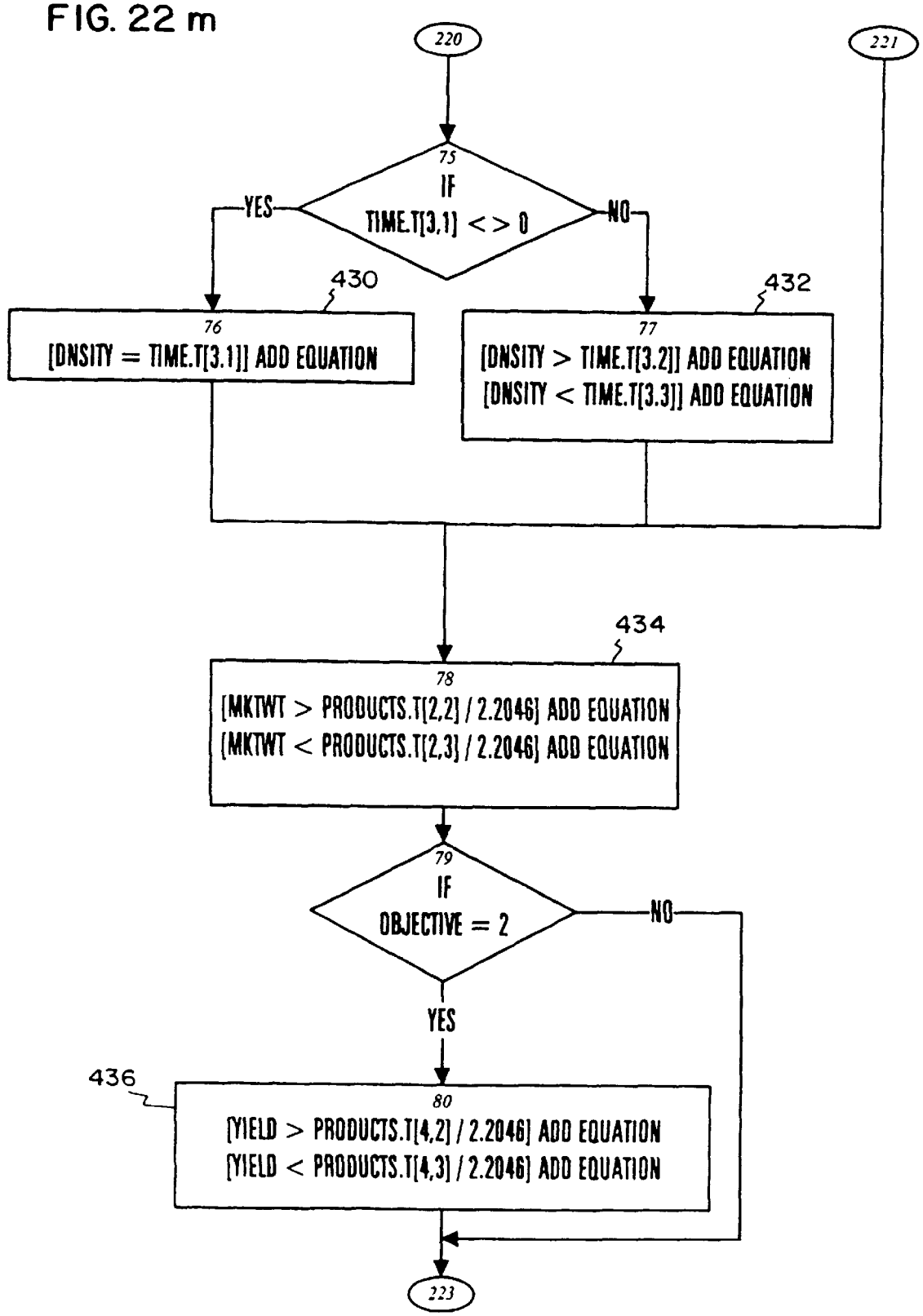
Figure 22:
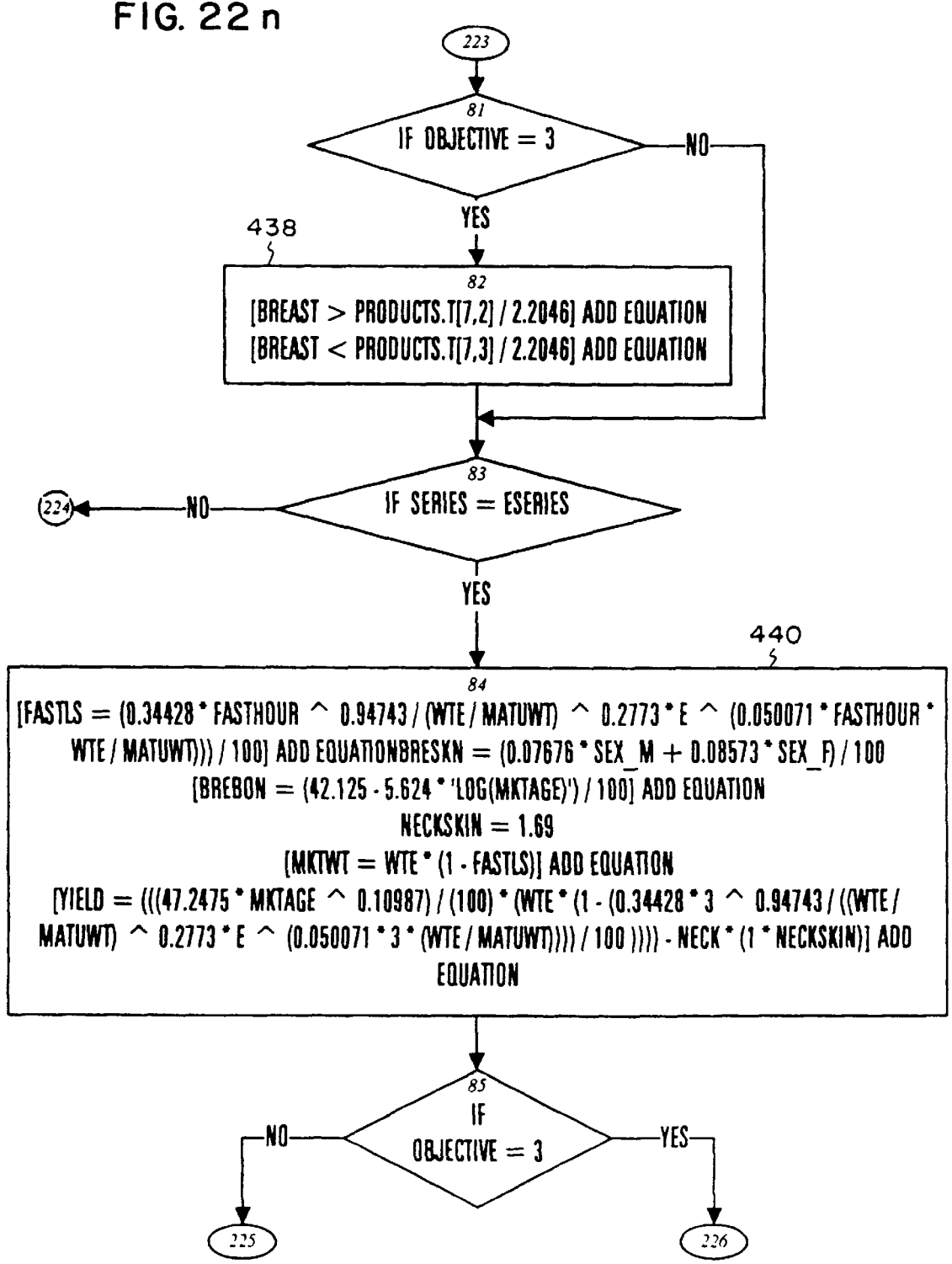
Figure 22O:
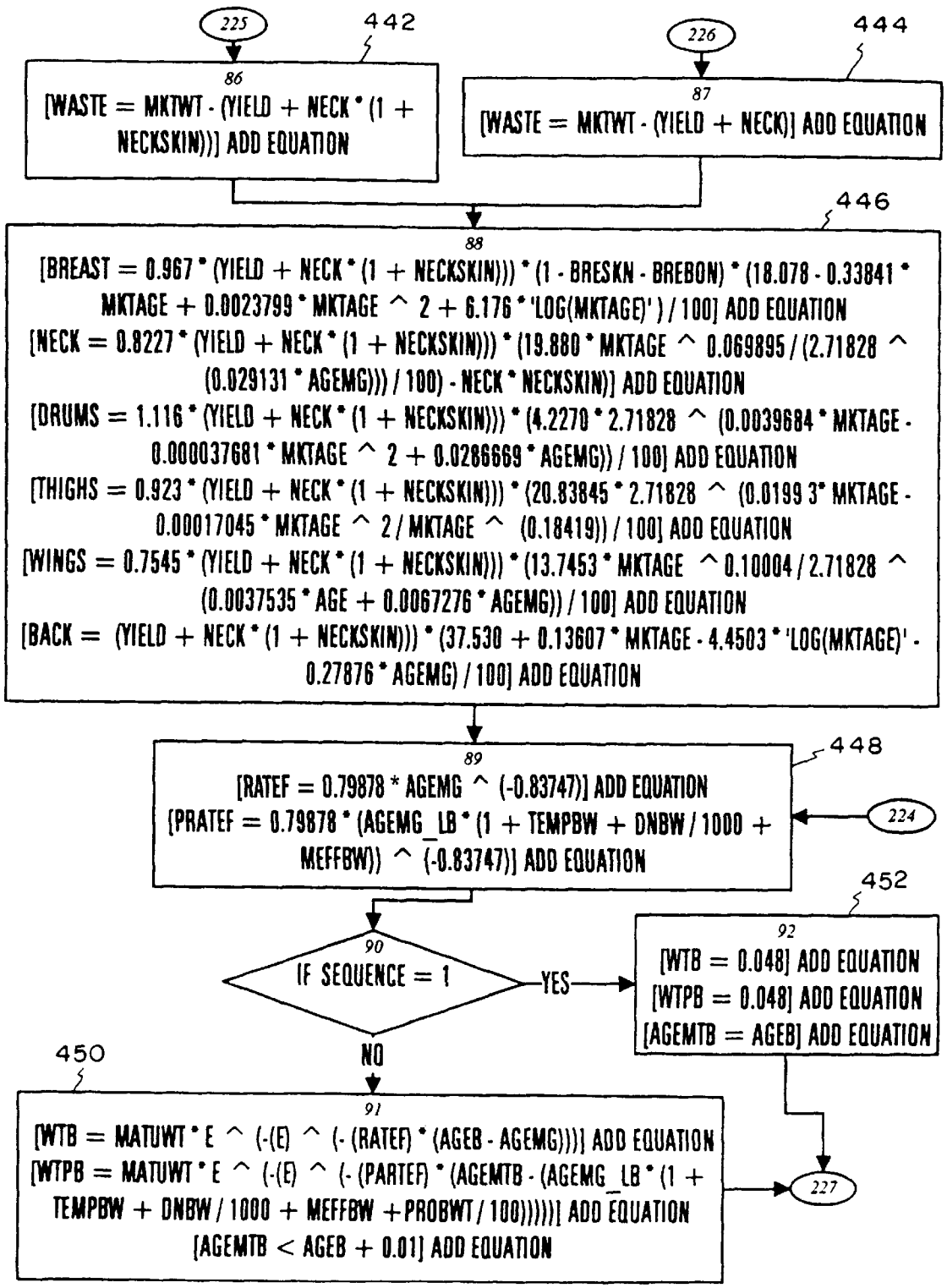
Figure 22:
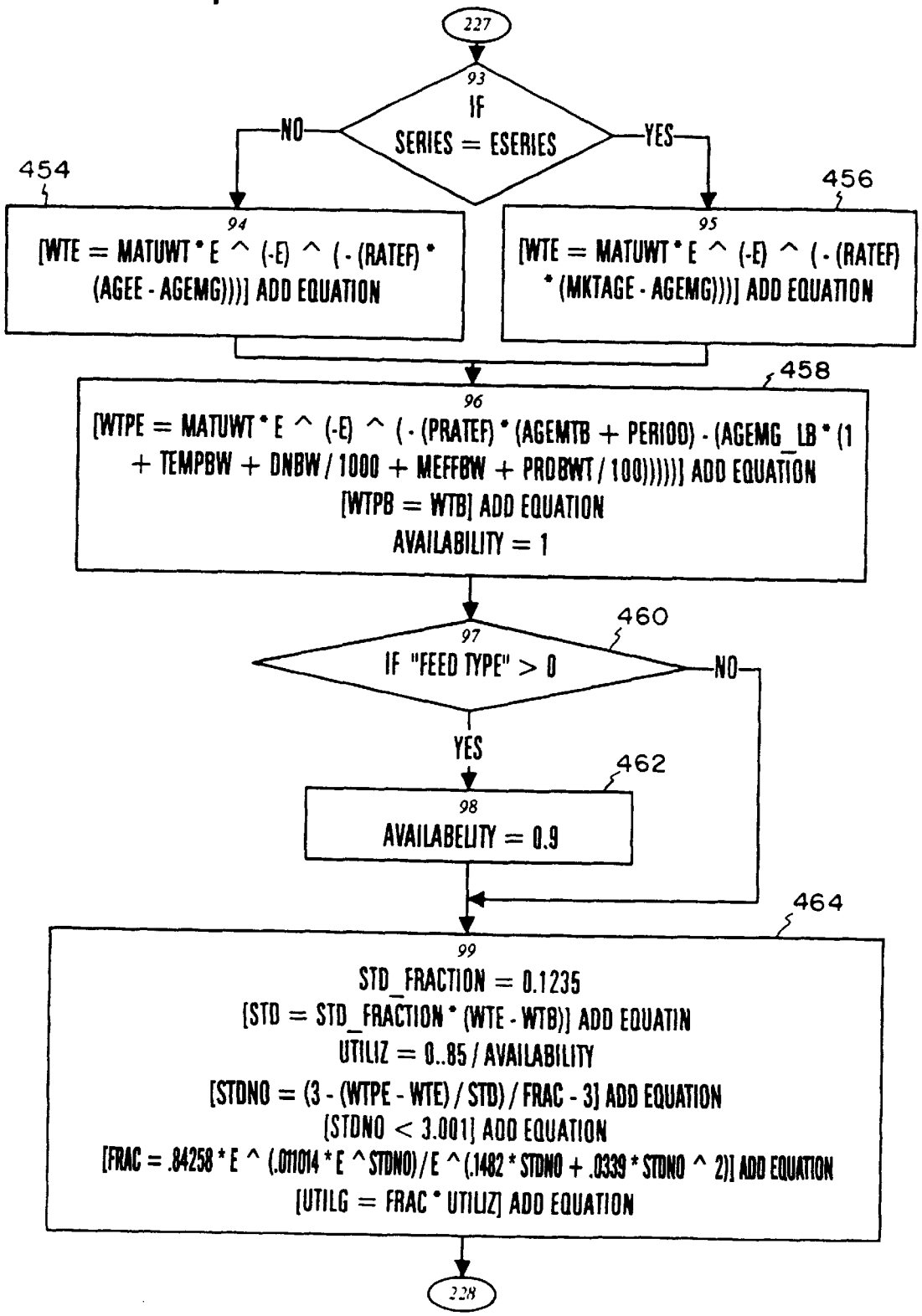
Figure 22Q:
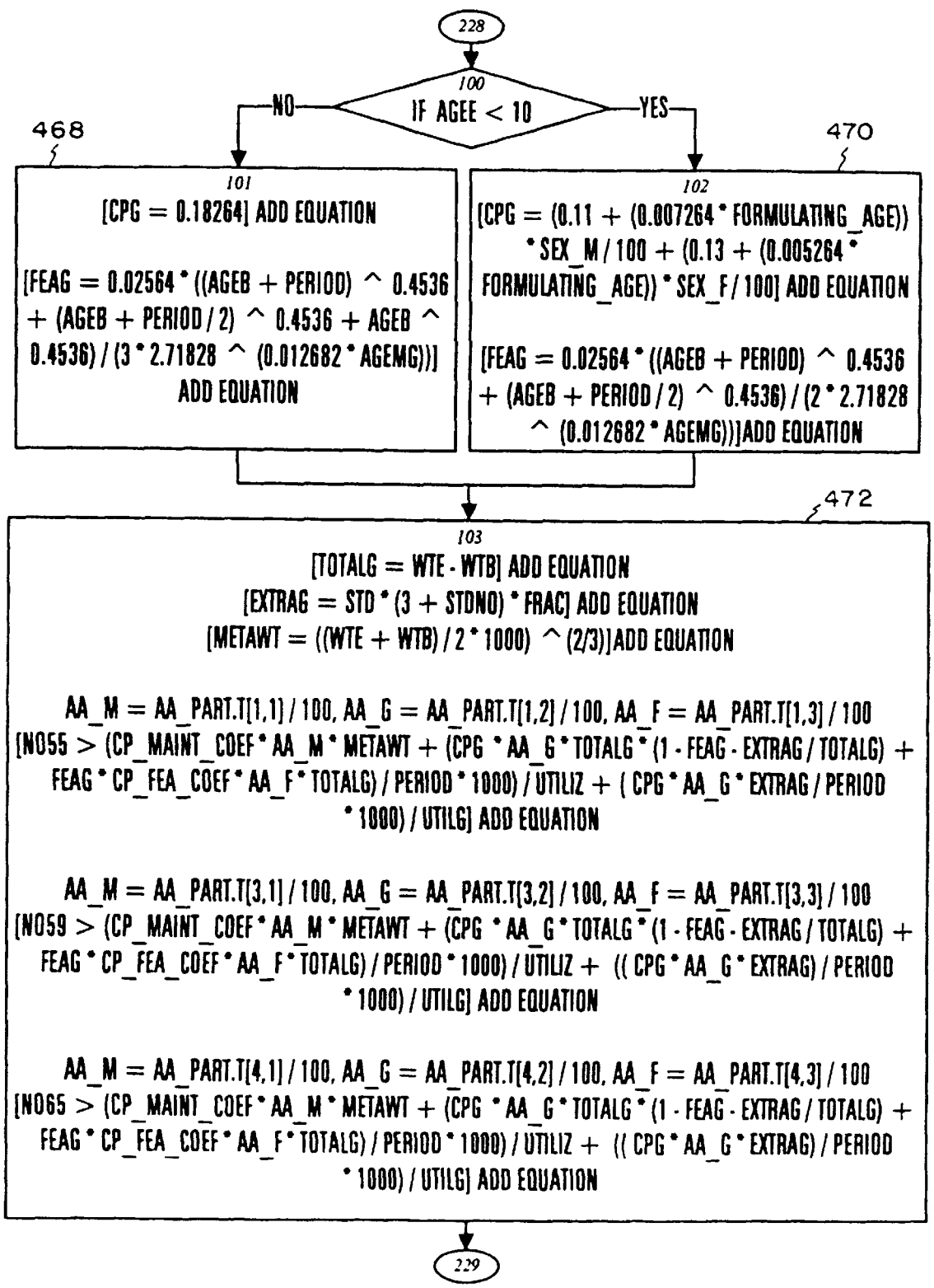
Figure 22:
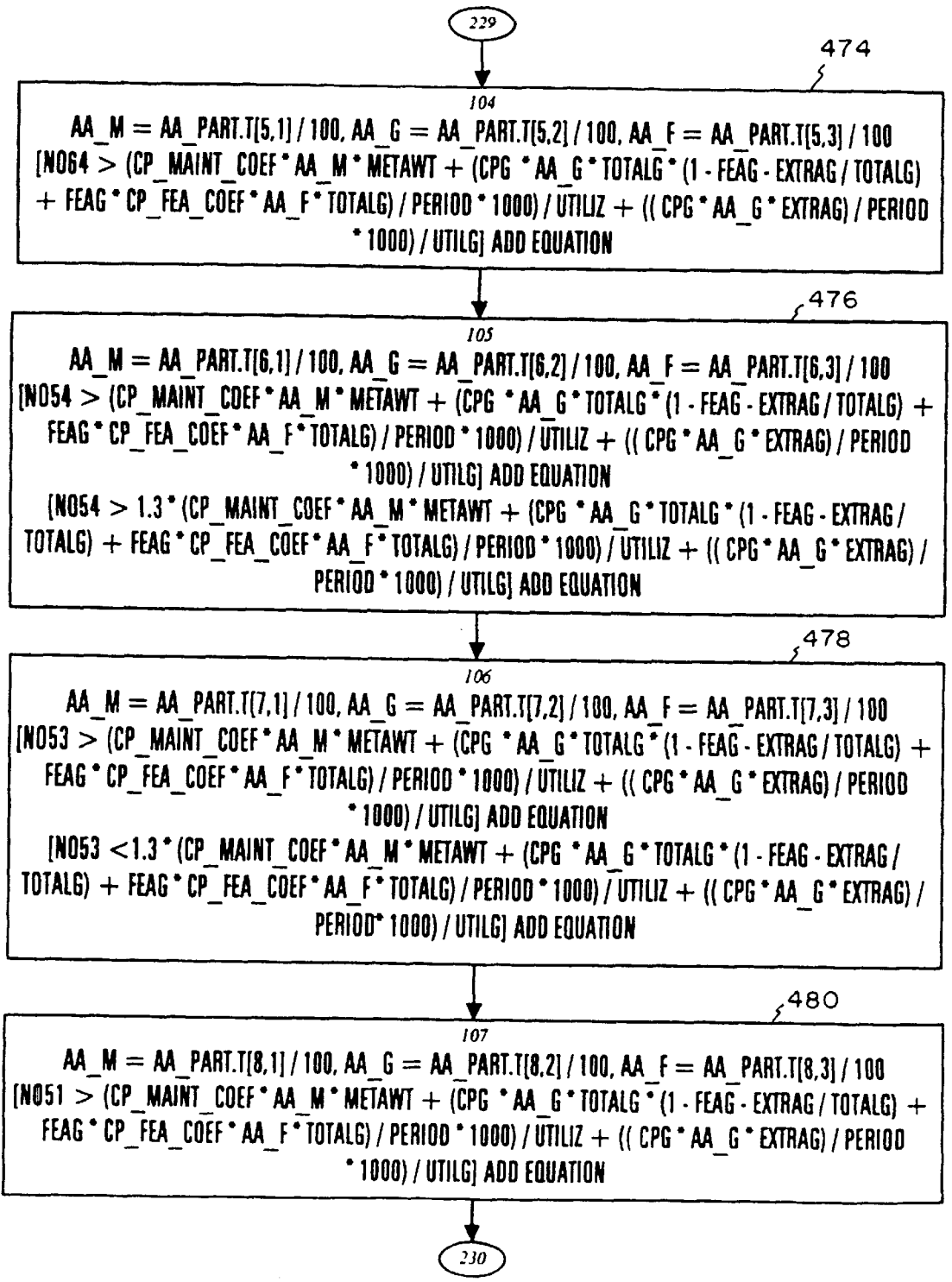
Figure 22:
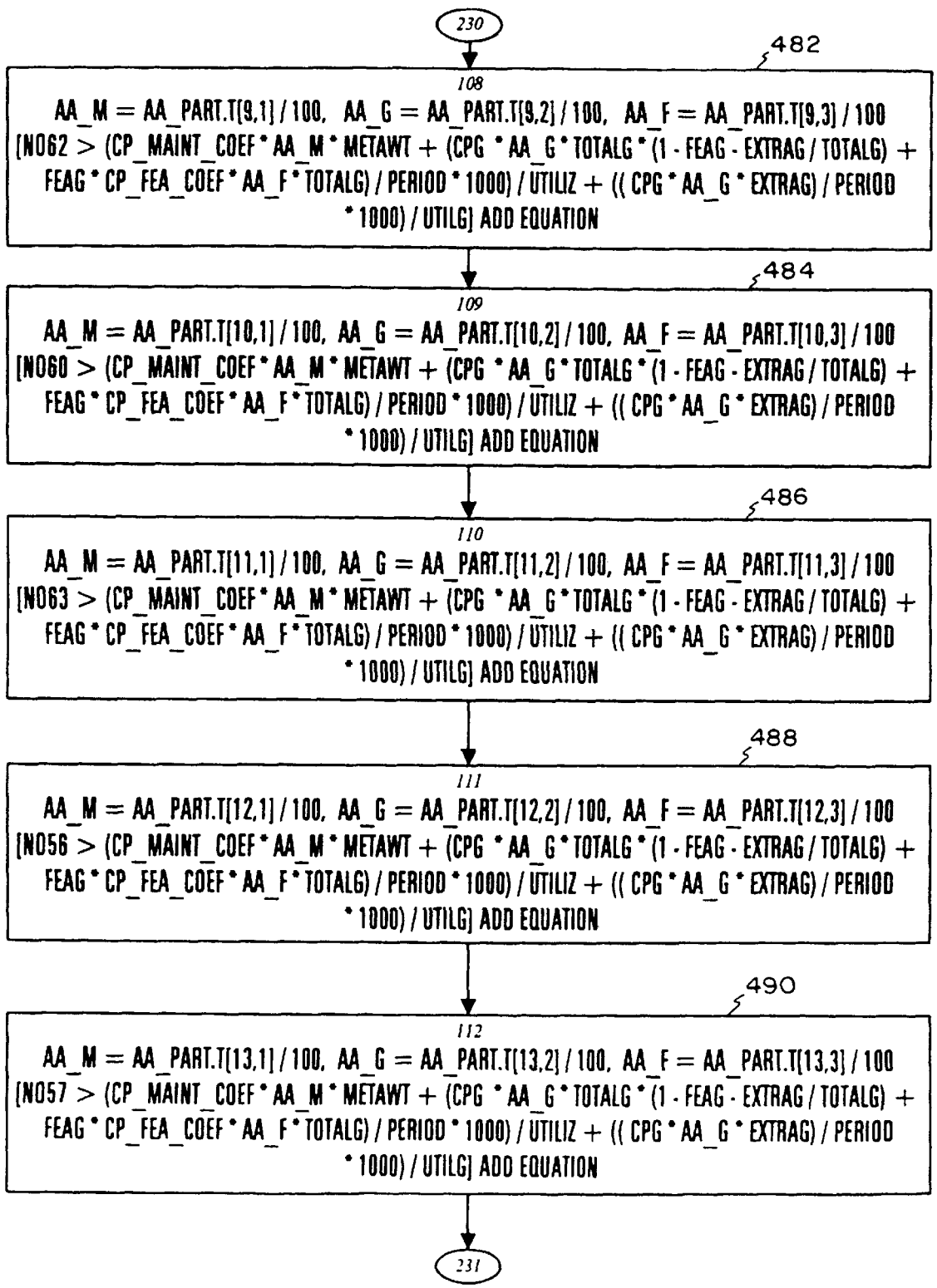
Figure 22U:
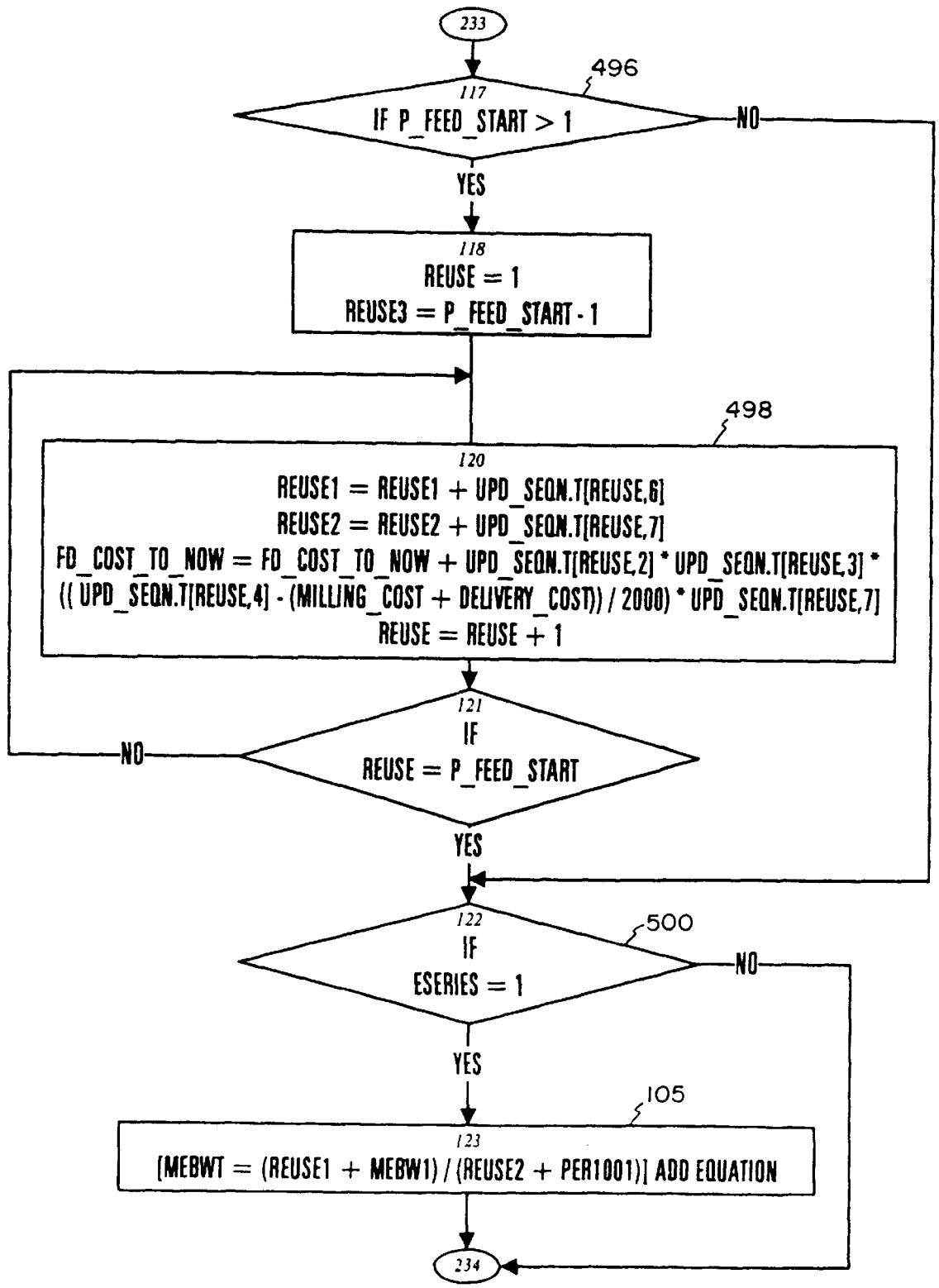
Figure 22:
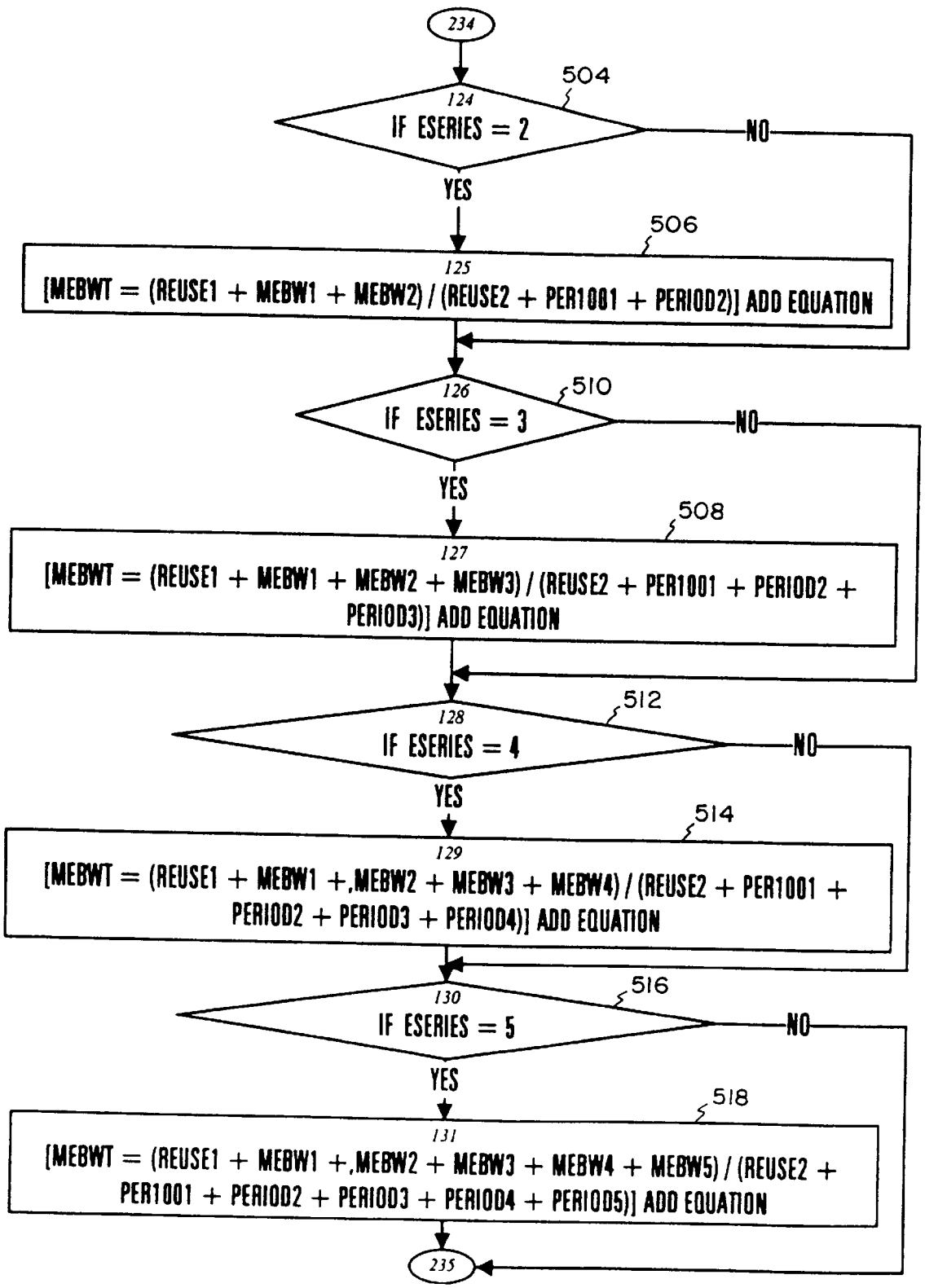
Figure 22W:
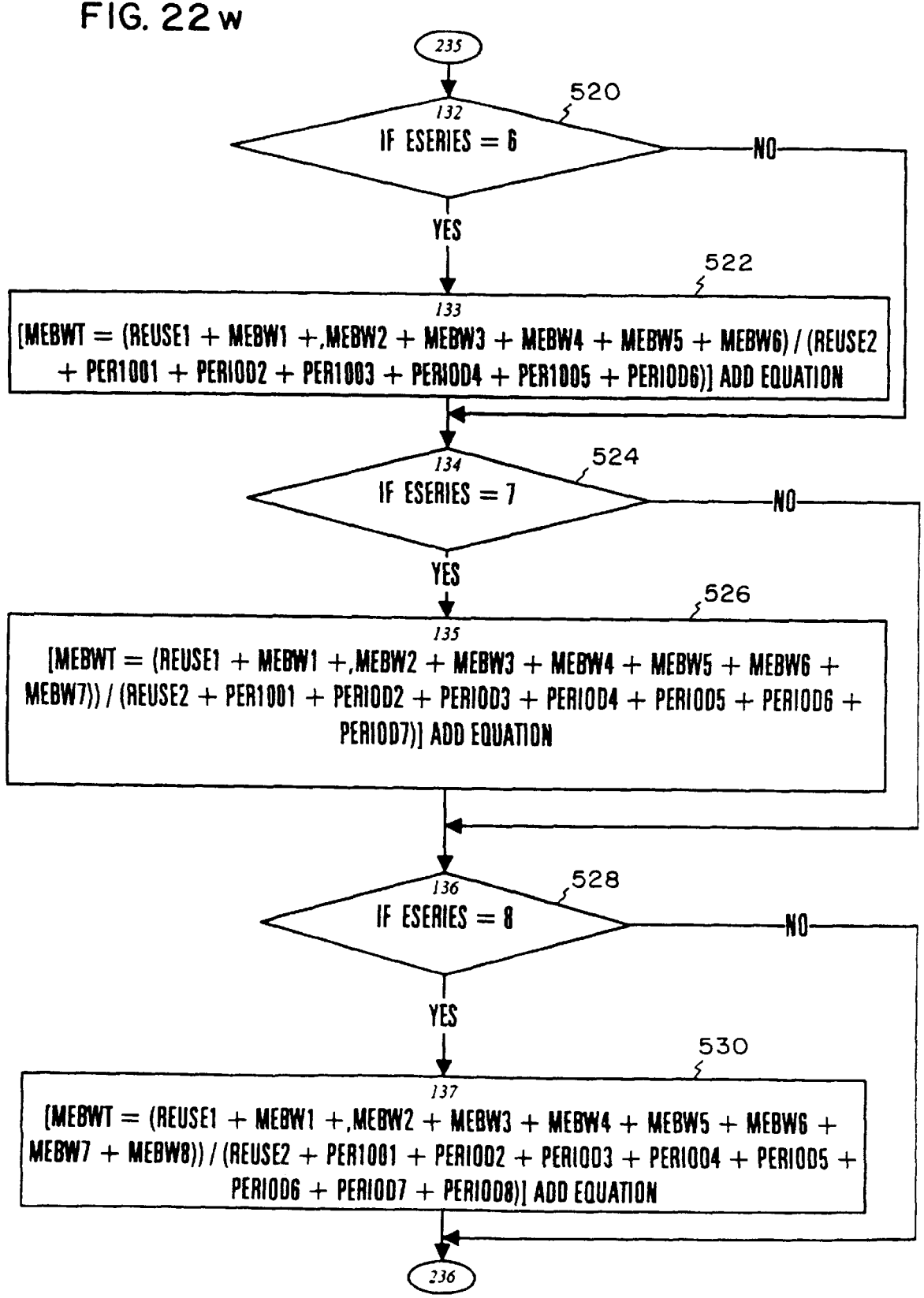
Figure 22X:
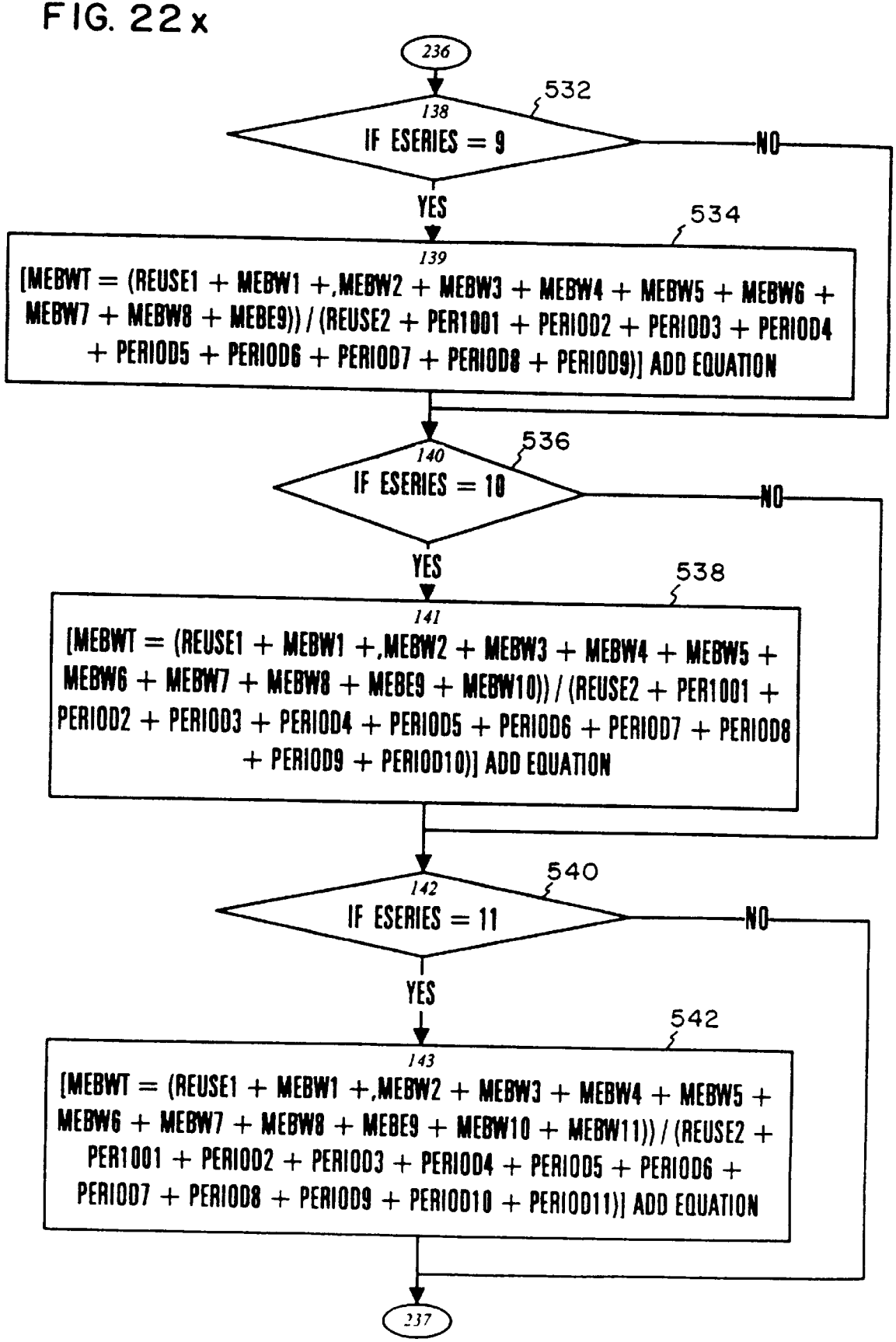
Figure 22Y:
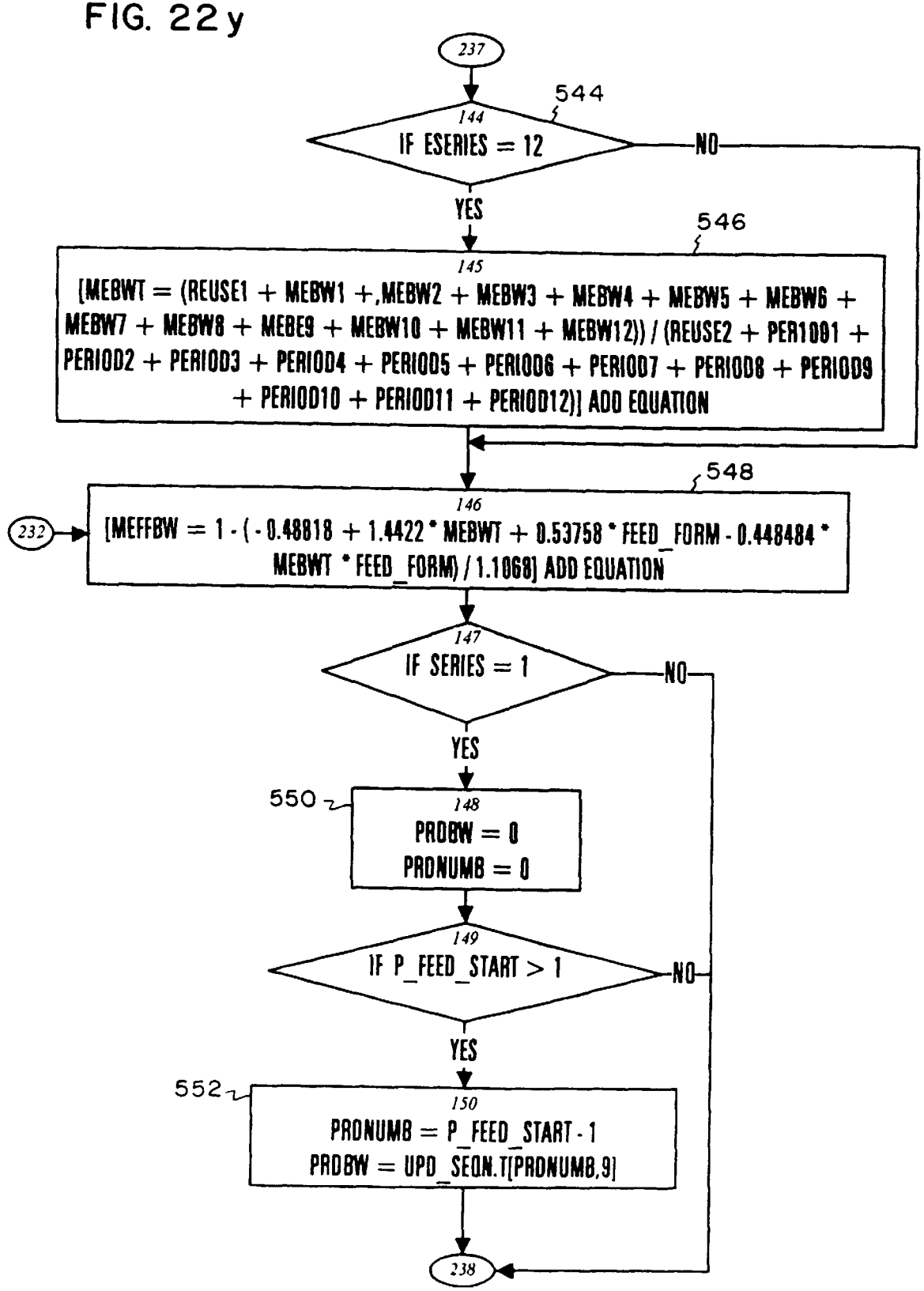
Figure 22Z:
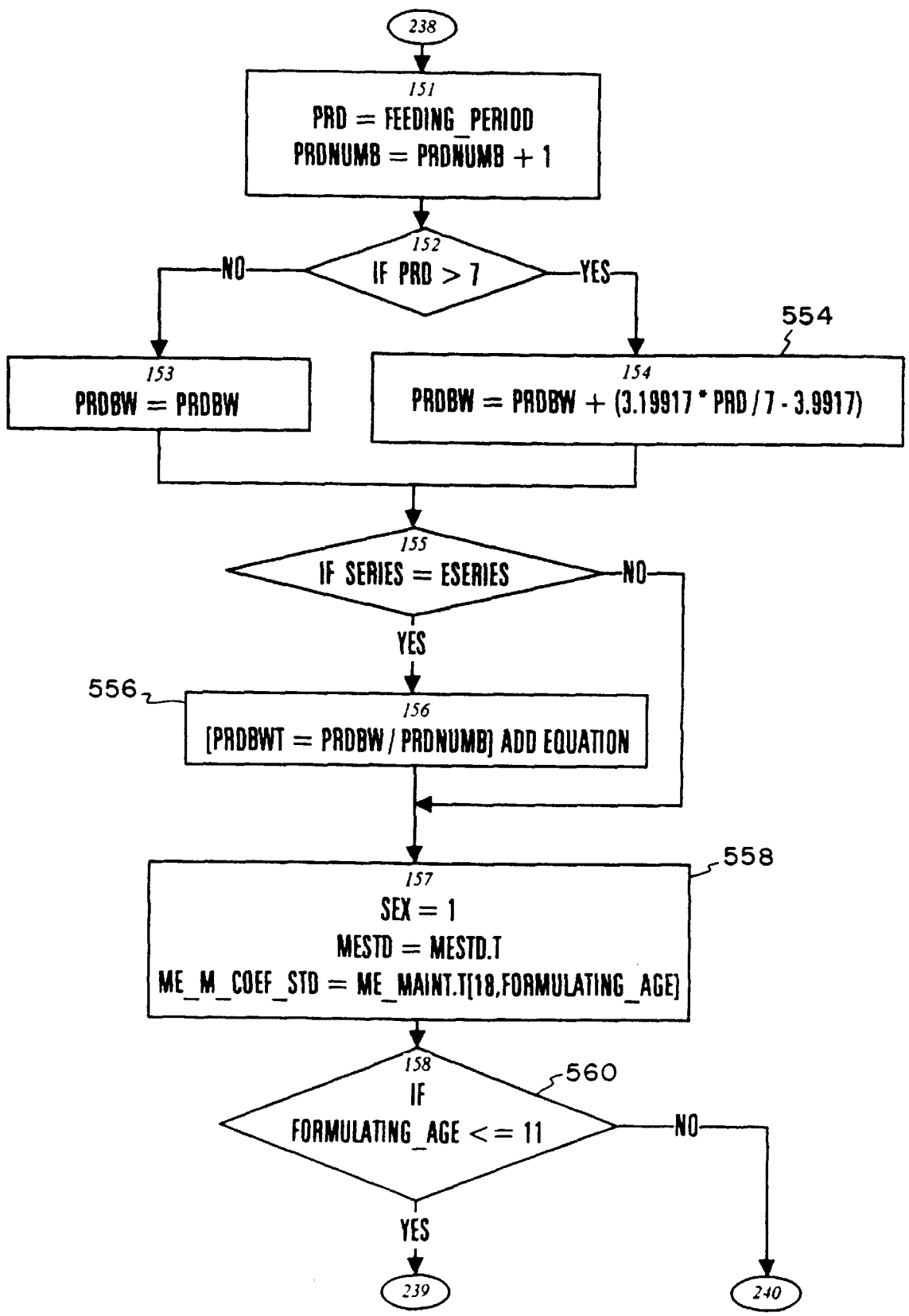

FIGS. 22a–22ai set forth a slow chart that describes the operation of the program in greater detail. In this flow chart, the program begins at block 300. The mathematical constant e (e=2.71828) and a space correction factor (SPACE_FACTOR=1000) are established at block 302. If this is the first time the model is executed, set the age, temperature, humidity values from a table for the current conditions, and set the mortality correction to zero, block 304. The sequence value is then set to the current period, block 306.

If the sum of the percentage of males and females does not total 100% (plus or minus 1%) indicate a failure in the program at block 308. The next step is to give the optimizer an impossible condition at block 310 and indicate that this is the last of the series of passes, thus the user does not see the incorrect values.

If the starting feed period begins when the animal is born or hatched, (P_FEED_START=1), block 312, set feed cost correction by body weight to zero (FDBWT=0), block 314. Then skip to block 342. If the starting feed period begins at some point other than the birth of the animal (P_FEED_START>1), block 316, update the (model) sequence number and feed cost correction by body weight, blocks 318 and 320, respectively. Current condition information such as age, temperature and humidity is then entered, block 322.

If this is not the first pass of the program skip to block 340. Otherwise, compare optimized body weights to the field body weights at blocks 324–334. More specifically, find the current age of the animals, look up the values in the age database and compare it to the real body weights (P_AVE_BWT). Also compute the standard deviation (REUSE1) in the weighed animals and the real age (REUSE3), block 324. Check for errors at block 326 in order to eliminate faulty values for body weights based on variation, and the number of animals weighed. Upon finding an error, set the standard deviation to a very large number, block 328. If the standard deviation is more than two or less than negative two, add the equation for weight at the beginning of the current period (WTB) with the equations in block 332. Otherwise add the equation for weight at the beginning of the current period (WTB) with the equations in block 334.

Compute the field mortality correction (MORT_FLD_CORRCT) at block 336. If it is more than four or less than negative four, set it to zero at block 338. Add equations to the model for the number of birds placed, block 340.

At block 342, set the beginning age (AGEB) to be the current age (AGE) and set the feeding period (FEEDING_PERIOD) to be 0. At block 344, set the ending age (AGEE) of the current sequence to be the beginning age of this sequence as found in the database provided and accumulate it. Do the same step for the feeding period. Retrieve the temperature for the sequence (TEMPFE) from the database, block 346.

Next, set the minimum and maximum market age. If the market lock age is zero, block 348, and the ending age of the sequence is greater than the minimum allowed market age, block 350, indicate that this will be the end of the series of passes through the program (ESERIES=SERIES), block 352. Also at block 352, add equations that set the range for the market age, setup values for the market range (MKTRGE) and the beginning market ages (MKTB, step 32). If the market lock age is not zero. Block 354, and the ending age of the sequence is greater than the maximum allowed market age, block 356, indicate that this will be the end of the series of passes through the program (ESERIES=SERIES), block 358. Also at block 358, add equations that set the range for the market age, set the market range to one day period and market beginning day equal to one day less than locked market age.

If SERIES=ESERIES add an equation for the period as shown in block 360. If SERIES does not equal ESERIES, add an equation for the period as shown in block 362.

At block 364, set the age for the diet formulation (FORMULATING_AGE) equal to the age at the middle of the current period. Then compute the beginning mortality (for current conditions) for the males and females depending on the respective percentages and add in the correction factor. At blocks 366–372, compute the mortality for each day from the beginning of the period until the end of the period and add the results to get the cumulative mortality. At block 374, divide the cumulative value by the number of days in order to obtain the incremental mortality (MORTINC).

Also compute the effective temperature at block 374. However, if the age of the current diet formulation is less than 21 days, block 376, retrieve the value of the effective temperature from the reference temperature table for the current conditions, block 378. Next compute the adjustment period for temperature effects on body weight at block 380–384. At block 386, add that correction factor to the total correction factor for body weight affected by temperature (BW_TEMP_TOTAL), and setup the period over which the correction factor is applied (BW_TEMP_PERIOD).

If this is not the end of the series skip to block 400. If the feed starting period is at the beginning, skip to block 398. Otherwise, summarize up to date temperature effects on body weight (block 392) and the number of days from a table (BW_TEMP_PERIOD) (block 394). At block 398, add an equation to the model for the body weight temperature correction (TEMPBW).

At block 400, compute the weight at maturity (MATUWT), place a constraint for minimum age at maximum gain (AGEMG_LB), and maximum ages at maximum gain (AGEMG_UB). Additionally, add an equation to the model for the animal density (DNSITY). If the feed starting period is not the first, block 402, add an equation to the model that indicates mass density (MDNSTY whose units are sq. meter/kg^0.67) is greater than a very small number, block 404. Otherwise calculate the lower limit of the mass density at block 406. At block 408, set an upper limit on the mass density and then add an equation to the model for the correction factor for body weight as a function of bird density (DNBW). If the ending age for the period is less than 35 days, block 410, set the mortality as a function of body weight (BWMORT) and mortality due to density (DNMORT) to zero, block 412. Otherwise they are calculated in either block 414 or 416. More specifically, if this is the end of the series use the equations for BWMORT and DNMORT in block 414, which are based on the market age (MKTAGE). Otherwise the use the equations in block 416, which are based on the ending age (AGEE) for the current period.

At block 418, add an equation to the model to take into effect the blistering on the breast of the bird.

If this is the end of the series, block 420, add equations to the model for number of birds at processing time (FINUMB) and the average number of birds in the period (DBIRD) based on the market age (MKTAGE), block 422. Otherwise, only add an equation for DBIRD based on the ending age of the current period, block 424.

If this is the last of the series, block 426, and the first time for the feed formulation (P_FEED_START=1), block 428, then add equations for animal density as provided in tables, blocks 430 and 432. If the user has supplied a fixed animal density, use it (block 430) otherwise set the constraints in minimum and maximum as found in a table (block 432).

At step 434, set constraints in the model for the maximum and minimum weight at market time from a table. If the objective is the weight of the carcass without giblets (W.O.G.), add equations for eviscerated carcass yield at block 436. If the objective is cut up parts, set constraints on breast yield at block 438.

If this is not the last of the series skip to block 448. Otherwise, add equations to the model that effect the body weight loss from fasting (FASTLS) during the time that it is being taken to market, block 440. Additionally, find the percentage of skin on breast (BRESKN) and neck (NECKSKIN) from tables for the current conditions. Use these corrections in equations that are added to the model for breast bone (BREBON), market weight (MKTWT), and yield (YIELD).

If the objective is cut up parts, add an equation for waste (WASTE), either block 442 or 444. Next, add the equations for breast, neck, drumsticks, thighs, wings, and back to the model, block 446. Then add the equations to the model for the Gompertz rate factor (RATEF) and the rate factor for potential growth (PRATEF), block 448.

Depending on whether this is the first period in the sequence, add the equations from either block 450 or 452 to the model. These blocks included different variations for the equations for the weight at the beginning (WTB) of the period, weight at beginning of the period (WTPB) for potential growth curve, and age at the beginning for maturity (AGEMTB). Similarly add an equation for the weight at the end (WTE), block 454 or 456. At block 458, add the equations to the model for the weight at ending period for potential growth (WTPE) and set the weight at the beginning period of potential growth equal to the weight at the beginning of optimized growth.

If the feed type is not zero, block 460, use 90% of amino acid availability as a standard parameter, block 462. Otherwise the standard availability of amino acids is 100%, block 458. At block 464, add equations for the standard deviation for body weight (STD), the number of standard deviations for average gain in body weight (STDNO), fraction of normal curve (FRAC), and efficiency of non-linear gain (UTILG).

Depending on whether the animal's age is less than ten days, add equations for protein gain and feather gain set forth in block 468 or 470.

At block 472, add the equations for the total gain (TOTALG), extra gain (EXTRAG) and the average metabolic weight (METAWT). Then obtain the amino acid content for maintenance (AA_M), weight gain (AA_G) and feather gain (AA_F) from the knowledge base for Arginine, Lysine, Histidine, Isoleucine, Leucine, Methionine and Cystine combination, Methionine, Phenylanine and Tyrosine combination, Phenylanine, Threonine, Tryptophan, and Valine. Add constraints for each of these nutrients to the model at blocks 472–490, respectively.

The next step is to add equations for fat gain (FATG), feed intake (FI) and nutrient Metabolizable Energy (N002) to the model, block 492. Then add constraints for period and accumulating effect of metabolizable energy on body weight taking into account nutritional density and feed form at this point (MEBW and MEBWT), block 494.

If the user is reoptimizing, block 496, compute the feed cost to the present (FD_COST_TO_NOW), block 498. For each sequence from the beginning of the period, look up the effect of metabolizable energy on gains in the sequences, the feed costs in the database, and sum them together. The user is reoptimizing if the feed start period is not the first period.

Depending on the current pass in the series, compute the effect of metabolizable energy on weight gain (MEBWT) by adding up the metabolizable energy weights from the previous passes and one in the current pass and dividing the sum by the lengths of the periods of the previous passes, blocks 500–546.

At block 548, add the equations to the model for body weight correction that is dependent on metabolizable energy and the feed form (MEFFBW).

In the first pass in the series, set the values of the period body weight and the number of the period to zero, block 550. Then look up the effect of period on body weight in the knowledge base at block 552. If the feeding period is greater than 7 take into account the effect of the length of the feeding period on growth, block 554. If this is the last of the series of passes, compute the average effect of body weight for the entire cycle (PRDBWT), block 556.

The next step is to obtain the standard metabolizable energy values (MESTD) and calculate the standard metabolizable energy maintenance coefficient for the current conditions (dependent on animal age). This task is accomplished by looking up the value for males and females in the database and multiplying by the respective percentages, blocks 558–568. Then add an equation to the model for the metabolizable energy at 65 degrees Fahrenheit (ME65F), block 570.

Then change the standard intake of calcium, phosphorus, sodium and chlorine by adjusting it to the 65 degree fahrenheit energy levels. Next add the constraints for each nutrient (NO14 and NO16) blocks 570 and 572. An equation for the number of cycles per year (CYCLE) is then added to the model, block 572.

In order to speed up computations, some initial values are provided at blocks 574 and 576 for AGEMG, RATEF, BWTB, BWTE, FAT, ME, which allow the system to make some initial guesses. If this is the end of the series, add different guesses for BWTE, ME, FINUMB, STNUMB, MKTWT, RATEF, YIELD, and BREAST at block 578. Then add guesses for N002, METAWT, FI, STDNO, WTB, WTE, WTPB, WTPE, AGEMTB, and METRUE at block 580. If this is the last pass in the series add guesses for MEFFBW and MEBWT at block 582.

If market lock age was not set by the user, guess the market age to be half way between the maximum and minimum market age, block 584. Otherwise set it be the lock age, block 586. At block 588, set guess values for DNSITY, MDNSTY and MKTAGE.

Finally, the system sets the parameters for the optimizer. The optimization package has tunable parameters that are set at block 590 to provide better performance. Equations for flock parameter (FSIZE) are then added to the model at block 592.

At block 592, price information is the retrieved from the knowledge base market weight of animal, and prices for various parts are set. Also look up the fixed enterprise costs and the sub-objective to be optimized. If the objective is cut up parts, look up the price of wasted product at block 594. If the objective selected by the user is to maximize the live bird weight, add the equations of block 596 to the model in order to constrain the sub-objectives and the maximum return on investment. If the objective selected by the user is to maximize the eviscerated carcass weight, add the equations of block 598 to the model in order to constrain the sub-objectives and the maximum return on investment. If the objective selected by the user is to maximize the price of the body parts, add the equations of block 600 to the model in order to constrain the sub-objectives and the maximum return on investment.

Then obtain the minimum and maximum requirements from the knowledge base for the available feed ingredients, blocks 602–608.

Figure 21A:
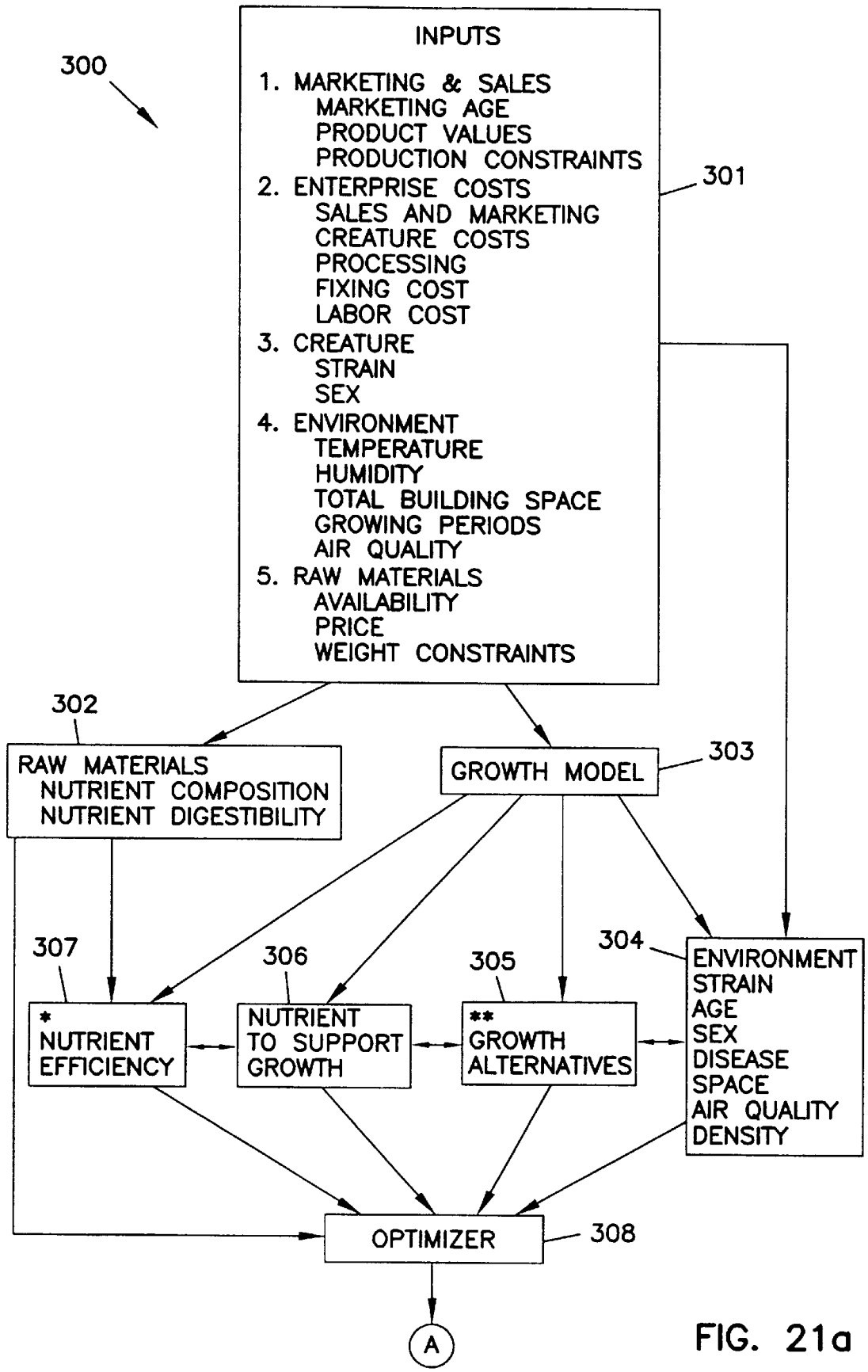
FIG. 21 is an information flow diagram for the program logic of FIG. 20.
Figure 21B:
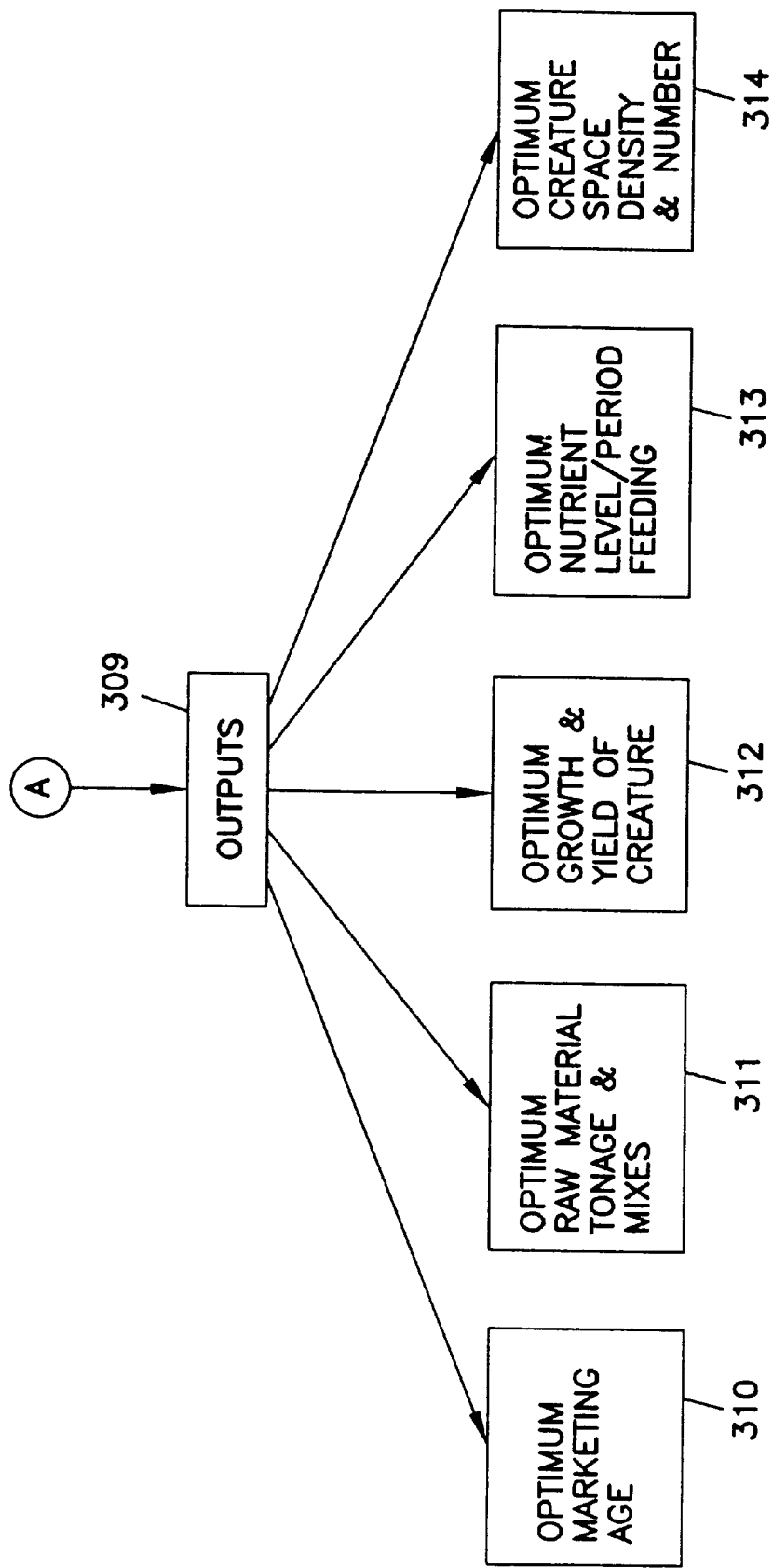

FIG. 21 describes the information flow of the program execution. The information flow is shown generally at 300. Block 301 illustrates the various inputs into the logical program flow in order to calculate and solve the various equations. Block 302 includes information on nutrient composition and digestibility which may be stored in the form of a look-up table or some other known database structure. This information is provided to block 307 where data and/or equations on the nutrient efficiency is stored. Additional information is provided to block 307 from the growth model block 303 and the nutrient to support growth block 306. Each of the various blocks 302, 307, 306, 305, and 304 provide information and equations to optimizer block 308 which solves the equations in an optimized manner. The outputs of optimizer block 308 are provided to output block 309 which provides the results to the journal data base 204 (best seen in FIG. 20). This information is illustrated as including: optimum marketing age, block 310; optimum raw material tonnage & mixes, block 311; optimum growth & yield of creatures, block 312; optimum nutrient level/period feeding, block 313; and optimum creature space density & number, block 314.

Therefore, it can be seen that the present invention provides significant industrial advantages in modeling the nutrient utilization efficiency of a population and its simultaneous conservation. The above discussion, examples and embodiments illustrate the current understanding of the invention. However, one skilled in the art will appreciate that various changes may be made without departing from the spirit and scope of the invention. Thus, the invention resides wholly in the claims hereafter appended.

What is claimed is:

1. A process of feeding and managing pollution in a population of animals so that utilization effectiveness of consumed nutrients is optimized, the process comprising the steps of:
   (a) determining a standard deviation for an average period gain of the population and an average period potential gain of the population;
   (b) comparing the actual gain of the population with the average period potential gain to determine a number of standard deviations of non-linear gain, wherein nutrients to support the linear and/or non-linear gain may be determined;
   (c) determining the nutrients that support the linear and/or non-linear gain; and
   (d) feeding the determined nutrients to the population of animals, wherein the utilization effectiveness of the nutrients is substantially optimized.

2. The process of claim 1, further comprising the steps of determining a nutrient efficiency of non-linear and linear gain by calculating an efficiency at predetermined steps of standard deviations and taking an average of each calculated efficiency, wherein the linear gain and the non-linear gain can be used in combination with their respective efficiency to create a diet for the whole population.

3. The process of claim 1 wherein the step of determining the nutrients includes the step of determining the type and amount of nutrients to feed the population of animals.

4. The process of claim 3 wherein the step of determining the nutrients includes the step of determining the amount of nutrients to feed the population of animals per unit time so as to evoke a measured quantifiable gain.

5. A process of feeding a population of animals so that utilization effectiveness of nutrients is substantially optimized, the process comprising the steps of:
   a) determining a number of standard deviations for an average non-linear gain of the population of animals;
   b) determining a nutrition efficiency ratio (EFR) in accordance with the following function: EFR=f(STD) where EFR is the nutrient efficiency ratio and STD is the number of standard deviations;
   c) determining the type and amount of nutrients to feed the population based upon the calculated nutrient efficiency ratio; and
   d) feeding the determined nutrients to the population of animals, wherein the utilization effectiveness of the nutrients is substantially optimized.

6. The process of claim 5 further comprising the step of determining the efficiency of non-linear gain according to the following equation: EFNL=EFL×EFR, where EFNL is the nutrient efficiency of non-linear gain and EFL is the nutrient efficiency of linear gain.

7. A program storage device readable by a computer, tangibly embodying a program of instruction executable by the computer to perform method steps for optimizing the utilization effectiveness of nutrients of a population of animals, the method comprising the steps of:
   a) determining a number of standard deviations for an average non-linear gain of the population of animals; and
   b) determining a nutrient efficiency ratio (EFR) in accordance with the following function: EFR=f(STD); where EFR is the nutrient efficiency ratio and STD is the number of standard deviations.

8. The program storage device of claim 7 wherein the method comprises the additional step of determining the efficiency of non-linear gain according to the following equation: EFNL=EFL×EFR, where EFNL is the nutrient efficiency of non-linear gain and EFL is the nutrient efficiency of linear gain.

9. The program storage device of claim 8 wherein the program of instructions are further executable to determine the optimal feed for the population of animals, the method comprising the additional steps of:
   a) determining the type and amount of nutrients to feed the population based upon the calculated nutrient efficiency ratio; and
   b) feeding the determined nutrients to the population of animals, wherein the utilization effectiveness of the nutrients is substantially optimized.

10. A computer program article of manufacture comprising:
    a computer usable medium having computer readable program code embodied thereon for optimizing the utilization effectiveness of nutrients of a population of animals, the computer readable program code comprising:
    computer readable program code means for causing a computer to determine a number of standard deviations for an average non-linear gain of the population of animals; and
    computer readable program code for causing the computer to determine a nutrient efficiency ratio (EFR) in accordance with the following function: EFR=f(STD) where EFR is the nutrient efficiency ratio and STD is the number of standard deviations.

11. The computer program article of manufacture of claim 10 wherein the computer usable medium further comprises computer readable program code for determining the efficiency of non-linear gain according to the following equation: EFNL=EFL×EFR, where EFNL is the nutrient efficiency of non-linear gain and EFL is the nutrient efficiency of linear gain.

12. The computer program article of manufacture of claim 11 wherein the computer usable medium further comprises:
    computer readable program code for determining the type and amount of nutrients to feed the population based upon the calculated nutrient efficiency ratio; and
    computer readable program code for determining nutrients to feed the population of animals, wherein the utilization effectiveness of the nutrients is substantially optimized.

13. An apparatus for determining an optimal rate of growth for a population of animals and for determining a composition of feed for the population of animals so that the utilization effectiveness of nutrients is substantially optimized and nutrient resource conserved simultaneously, the apparatus comprising:
    (a) a first knowledge base configured to store information regarding predetermined characteristics of a population of the animals;
    (b) a second knowledge base configured to store information regarding ingredients that may be included in feed that is provided to the population of the animals;
    (c) first means for generating a model based upon the information stored in the first and second knowledge bases, the model describing the growth rate of the population of animals and having a plurality of simultaneous equations, the means for generating the model further having means for accessing the first and second knowledge bases;

(d) second means for generating nutrition equations for determining the utilization effectiveness of nutrients by the population of animals;

(e) an optimizer for solving the simultaneous equations thereby determining the optimal growth rate for the population of animals and for determining an optimal utilization effectiveness of the nutrients; and (f) an interface for transferring the model between the first means and the optimizer and for transferring the nutrition equations between the second means and the optimizer;

wherein the population of animals will yield a substantially maximized enterprise net margin when raised and fed so that the optimal growth rate and the optimal utilization effectiveness of nutrient are substantially realized.

14. The apparatus of claim 13 wherein the information in the second knowledge base includes a list of the ingredients that are available, a quantity of the available ingredients, a nutrient composition of the ingredients, and a cost of the ingredients.

15. The apparatus of claim 13 wherein the second means includes means for determining the nutrient efficiency ratio (EFR) in accordance with the following function: EFR=f(STD) where EFR is the nutrient efficiency ratio and STD is the number of standard deviations.

16. The apparatus of claim 15 further includes means for determining the efficiency of non-linear gain according to the following equation: EFNL=EFL×EFR, where EFNL is the nutrient efficiency of non-linear gain and EFL is the nutrient efficiency of linear gain.

17. The apparatus of claim 13 further comprising means for determining a composition for the feed given the information regarding ingredients stored in the second knowledge base, the composition providing a nutrient content that will substantially provide the optimal the utilization effectiveness of the nutrients.

18. An apparatus for determining the composition of feed for a population of animals so that the utilization effectiveness of nutrients is substantially optimized, the apparatus comprising:

(a) first means for determining a number of standard deviations for an average non-linear gain of the population of animals and for determining a nutrient efficiency ratio (EFR) in accordance with the following function: EFR=f(STD) where EFR is the nutrient efficiency ratio and STD is the number of standard deviations;

(b) a knowledge base containing information regarding raw materials available for use in feed including ingredients available for use in the feed and the nutrient composition for each of the ingredients; and (c) second means operatively connected to the first means and the knowledge base, the second means for determining the amount and composition of feed for feeding the population of animals so that the population will substantially realize the optimal utilization effectiveness of nutrients.

19. The apparatus of claim 18 further wherein said first means determines the efficiency of non-linear gain according to the following equation: EFNL=EFL×EFR, where EFNL is the nutrient efficiency of non-linear gain and EFL is the nutrient efficiency of linear gain.

20. The apparatus of claim 18 wherein the information in the knowledge base includes a list of the ingredients that are available, a quantity of the available ingredients, a nutrient composition of the ingredients, and a cost of the ingredients.

21. The apparatus of claim 18 wherein the second means further determines the quantity of feed to give to the population of animals so that the population will substantially realize the optimal utilization effectiveness of nutrients.

\* \* \* \* \*